United States Patent [19]

Yoshida et al.

[11] Patent Number: 5,138,673
[45] Date of Patent: Aug. 11, 1992

[54] DATA COMPRESSION SYSTEM

[75] Inventors: Shigeru Yoshida, Ebina; Yasuhiko Nakano, Atsugi; Yoshiyuki Okada, Isehara; Hirotaka Chiba, Atsugi; Masahiro Mori, Tama, all of Japan

[73] Assignee: Fujitsu Limited, Kawasaki, Japan

[21] Appl. No.: 565,679

[22] Filed: Aug. 9, 1990

[30] Foreign Application Priority Data

| Aug. 9, 1989 | [JP] | Japan | 1-206078 |
| Aug. 22, 1989 | [JP] | Japan | 1-215743 |
| Jan. 10, 1990 | [JP] | Japan | 2-003170 |
| Jan. 10, 1990 | [JP] | Japan | 2-003171 |
| Jan. 10, 1990 | [JP] | Japan | 2-003172 |
| Feb. 14, 1990 | [JP] | Japan | 2-033163 |
| Feb. 14, 1990 | [JP] | Japan | 2-033164 |

[51] Int. Cl.$^5$ .............................................. G06K 9/00
[52] U.S. Cl. ................................ 382/56; 358/261.2; 358/427; 358/432
[58] Field of Search ............... 358/261.1, 426, 427, 358/432, 261.2, 261.3; 382/56

[56] References Cited

U.S. PATENT DOCUMENTS

| 4,688,100 | 8/1987 | Haganuma et al. | 358/261.1 |
| 4,800,441 | 1/1989 | Sato | 358/261.1 |
| 4,819,079 | 4/1989 | Takao | 358/426 |

OTHER PUBLICATIONS

"Highly Efficient Data Compression Method for Newspaper Image Data" by Atsushi Ishii et al., Fujitsu Sci. Tech. J. 18, 2, pp. 199–225, Jun. 1982.
Computer, "A Technique For High-Performance Data Compression" by Terry A. Welch, Sperry Research Center, 1984 IEEE.
IEEE Transactions of Communications, vol. COM-34, No. 12, Dec. 1986 "Better OPM/L Text Compression" by Timothy C. Bell.
"Compression of Black-White Images with Arithmetic Coding" 1981 IEEE by Glen G. Langdon, Jr., Senior Member, IEEE, and Jorma Rissanen.

Primary Examiner—Leo H. Boudreau
Attorney, Agent, or Firm—Staas & Halsey

[57] ABSTRACT

A data compression system is provided having a fixed length coding unit provided before a universal coding unit. The fixed length coding unit detects mode classifications and mode conditions of changing picture elements in a mode detecting unit. Then, the mode classifications and mode conditions are converted to fixed length code words in a code transforming unit representative of, e.g., MH, MR or MMR-type codes. Thereafter, the fixed length code words are predictively coded by the universal coding unit to output compressed data. The present invention is applicable to both character data and picture data. Preferably, the picture data is preprocessed by the fixed length coding unit before both of the character data and picture data are predictively coded by the universal coding unit.

30 Claims, 86 Drawing Sheets

Fig.1

TERMINATING CODES

| RUN LENGTH | WHITE RUN | BLACK RUN | RUN LENGTH | WHITE RUN | BLACK RUN |
|---|---|---|---|---|---|
| 0 | 00110101 | 0000110111 | 32 | 00011011 | 000001101010 |
| 1 | 000111 | 010 | 33 | 00010010 | 000001101011 |
| 2 | 0111 | 11 | 34 | 00010011 | 000011010010 |
| 3 | 1000 | 10 | 35 | 00010100 | 000011010011 |
| 4 | 1011 | 011 | 36 | 00010101 | 000011010100 |
| 5 | 1100 | 0011 | 37 | 00010110 | 000011010101 |
| 6 | 1110 | 0010 | 38 | 00010111 | 000011010110 |
| 7 | 1111 | 00011 | 39 | 00101000 | 000011010111 |
| 8 | 10011 | 000101 | 40 | 00101001 | 000001101100 |
| 9 | 10100 | 000100 | 41 | 00101010 | 000001101101 |
| 10 | 00111 | 0000100 | 42 | 00101011 | 000011011010 |
| 11 | 01000 | 0000101 | 43 | 00101100 | 000011011011 |
| 12 | 001000 | 0000111 | 44 | 00101101 | 000001010100 |
| 13 | 000011 | 00000100 | 45 | 00000100 | 000001010101 |
| 14 | 110100 | 00000111 | 46 | 00000101 | 000001010110 |
| 15 | 110101 | 000011000 | 47 | 00001010 | 000001010111 |
| 16 | 101010 | 0000010111 | 48 | 00001011 | 000001100100 |
| 17 | 101011 | 0000011000 | 49 | 01010010 | 000001100101 |
| 18 | 0100111 | 0000001000 | 50 | 01010011 | 000001010010 |
| 19 | 0001100 | 00001100111 | 51 | 01010100 | 000001010011 |
| 20 | 0001000 | 00001101000 | 52 | 01010101 | 000000100100 |
| 21 | 0010111 | 00001101100 | 53 | 00100100 | 000000110111 |
| 22 | 0000011 | 00000110111 | 54 | 00100101 | 000000111000 |
| 23 | 0000100 | 00000101000 | 55 | 01011000 | 000000100111 |
| 24 | 0101000 | 00000010111 | 56 | 01011001 | 000000101000 |
| 25 | 0101011 | 00000011000 | 57 | 01011010 | 000001011000 |
| 26 | 0010011 | 000011001010 | 58 | 01011011 | 000001011001 |
| 27 | 0100100 | 000011001011 | 59 | 01001010 | 000000101011 |
| 28 | 0011000 | 000011001100 | 60 | 01001011 | 000000101100 |
| 29 | 00000010 | 000011001101 | 61 | 00110010 | 000001011010 |
| 30 | 00000011 | 000001101000 | 62 | 00110011 | 000001100110 |
| 31 | 00011010 | 000001101001 | 63 | 00110100 | 000001100111 |

Fig.2  MAKE-UP CODES

| RUN LENGTH | WHITE RUN | BLACK RUN |
|---|---|---|
| 64 | 11011 | 0000001111 |
| 128 | 10010 | 000011001000 |
| 192 | 010111 | 000011001001 |
| 256 | 0110111 | 000001011011 |
| 320 | 00110110 | 000000110011 |
| 384 | 00110111 | 000000110100 |
| 448 | 01100100 | 000000110101 |
| 512 | 01100101 | 0000001101100 |
| 576 | 01101000 | 0000001101101 |
| 640 | 01100111 | 0000001001010 |
| 704 | 011001100 | 0000001001011 |
| 768 | 011001101 | 0000001001100 |
| 832 | 011010010 | 0000001001101 |
| 896 | 011010011 | 0000001110010 |
| 960 | 011010100 | 0000001110011 |
| 1024 | 011010101 | 0000001110100 |
| 1088 | 011010110 | 0000001110101 |
| 1152 | 011010111 | 0000001110110 |
| 1216 | 011011000 | 0000001110111 |
| 1280 | 01101101 | 0000001010010 |
| 1344 | 011011010 | 0000001010011 |
| 1408 | 011011011 | 0000001010101 |
| 1472 | 010011000 | 0000001010101 |
| 1536 | 010011001 | 0000001011010 |
| 1600 | 010011010 | 0000001011011 |
| 1664 | 011000 | 0000001100100 |
| 1728 | 010011011 | 0000001100101 |
| EOL | 000000000001 | 000000000001 |
| 1792 | | 00000001000 |
| 1856 | | 00000001100 |
| 1920 | | 00000001101 |
| 1984 | | 000000010010 |
| 2048 | | 000000010011 |
| 2112 | | 000000010100 |
| 2176 | | 000000010101 |
| 2240 | | 000000010110 |
| 2304 | | 000000010111 |
| 2368 | | 000000011100 |
| 2432 | | 000000011101 |
| 2496 | | 000000011110 |
| 2560 | | 000000011111 |

Fig.4

| MODE | DFINITION OF MODE |
|---|---|
| PASS MODE | POSITION OF $b_2$ LIES TO LEFT OF $a_1$ |
| VERTICAL MODE | CODING IS MADE BY RELATIVE DISTANCE $a_1b_1$. WHEN $a_1$ LIES TO LEFT OR RIGHT OF $a_1$, $VL(a_1b_1)$ OR $VR(a_1b_1)$ ARE GIVEN RESPECTIVELY. $a_1b_1$ TAKES 0,$\pm 1$,$\pm 2$ AND $\pm 3$. WHEN $a_1b_1$ IS OVER THESE VALUES, HORIZONTAL MODE IS USED |
| HORIZONTAL MODE | ABOVE CASE AND NEW START CASE ARE EXPRESSED AS $H + M(a_0a_1) + M(a_1a_2)$. $M(\cdot)$ IS MH CODE WORD EXPRESSING EACH COLOR AND EACH RUN LENGTH |

Fig. 5

| CODING MODE | | ELEMENTS TO BE CODED | NOTATION | CODE WORD |
|---|---|---|---|---|
| PASS MODE | | (b1 b2) | P | 0001 |
| HORIZONTAL MODE | | $a_0a_1, a_1a_2$ | H | 001 + M($a_0a_1$) + M($a_1a_2$) |
| VERTICAL MODE | $\Delta = 0$ | $a_1 b_1 = 0$ | V(0) | 1 |
| | $\Delta > 0$ | $a_1 b_1 = 1$ | VR(1) | 011 |
| | | $a_1 b_1 = 2$ | VR(2) | 000011 |
| | | $a_1 b_1 = 3$ | VR(3) | 0000011 |
| | $\Delta < 0$ | $a_1 b_1 = 1$ | VL(1) | 010 |
| | | $a_1 b_1 = 2$ | VL(2) | 000010 |
| | | $a_1 b_1 = 3$ | VL(3) | 0000010 |
| EXTENSION MODE | | 2-D EXTENSIONS | | 0000001 XXX |
| | | 1-D EXTENSIONS | | 00000001 XXX |
| EOL (END-OF-LINE) | | | | 000000000001T |

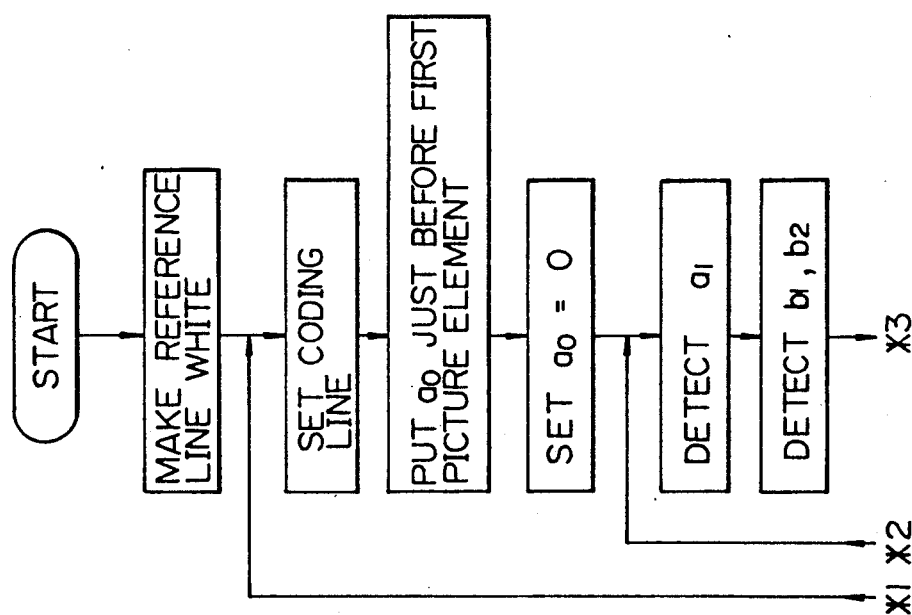

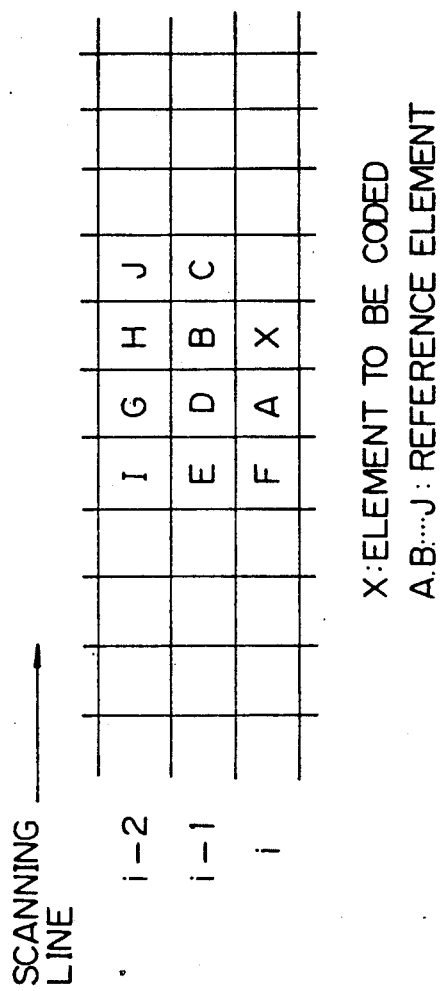

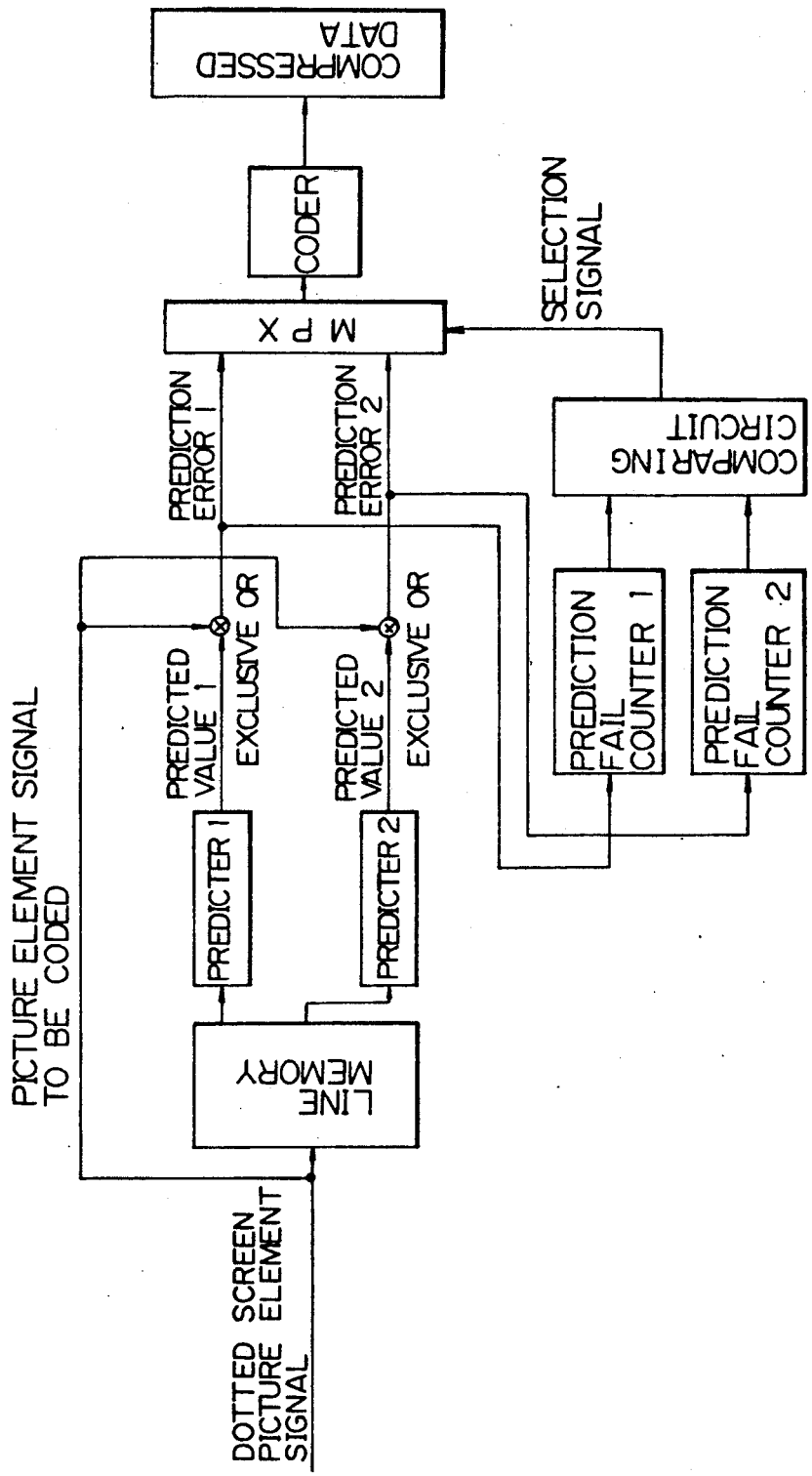

Fig.12

| ONE-DIMENSIONAL MH CODE | FIXED LENGTH CODE WORD | TWO-DIMENSIONAL MODE CODE | | FIXED LENGTH CODE WORD |
|---|---|---|---|---|
| WHITE TM CODE (64 NUMBER) | 0 ~ 63 | PASS MODE | P | 208 |
| BLACK TM CODE (64 NUMBER) | 64 ~ 127 | | $V_R$ (3) | 209 |
| WHITE MK CODE (40 NUMBER) | 128 ~ 167 | | $V_R$ (2) | 210 |
| BLACK MK CODE (40 NUMBER) | 168 ~ 207 | | $V_R$ (1) | 211 |
| | | VERTICAL MODE | V (0) | 212 |
| | | | $V_L$ (1) | 213 |
| | | | $V_L$ (2) | 214 |
| | | | $V_L$ (3) | 215 |
| | | (HORIZONTAL MODE H) | | (216) |

Fig.13

TERMINATING CODES

| RUN LENGTH | WHITE RUN | BLACK RUN | RUN LENGTH | WHITE RUN | BLACK RUN |
|---|---|---|---|---|---|
| 0 | 00000000 | 01000000 | 32 | 00100000 | 01100000 |
| 1 | 00000001 | 01000001 | 33 | 00100001 | 01100001 |
| 2 | 00000010 | 01000010 | 34 | 00100010 | 01100010 |
| 3 | 00000011 | 01000011 | 35 | 00100011 | 01100011 |
| 4 | 00000100 | 01000100 | 36 | 00100100 | 01100100 |
| 5 | 00000101 | 01000101 | 37 | 00100101 | 01100101 |
| 6 | 00000110 | 01000110 | 38 | 00100110 | 01100110 |
| 7 | 00000111 | 01000111 | 39 | 00100111 | 01100111 |
| 8 | 00001000 | 01001000 | 40 | 00101000 | 01101000 |
| 9 | 00001001 | 01001001 | 41 | 00101001 | 01101001 |
| 10 | 00001010 | 01001010 | 42 | 00101010 | 01101010 |
| 11 | 00001011 | 01001011 | 43 | 00101011 | 01101011 |
| 12 | 00001100 | 01001100 | 44 | 00101100 | 01101100 |
| 13 | 00001101 | 01001101 | 45 | 00101101 | 01101101 |
| 14 | 00001110 | 01001110 | 46 | 00101110 | 01101110 |
| 15 | 00001111 | 01001111 | 47 | 00101111 | 01101111 |
| 16 | 00010000 | 01010000 | 48 | 00110000 | 01110000 |
| 17 | 00010001 | 01010001 | 49 | 00110001 | 01110001 |
| 18 | 00010010 | 01010010 | 50 | 00110010 | 01110010 |
| 19 | 00010011 | 01010011 | 51 | 00110011 | 01110011 |
| 20 | 00010100 | 01010100 | 52 | 00110100 | 01110100 |
| 21 | 00010101 | 01010101 | 53 | 00110101 | 01110101 |
| 22 | 00010110 | 01010110 | 54 | 00110110 | 01110110 |
| 23 | 00010111 | 01010111 | 55 | 00110111 | 01110111 |
| 24 | 00011000 | 01011000 | 56 | 00111000 | 01111000 |
| 25 | 00011001 | 01011001 | 57 | 00111001 | 01111001 |
| 26 | 00011010 | 01011010 | 58 | 00111010 | 01111010 |
| 27 | 00011011 | 01011011 | 59 | 00111011 | 01111011 |
| 28 | 00011100 | 01011100 | 60 | 00111100 | 01111100 |
| 29 | 00011101 | 01011101 | 61 | 00111101 | 01111101 |
| 30 | 00011110 | 01011110 | 62 | 00111110 | 01111110 |
| 31 | 00011111 | 01011111 | 63 | 00111111 | 01111111 |

Fig. 14

MAKE-UP CODES

| RUN LENGTH | WHITE RUN | BLACK RUN |
|---|---|---|
| 64 | 10000000 | 10101000 |
| 128 | 10000001 | 10101001 |
| 192 | 10000010 | 10101010 |
| 256 | 10000011 | 10101011 |
| 320 | 10000100 | 10101100 |
| 384 | 10000101 | 10101101 |
| 448 | 10000110 | 10101110 |
| 512 | 10000111 | 10101111 |
| 576 | 10001000 | 10110000 |
| 640 | 10001001 | 10110001 |
| 704 | 10001010 | 10110010 |
| 768 | 10001011 | 10110011 |
| 832 | 10001100 | 10110100 |
| 896 | 10001101 | 10110101 |
| 960 | 10001110 | 10110110 |
| 1024 | 10001111 | 10110111 |
| 1088 | 10010000 | 10111000 |
| 1152 | 10010001 | 10111001 |
| 1216 | 10010010 | 10111010 |
| 1280 | 10010011 | 10111011 |
| 1344 | 10010100 | 10111100 |
| 1408 | 10010101 | 10111101 |
| 1472 | 10010110 | 10111110 |
| 1536 | 10010111 | 10111111 |
| 1600 | 10011000 | 11000000 |
| 1664 | 10011001 | 11000001 |
| 1728 | 10011010 | 11000010 |
| 1792 | 10011011 | 11000011 |
| 1856 | 10011100 | 11000100 |
| 1920 | 10011101 | 11000101 |
| 1984 | 10011110 | 11000110 |
| 2048 | 10011111 | 11000111 |
| 2112 | 10100000 | 11001000 |
| 2176 | 10100001 | 11001001 |
| 2240 | 10100010 | 11001010 |
| 2304 | 10100011 | 11001011 |
| 2368 | 10100100 | 11001100 |
| 2432 | 10100101 | 11001101 |
| 2496 | 10100110 | 11001110 |
| 2560 | 10100111 | 11001111 |

| | |
|---|---|
| PASS MODE P | 11010000 |
| $V_R$ (3) | 11010001 |
| $V_R$ (2) | 11010010 |
| $V_R$ (1) | 11010011 |
| VERTICAL MODE V (0) | 11010100 |
| $V_L$ (1) | 11010101 |
| $V_L$ (2) | 11010110 |
| $V_L$ (3) | 11010111 |
| (HORIZONTAL MODE H) | 11011000 |

Fig.16

| RL | FIXED LENGTH CODE WORD (HERE x IS 0 OR 1) | CODE LENGTH |
|---|---|---|
| 0 ~ 127 | 0 xxxxxxx | 8 BIT |
| 128 ~ 16,383 | 0 xxxxxxx  1 xxxxxxx | 16 BIT |

○ △ △ △ △ △ △ × ○ △ △ △ △ △ △ × ○ △ △ ---

⎵⎵⎵⎵⎵⎵⎵⎵  ⎵⎵⎵⎵⎵⎵⎵⎵
  CONTOUR 1    CONTOUR 2

○ ○ × × △ △ △ △ △ △ ○ ○ △ △ ---

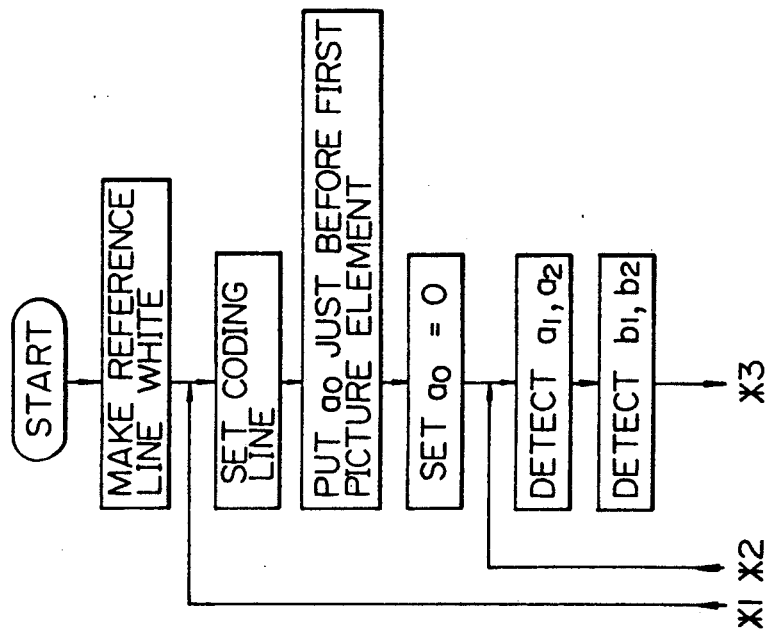

Fig.25

| CLASSIFICATION OF INFORMATION | CLASSIFICATION OF CODE | | ALLOCATION OF FIXED LENGTH CODE WORD | | |
|---|---|---|---|---|---|
| | | | FIRST BYTE | SECOND BYTE | THIRD BYTE |
| ENDING POINT INFORMATION | PASS MODE | | 10000000 | — | — |
| CONNECTING POINT INFORMATION | VERTICAL MODE | V(0) | 00000000 | — | — |
| | | V(1) ~ V(62) <br> V(63) ~ V(1630) <br> V(1631) ~ | 00xxxxxx <br> 01xxxxxx <br> 01xxxxxx | (2 63) <br> 0xxxxxxx <br> 1xxxxxxx | — <br> — <br> xxxxxxxx |
| | | V(-1) ~ V(-62) <br> V(-63) ~ V(-1630) <br> V(-1631) ~ | 10xxxxxx <br> 11xxxxxx <br> 11xxxxxx | (129 191) <br> 0xxxxxxx <br> 1xxxxxxx | — <br> — <br> xxxxxxxx |
| STARTING POINT INFORMATION | HORIZONTAL MODE WHITE/BLACK RUN LENGTH | 0 ~ 127 <br> 128 ~ 3263 | 00000001 <br> 00000001 | 0xxxxxxx <br> 1xxxxxxx | — <br> xxxxxxxx |

WHERE, X IS 0 OR 1

Fig.28A

| LINE NO. \ DIGIT | 1 | 2 | 3 | 4 | 5 | 6 | 7 | 8 |
|---|---|---|---|---|---|---|---|---|
| 1 | $V_0$ | $V_0$ | $V_1$ | $V_1$ | $V_0$ | 0 | 0 | |
| 2 | $V_1$ | $V_0$ | $V_2$ | $V_2$ | $V_0$ | 0 | 0 | |
| 3 | $V_0$ | $V_1$ | $V_3$ | $V_2$ | $V_0$ | $H_{20}$ | $H_{23}$ | |
| 4 | $V_{-1}$ | $V_0$ | $V_2$ | $V_1$ | $V_0$ | $V_0$ | $V_0$ | |
| 5 | P | P | $V_0$ | $V_1$ | $V_0$ | $V_0$ | $V_1$ | |
| 6 | EMPTY | EMPTY | $V_3$ | $V_2$ | $V_0$ | $V_{-1}$ | $V_0$ | |

Fig.28B

| i | 1 | 2 | 3 | 4 | 5 | 6 | 7 |
|---|---|---|---|---|---|---|---|
| CN(i) | 1 | 2 | 6 | 7 | 3 | 4 | 5 |

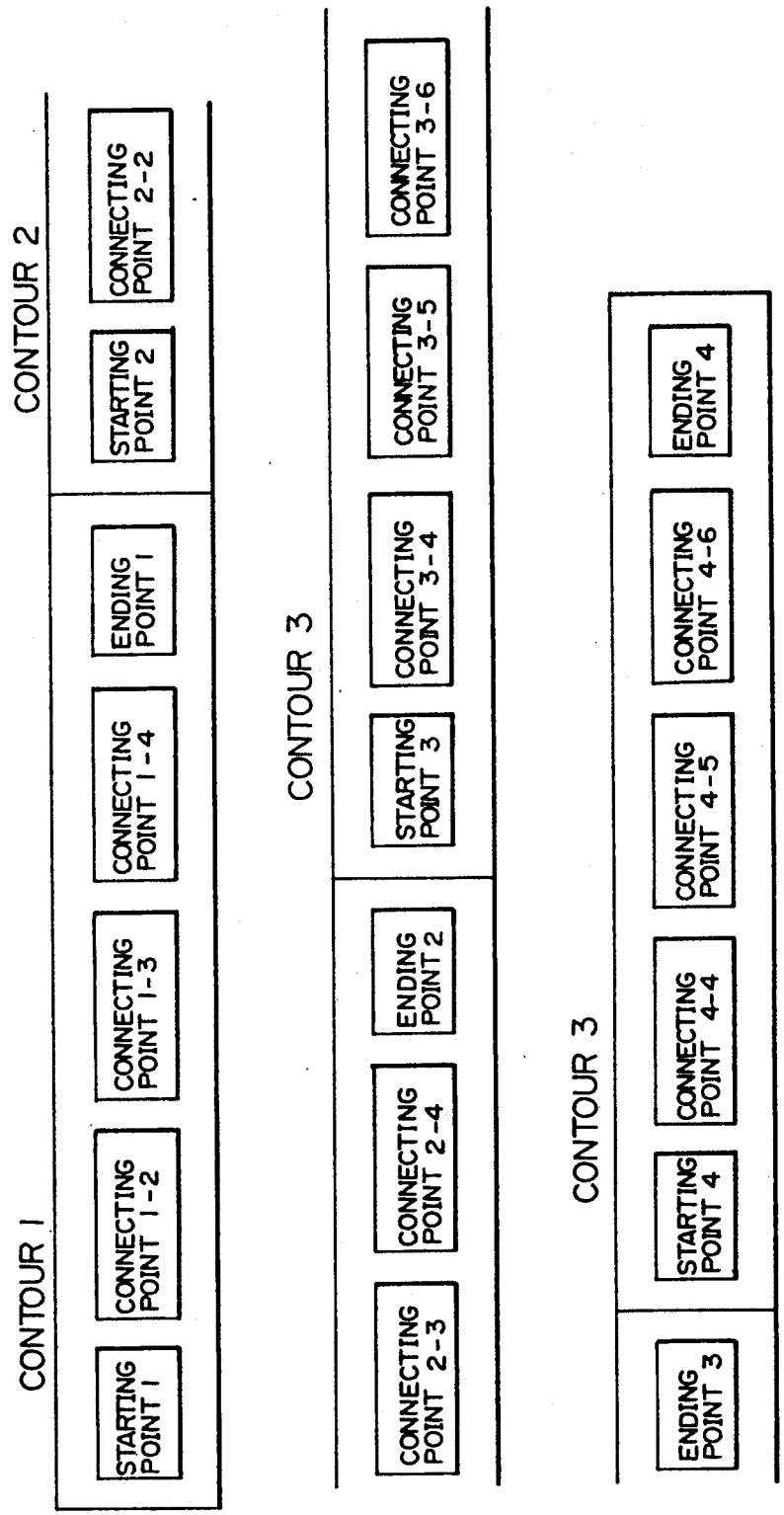

Fig. 31

| CLASSIFICATION OF INFORMATION | CLASSIFICATION OF CODE | | | VALUE OF LENGTH LENGTH CODE |
|---|---|---|---|---|
| ENDING POINT INFORMATION | PASS MODE | | | 0 |
| CONNECTING POINT INFORMATION | VERTICAL MODE | V(0) | | 1 |
| | | V(1) ~ V(4096) | | 2 ~ 4097 |
| | | V(-1) ~ V(-4096) | | 4098 ~ 8193 |
| STARTING POINT INFORMATION | HORIZONTAL MODE WHITE/BLACK RUN LENGTH | 1 ~ 4096 | | 8194 ~ 12299 |

Fig. 32

| DIGIT<br>LINE NO. | 1 | 2 | 3 | 4 | 5 | 6 | 7 | 8 |
|---|---|---|---|---|---|---|---|---|
| 1 | Vo | Vo | V1 | V1 | Vo | | | |
| 2 | V1 | Vo | V2 | V2 | Vo | | | |
| 3 | Vo | V1 | H20 | H23 | V3 | V2 | Vo | |
| 4 | V-1 | Vo | Vo | Vo | V2 | V1 | Vo | |
| 5 | P | Vo | V1 | V1 | Vo | V1 | | |
| 6 | V-1 | Vo | V3 | V2 | Vo | | | |

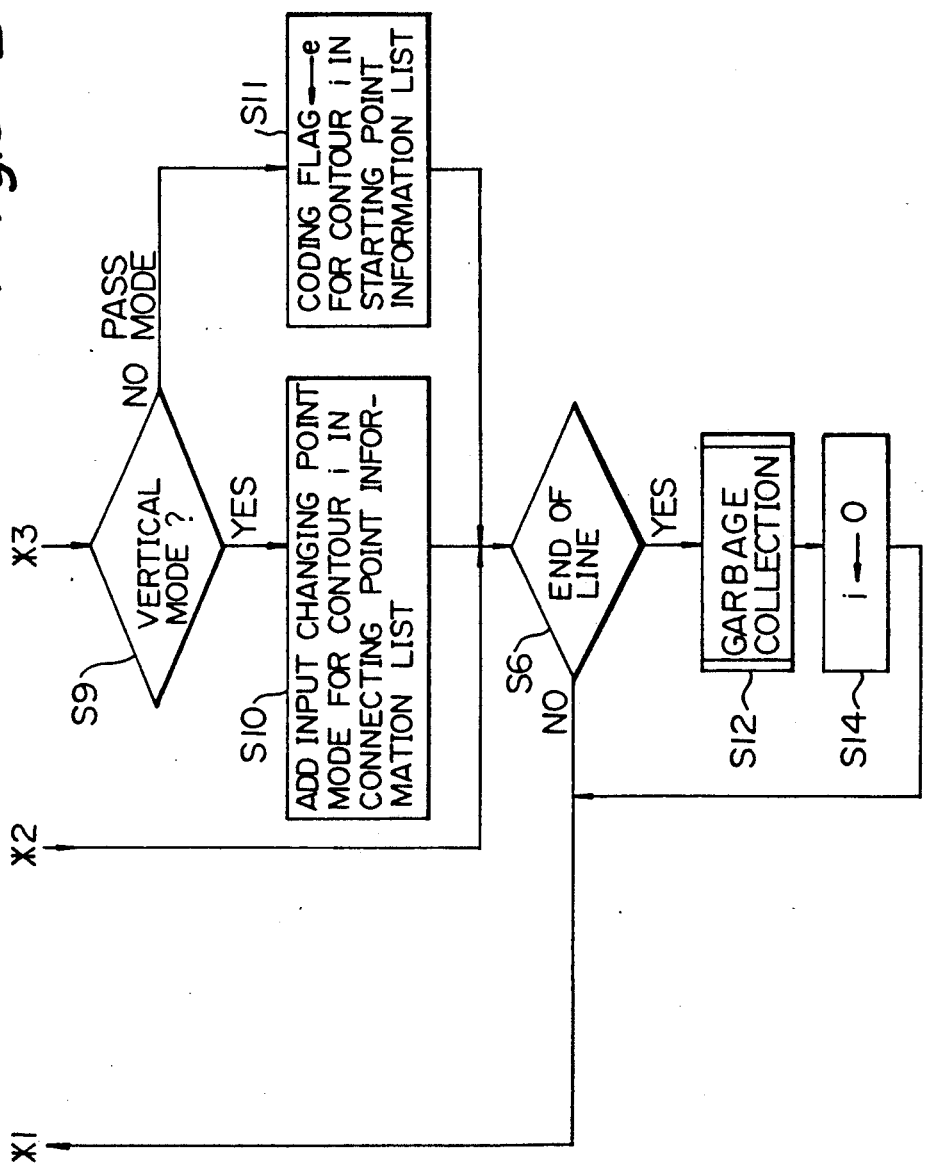

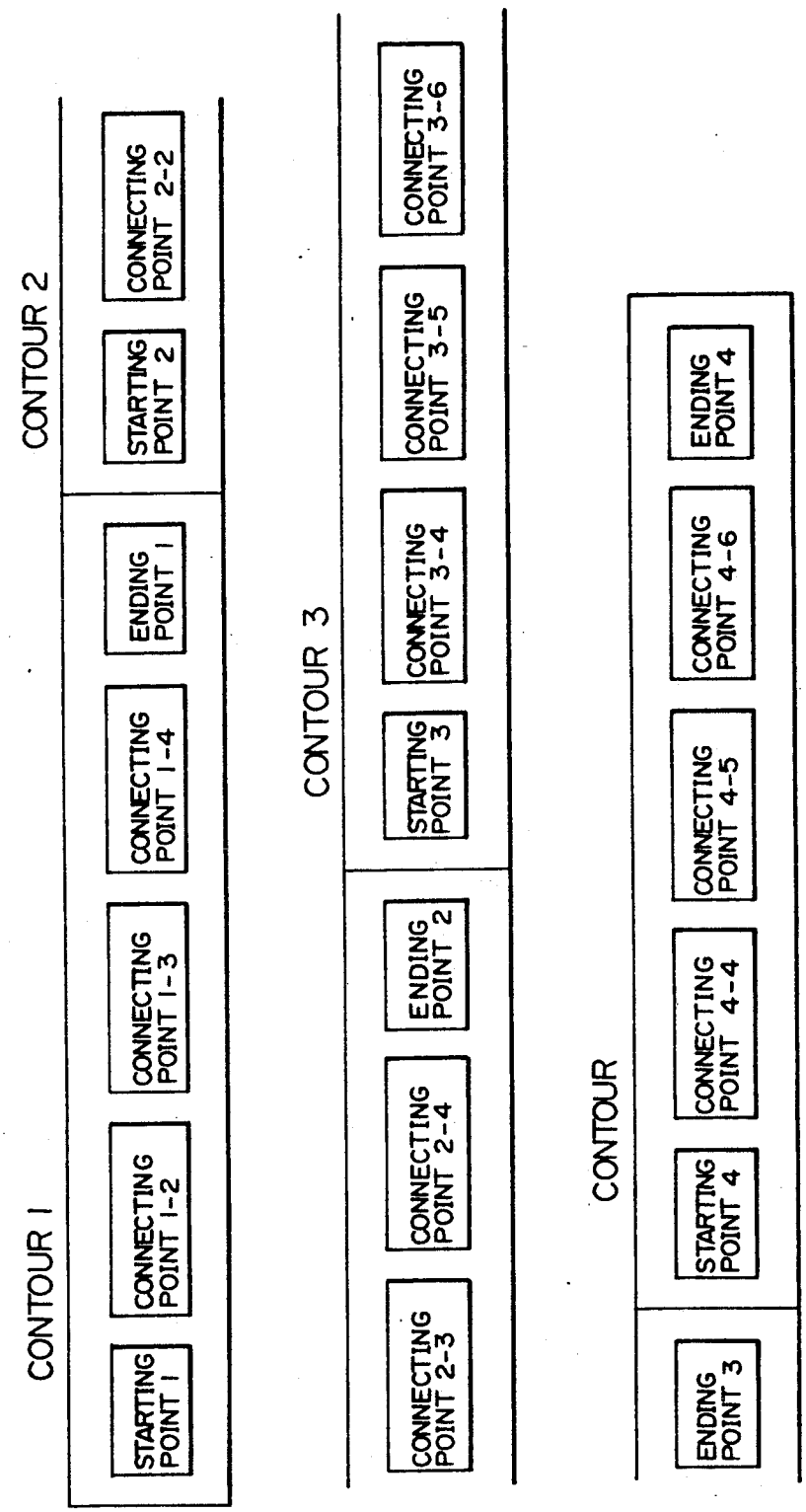

Fig. 41C

| STARTING POINT INFORMATION | CONNECTING AND ENDING POINT INFORMATION |
|---|---|

| NUMBER OF CONTOUR | STARTING POINT 1 | STARTING POINT 2 | STARTING POINT 3 | STARTING POINT 4 | CONNECTING POINT 1-2 | CONNECTING POINT 1-3 | CONNECTING POINT 1-4 |

| ENDING POINT 1 | CONNECTING POINT 2-2 | CONNECTING POINT 2-3 | CONNECTING POINT 2-4 | ENDING POINT 2 | CONNECTING POINT 3-4 | CONNECTING POINT 3-5 |

| CONNECTING POINT 3-6 | ENDING POINT 3 | CONNECTING POINT 4-4 | CONNECTING POINT 4-5 | CONNECTING POINT 4-6 | ENDING POINT 4 |

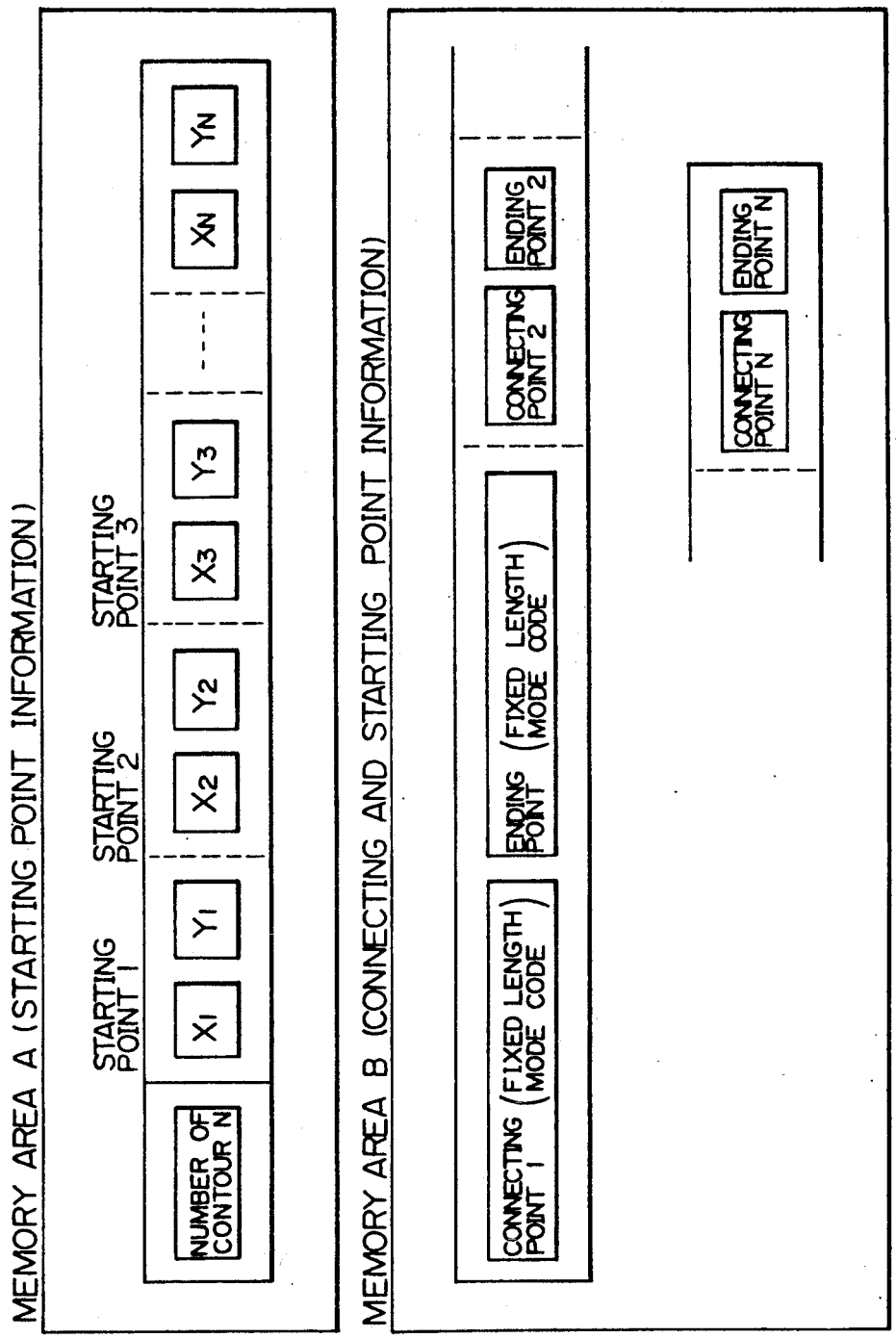

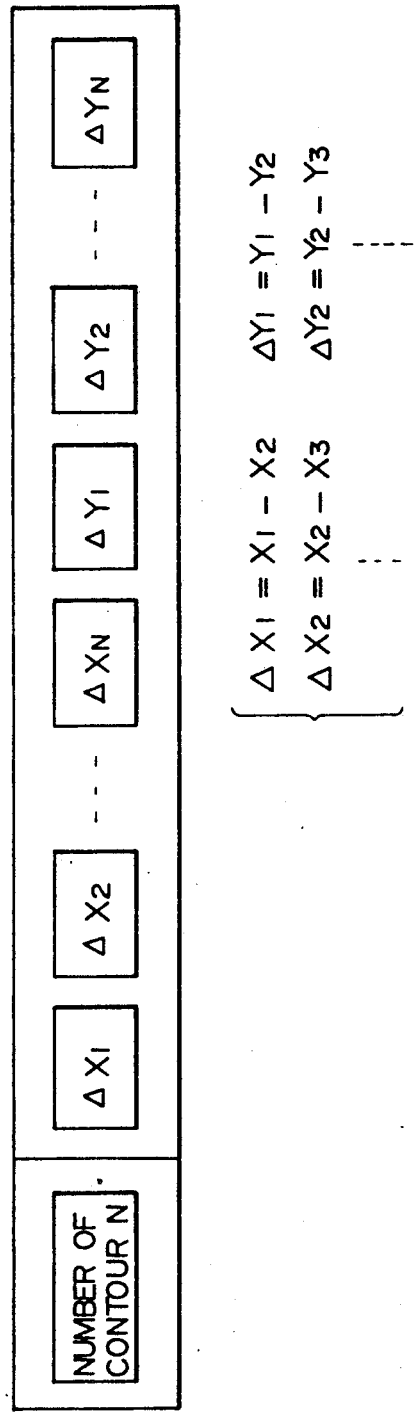

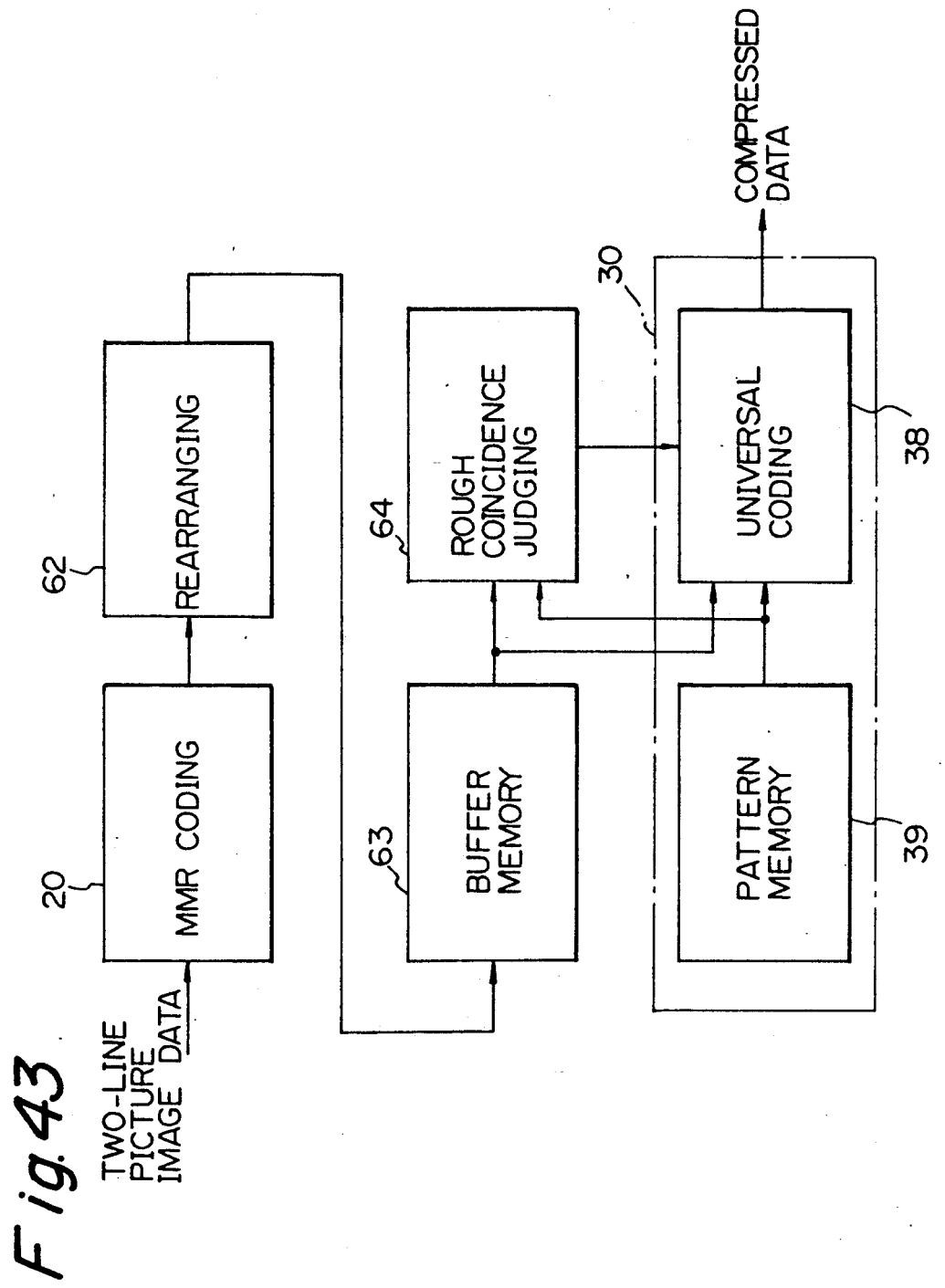

P

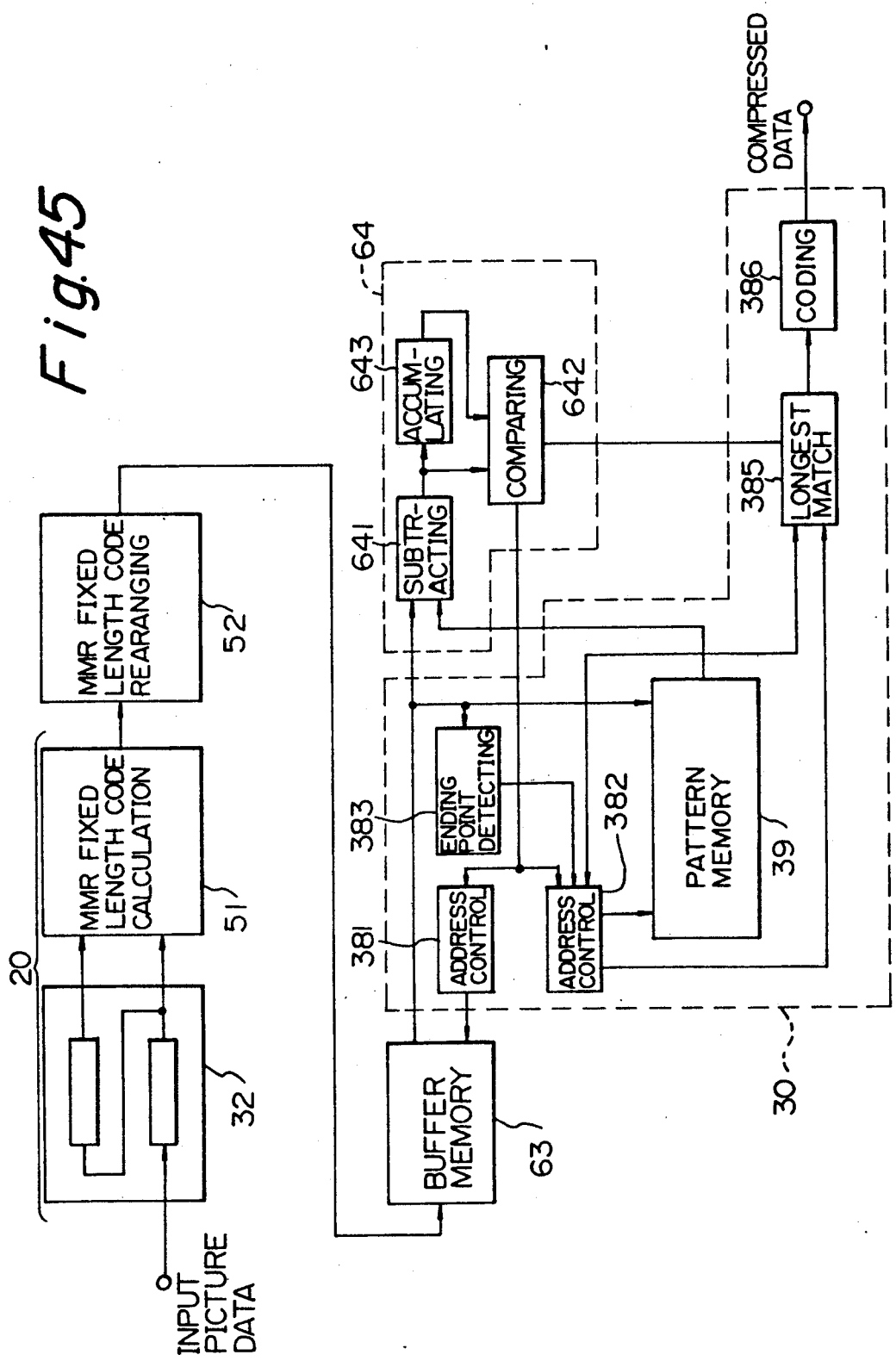

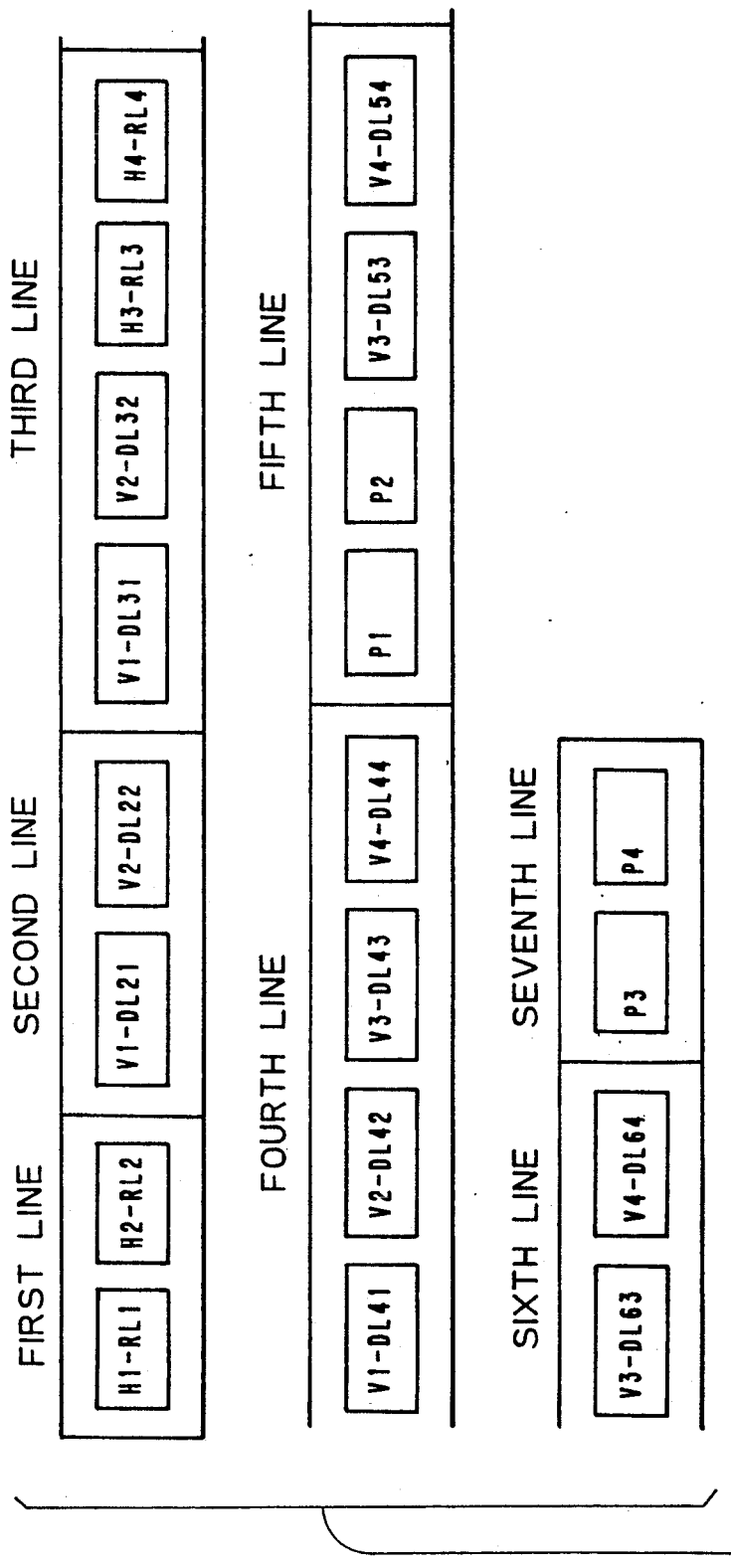

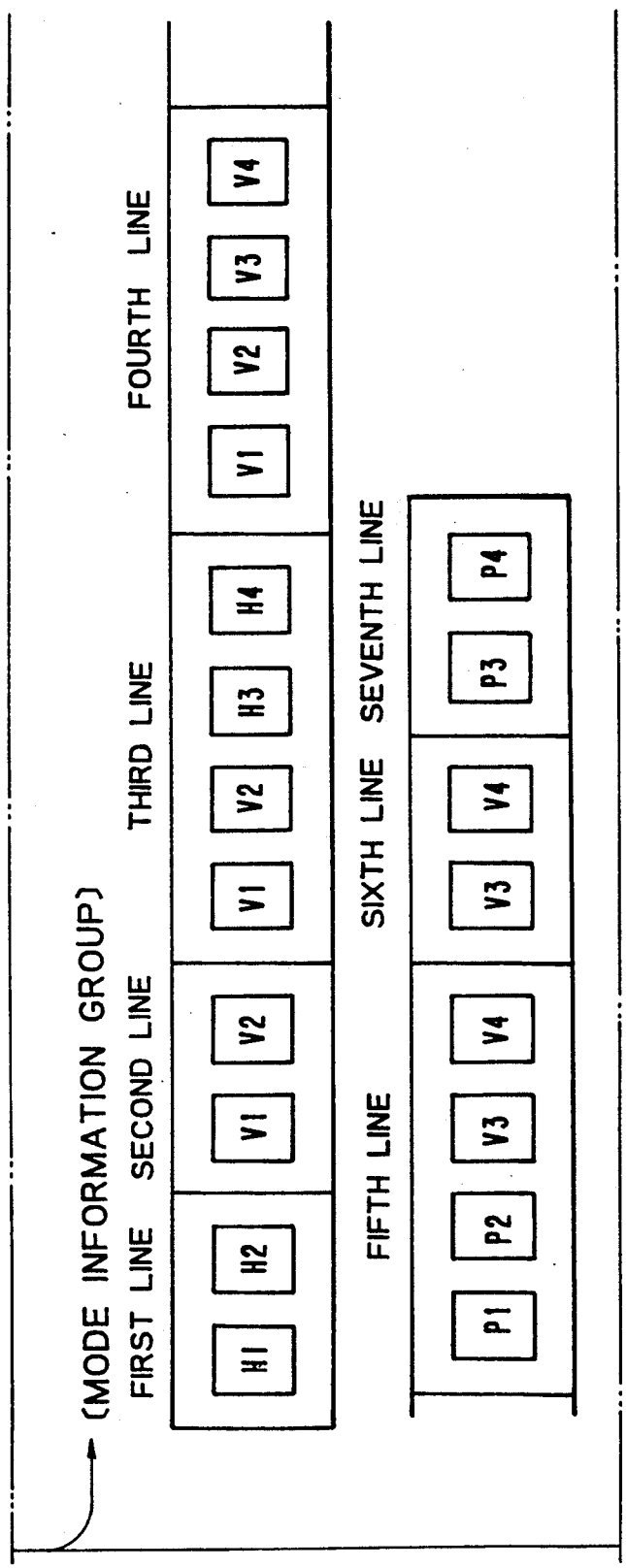

Fig.49A

| Fig.49 |
|---|
| Fig.49A |
| Fig.49B |
| Fig.49C |

CONTOUR 1 (STARTING POINT:FIRST LINE)
| H1-RL1 | V1-DL21 | V1-DL31 | V1-DL41 | P1 |

CONTOUR 2 (STARTING POINT:FIRST LINE)
| H2-RL2 | V2-DL22 | V2-DL32 |

CONTOUR 3 (STARTING POINT:THIRD LINE)
| V2-DL42 | P2 | H3-RL3 | V3-DL43 | V3-DL53 | V3-DL63 | P3 |

CONTOUR 4 (STARTING POINT:THIRD LINE)
| H4-RL4 | V4-DL44 | V4-DL54 | V4-DL64 | P4 |

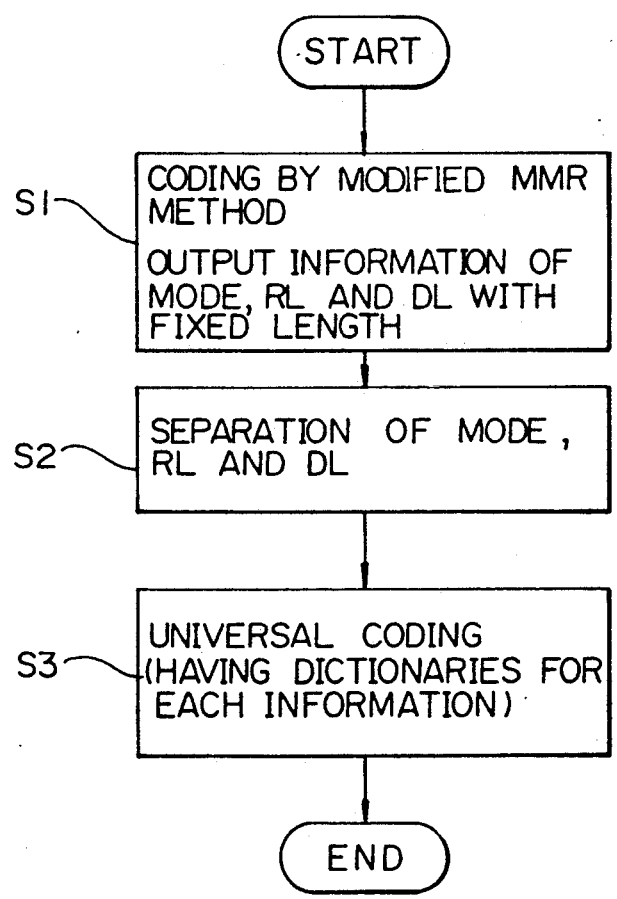

Fig. 52

| CLASIFICATION OF INFORMATION | CLASSIFICATION OF CODE | | | ALLOCATION OF FIXED LENGTH CODE WORD | |
|---|---|---|---|---|---|
| | | | | FIRST BYTE | SECOND BYTE |
| MODE INFORMATION | HORIZONTAL H | | | 10000000 | — |
| | VERTICAL V | | | 00000000 | — |
| | PASS P | | | 00000001 | — |
| HORIZONTAL MODE RL INFORMATION | WHITE/BLACK RUN LENGTH | RL ( 0) ~ RL(127) | | 0xxxxxxx | — |
| | | RL (128) ~ RL(32895) | | 1xxxxxxx | xxxxxxxx |
| VERTICAL MODE DL INFORMATION | CHANGING POINT DL | DL(0) DL(63) | ~DL (63) ~DL(16447) | 00xxxxxx 01xxxxxx | — xxxxxxxx |
| | | DL(-1) DL(-63) | ~DL(-63) ~DL(-16447) | 10xxxxxx 11xxxxxx | — xxxxxxxx |
| STARTING POINT No INFORMATION | | LINE NO. 0 ~ 127 LINE NO.128 ~ 32895 | | 0xxxxxxx 1xxxxxxx | — xxxxxxxx |

WHERE, x IS 0 OR 1

Fig.53

FIRST LINE: H1-RL1 | H2-RL2

SECOND LINE: V1-DL21 | V2-DL22

THIRD LINE: V1-DL31 | V2-DL32 | H3-RL3 | H4-RL4

FOURTH LINE: V1-DL41 | V2-DL42 | V3-DL43 | V4-DL44

FIFTH LINE: P1 | P2 | V3-DL53 | V4-DL54

SIXTH LINE: V3-DL63 | V4-DL64

SEVENTH LINE: P3 | P4

Fig.54
(MODE INFORMATION GROUP)
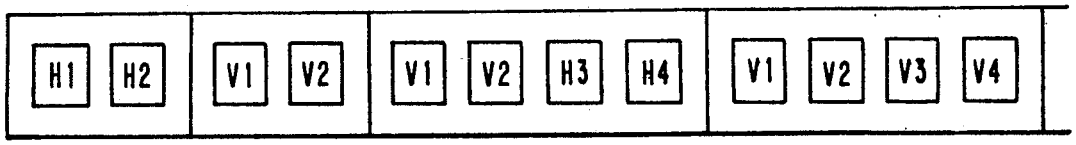
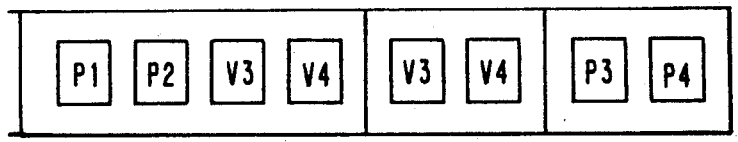
(RL INFORMATION GROUP)
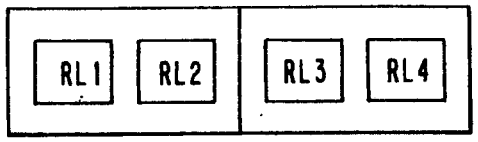
(DL INFORMATION GROUP)
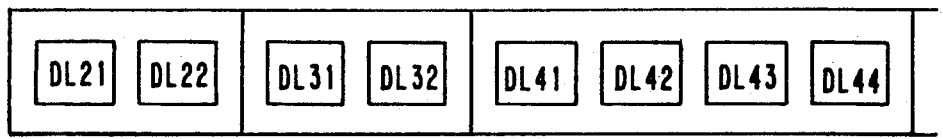
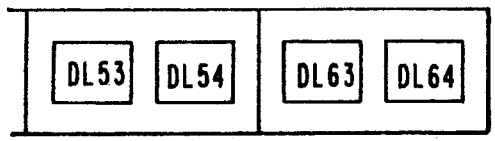

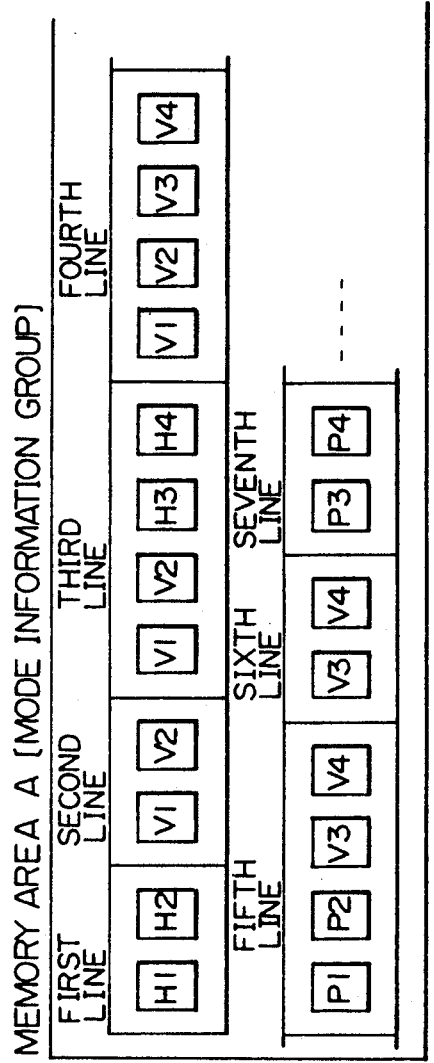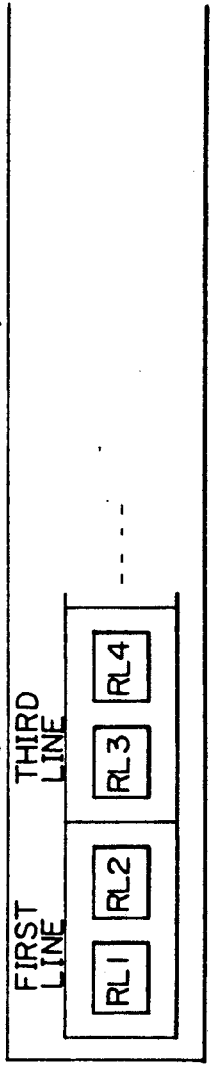
Fig.55A
Fig.55B

Fig. 57

CONTOUR 1 (STARTING POINT: FIRST LINE)

| H1-RL1 | V1-DL21 | V1-DL31 | V1-DL41 | P1 |
|---|---|---|---|---|

CONTOUR 2 (STARTING POINT: FIRST LINE)

| H2-RL2 | V2-DL22 | V2-DL32 |
|---|---|---|

CONTOUR 3 (STARTING POINT: THIRD LINE)

| V2-DL42 | P2 | H3-RL3 | V3-DL43 | V3-DL53 | V3-DL63 | P3 |
|---|---|---|---|---|---|---|

CONTOUR 4 (STARTING POINT: THIRD LINE)

| H4-RL4 | V4-DL44 | V4-DL54 | V3-DL64 | P4 |
|---|---|---|---|---|

Fig.58
(MODE INFORMATION GROUP)
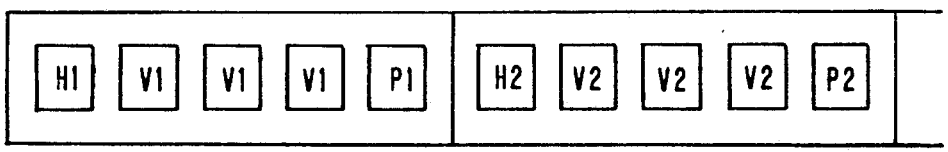
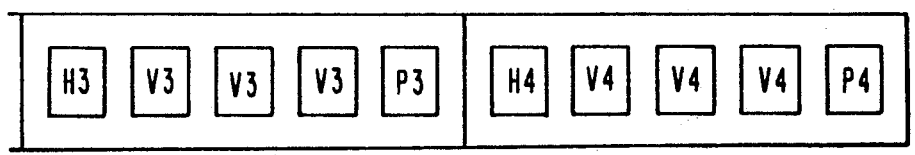
(STARTING POINT LINE NO. GROUP)
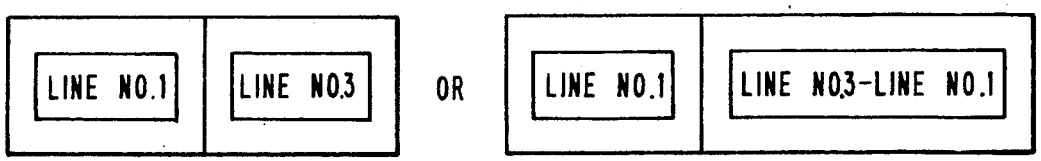
(RL INFORMATION GROUP)
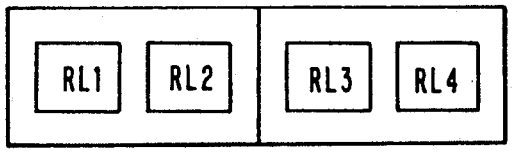
(DL INFORMATION GROUP)
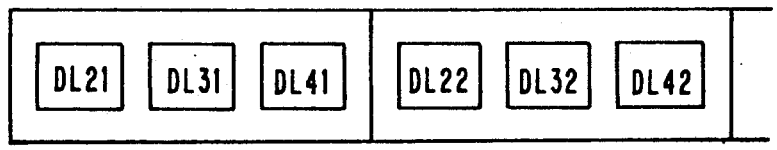
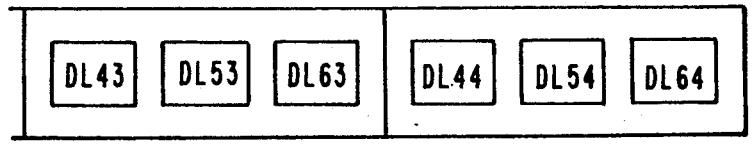

Fig. 59A

MEMORY AREA A
(MODE INFORMATION GROUP)

CONTOUR 1: H1 V1 V1 V1 P1
CONTOUR 2: H2 V2 V2 V2 P2
CONTOUR 3: H3 V3 V3 V3 P3
CONTOUR 4: H4 V4 V4 V4 P4 ----

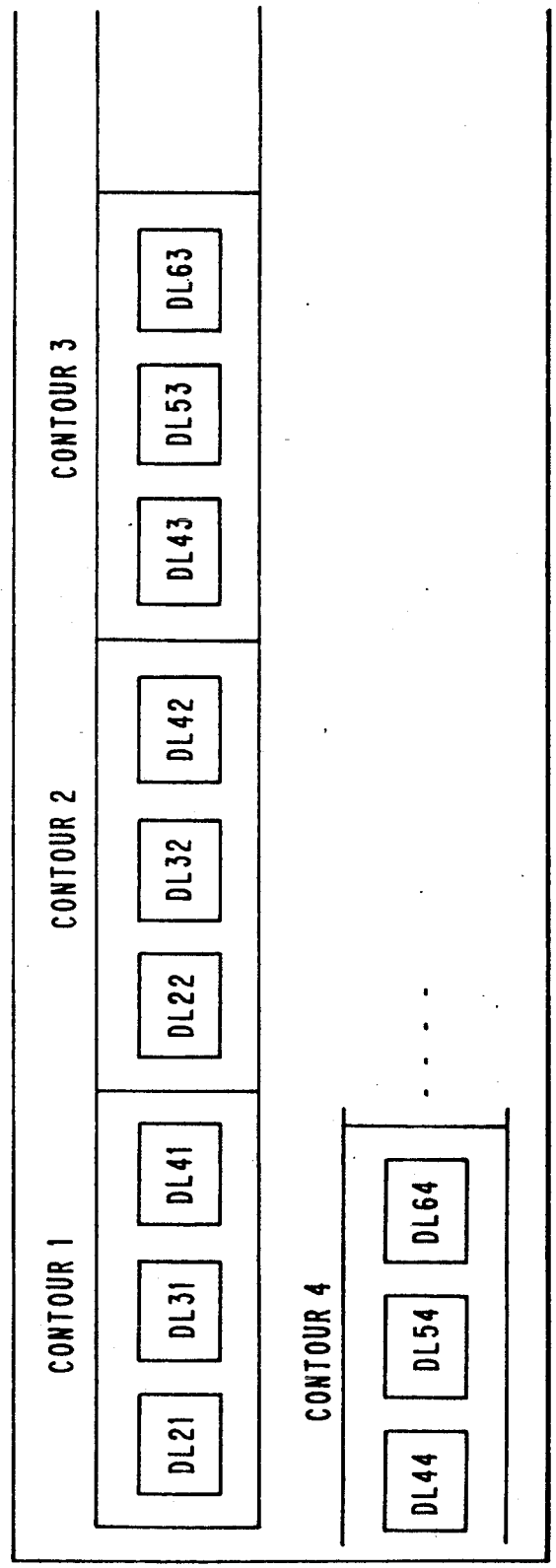

Fig.63

| CLASSIFICATION OF INFORMATION | CLASSIFICATION OF CODE | | ALLOCATION OF FIXED LENGTH CODE WORD | | |
|---|---|---|---|---|---|
| | | | FIRST BYTE | SECOND BYTE | THIRD BYTE |
| STARTING POINT INFORMATION | HORIZONTAL MODE H WHITE/BLACK RL INFORMATION | RL(0) ~ RL(127) | 00000001 | 0xxxxxxx | — |
| | | RL(128) ~ RL(32895) | 00000001 | 1xxxxxxx | xxxxxxxx |
| CONNECTING POINT INFORMATION | VERTICAL MODE V DL INFORMATION | DL(0) | 00000000 | — | — |
| | | DL(-1) ~ RL(62) | 00xxxxxx | — | — |
| | | DL(63) ~ RL(8255) | 01xxxxxx | 0xxxxxxx | — |
| | | DL(8255)~ | 01xxxxxx | 1xxxxxxx | xxxxxxxx |
| | | DL(-1) ~ RL(-62) | 10xxxxxx | — | — |
| | | DL(-63) ~ RL(-8255) | 11xxxxxx | 0xxxxxxx | — |
| | | DL(-8255)~ | 11xxxxxx | 1xxxxxxx | xxxxxxxx |
| ENDING POINT INFORMATION | PASS MODE P | | 10000000 | | |

WHERE X IS 0 OR 1

Fig.64

| Fig.64A |
|---|
| Fig.64B |

Fig.64A

| CLASSIFICATION OF INFORMATION | | CLASSIFICATION OF CODE | | ALLOCATION OF FIXED LENGTH CODE WORD | | | NOTE |
|---|---|---|---|---|---|---|---|
| FIRST LINE | SECOND LINE | | | FIRST BYTE | SECOND BYTE | THIRD BYTE | |
| N (NULL) | H | NH MODE | NH + RL  0~15<br>RL  16~2063<br>RL2064~ | 1000★★★★<br>1001★★★★<br>1001★★★★ | <br>0★★★★★★★<br>1★★★★★★★ | <br><br>★★★★★★★★ | 1~3 BYTES CONSTRUCTION |
| P | . H | PH MODE | PH + RL  0 ~ 15<br>RL  16~2063<br>RL2064~ | 1010★★★★<br>1011★★★★<br>1011★★★★ | <br>0★★★★★★★<br>1★★★★★★★ | <br><br>★★★★★★★★ | 1~3 BYTES CONSTRUCTION |
| H | P | HP MODE | HP + RL  0 ~ 15<br>RL  16~2063<br>RL2064~ | 1100★★★★<br>1101★★★★<br>1101★★★★ | <br>0★★★★★★★<br>1★★★★★★★ | <br><br>★★★★★★★★ | 1~3 BYTES CONSTRUCTION |
| = | V | HV MODE | HV + RL  0 ~ 15<br>RL  16~2063<br>RL2064~<br>+DL  +0~+3<br>DL  +4~+67<br>DL  +68~<br>DL  -1~-3<br>DL  -1~-67<br>DL  -68~ | 1110★★★★<br>1111★★★★<br>1111★★★★<br>000000★★<br>00000100<br>00000100<br>000001★★<br>00000100<br>00000100 | 0★★★★★★★<br>1★★★★★★★<br><br><br>00★★★★★★<br>01★★★★★★<br><br>10★★★★★★<br>11★★★★★★ | <br>★★★★★★★★<br><br><br>★★★★★★★★<br><br>★★★★★★★★ | 2~6 BYTES CONSTRUCTION (H,V ARE INDEPENDENT)<br>←VV MODE IS DIFFERENTIATE BY HV MODE<br>←VV MODE IS DIFFERENTIATE BY HV MODE |

Fig.64B

| | | | | | | |
|---|---|---|---|---|---|---|
| V | V | VV MODE | VV+DL +0~+3 | 001**+V2 | | 1~5 BYTES CONSTRUCTION |
| | | | DL +1~+67 | 00100+V2 | 00****** | |
| | | | DL +68~ | 00100+V2 | 01****** | ******** |
| | | | DL -1~-3 | 001**+V2 | 10****** | |
| | | | DL -4~-67 | 00100+V2 | 11****** | ******** |
| | | | DL -68~ | 00100+V2 | | ******** |
| V | P | VP MODE | VP+DL +0~+3 | 010**000 | | 1~3 BYTES CONSTRUCTION |
| | | | DL +4~+67 | 01100000 | 00****** | |
| | | | DL +68~ | 01100000 | 01****** | |
| | | | DL -1~-3 | 011**000 | | |
| | | | DL -4~-67 | 01100000 | 10****** | |
| | | | DL -68~ | 01100000 | 11****** | |
| P | N (NULL) | PN MODE | PN | 01100100 | | 1 BYTE CONSTRUCTION |

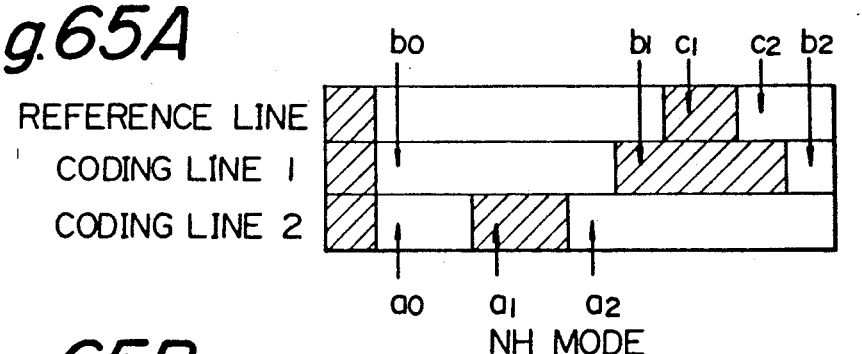
Fig.65A NH MODE
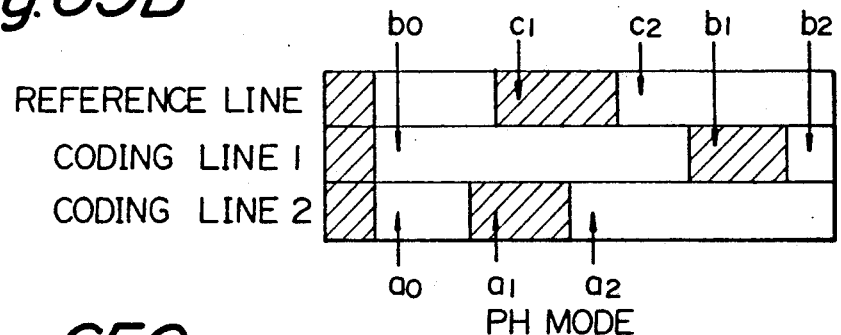
Fig.65B PH MODE
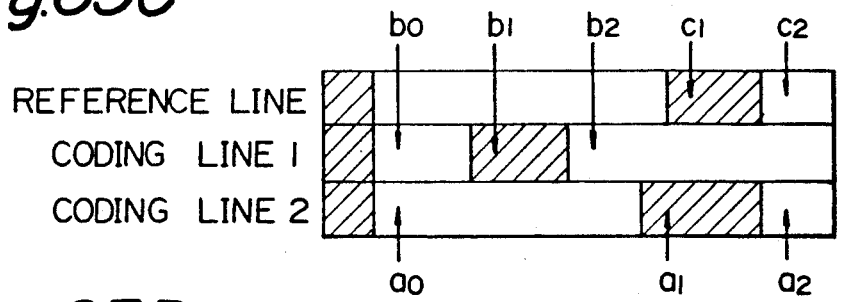
Fig.65C HP MODE
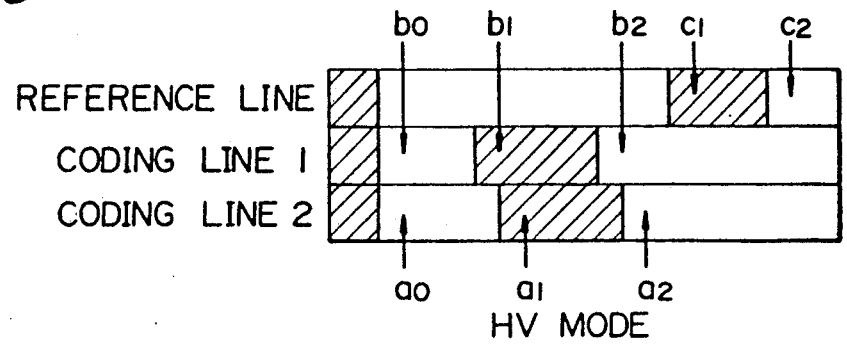
Fig.65D HV MODE

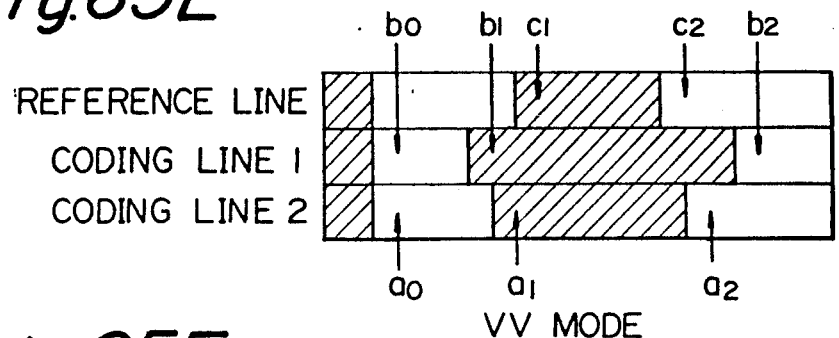
Fig. 65E — VV MODE
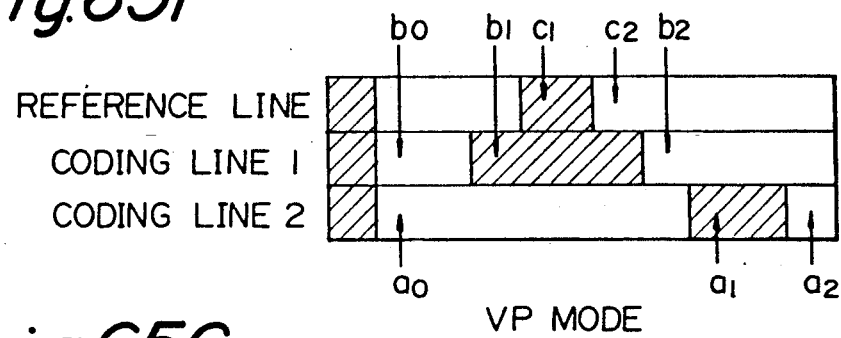
Fig. 65F — VP MODE
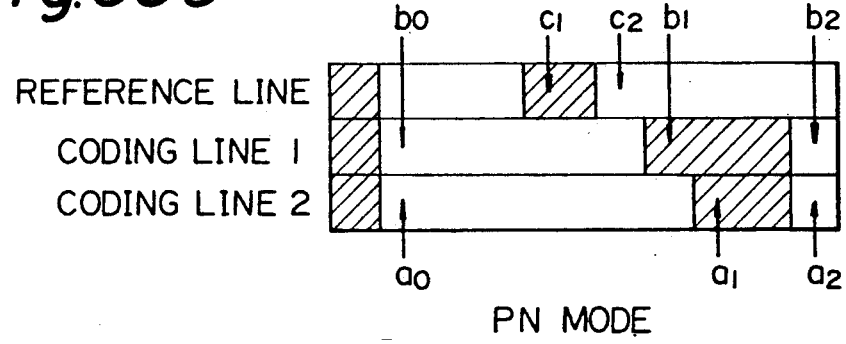
Fig. 65G — PN MODE

NH MODE

NP MODE

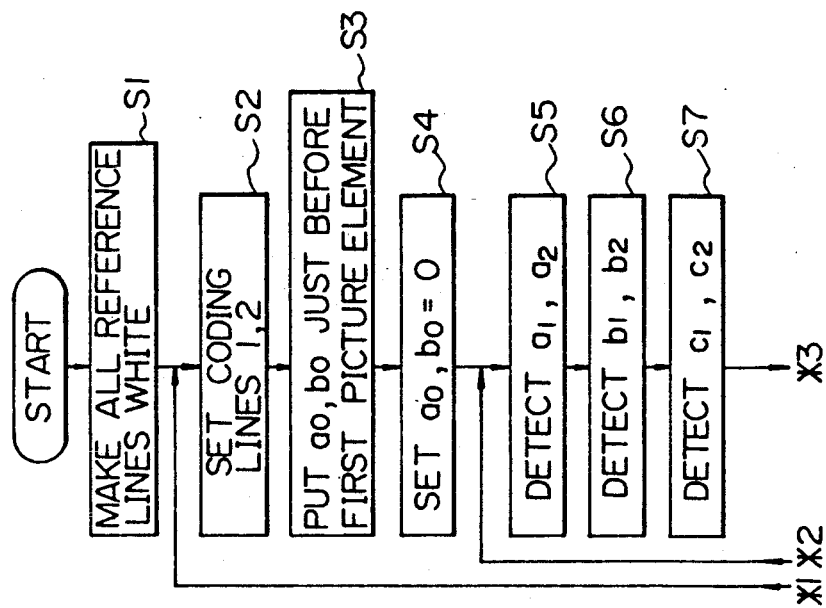

DATA COMPRESSION SYSTEM

BACKGROUND OF THE INVENTION

1. Field of the Invention

The present invention relates to a data compression system for compressing given data by a coder.

In facsimiles and optical disk file systems etc., if data obtained by reading document data is sent to the other party or stored in an output file as is, the amount of data transmitted to the other party or the amount of stored data of the output file becomes tremendous. Therefore, the method used for a long time now has been to process the above given data to enable considerably faithful reproduction of the original given data even with a small amount of data transmission or a small amount of data storage. This processing is called data compression.

2. Description of the Related Art

In the past, use has been made of the Modified Huffman coding system (MH coding system) as an internationally standard one-dimensional compression system of binary picture image data and the Modified Modified Relative address designate coding system (MMR coding system) as an internationally standard two-dimensional compression system of binary picture image data. Further, there are the predictive coding system and the universal coding system, as represented by the Ziv-Lempel code, for compression of character code data.

Details of these above various types of data compression systems are given later, but there are disadvantages to the data compression systems, as follows:

i) In the MH coding system, the degree of data compression is low, so sufficient data compression cannot be expected with this system alone.

ii) In the MMR coding system, there are two disadvantages:

The first disadvantage is that since the MMR system codes changing picture elements one by one, when the resolution rises, there is the problem that the amount of the codes increases substantially in proportion to the resolution. For example, when the resolution rises twice as high, the number of picture elements in the main scanning direction doubles and the number of sub scanning lines double. The number of changing picture elements on the sub scanning line remains substantially the same as before the resolution rises, so the number of changing picture elements substantially doubles and the amount of codes becomes about twice as much. It may be considered that the inherent amount of data of the picture does not increase in proportion to the resolution. Along with the rise in the resolution, the MMR system features a reduction in the compression efficiency with respect to the inherent amount of the picture image data.

The second disadvantage is that shaded pictures become screen dot pictures in digital pictures and the halftones are expressed by the area density of black picture elements. Screen dot pictures involve vast numbers of changing picture elements as the screen dots are dispersed over the screen as a whole, so in the MMR system, effective compression was not possible.

iii) In the predictive coding system, there were the following two disadvantages:

The first disadvantage was that when the resolution increased, predictive functions were required corresponding to each resolution and if the predictive functions were used as they were, the efficiency of prediction would fall and a sufficient compression ratio could not be obtained.

The second disadvantage was that, in screen dot pictures, compression was possible if use was made of predictive functions tailored to the screen dot pictures for compression, but when compressing screen dot pictures of various *cycles and shapes, compression was not possible with predictive functions tailored to specific screen dots.

iv) In the universal coding system, a high data compression ratio could be obtained, but the amount of calculation required for the processing for the compression became larger.

SUMMARY OF THE INVENTION

Therefore, the object of the present invention is, in consideration of the disadvantages mentioned above, to provide a data compression system with much greater efficiency, in particular, a data compression system which remarkably improves the data compression ratio with respect to picture image data including patterns having regularity.

To achieve the above object, the data compression system of the present invention includes a data generating means for supplying original data to be compressed; a universal coding means for coding the data and producing compressed data; and a fixed length coding means which is inserted between the data generating means and the universal coding means, detects types of modes, hereinafter referred to as the mode classifications, and the mode conditions of changing picture elements appearing when sequentially scanning the original data, and transforms the code words expressing pairs of mode classifications and mode conditions detected into fixed length code words.

BRIEF DESCRIPTION OF THE DRAWINGS

The above object and features of the present invention will be more apparent from the following description of the preferred embodiments with reference to the accompanying drawings, wherein:

FIG. 1 is a list of terminating codes in the MH coding system;

FIG. 2 is a list of makeup codes in the MH coding system;

FIG. 4 is a list showing the mode classifications and definitions of the mode classifications in the MMR coding system;

FIG. 5 is an explanatory view of code words in the MMR coding system;

FIG. 6A and FIG. 6B are flow charts for showing the coding processing in the MMR coding system;

FIG. 7 is a view for explaining the predictive coding system;

FIG. 8 is a block diagram showing an example of a data compression apparatus based on the adaptive predictive coding system;

FIG. 12 is a list showing the allocation of fixed length code words transformed by the code transforming unit;

FIG. 13 is a list showing an example of a terminating code according to the present invention;

FIG. 14 is a list showing an example of a makeup code according to the present invention;

FIG. 16 is a list showing another allocation of fixed length code words according to the present invention;

FIG. 24A and FIG. 24B are flow charts showing in detail a first step in the flow chart of FIG. 23;

FIG. 25 is a view showing an example of a code word of a fixed length transformed in the first step in the flow chart of FIG. 23;

FIG. 28A and FIG. 28B are views for explaining the code words rearranged by the second step of FIG. 23;

FIG. 30C is a view showing the array of code words stored in the storing means 36 of FIG. 21;

FIG. 31 is a view showing an example of allocation of 2-byte fixed length code words in a modified MMR coding system;

FIG. 32 is a view for explaining the state of connection of contours;

FIGS. 37A and 37B are flow charts of the rearranging processing of the changing point modes in a list in the second example;

FIG. 41A, FIG. 41B, and FIG. 41C are views for explaining the operation of the third example;

FIG. 42A is a view illustratively showing the modea of data expression in the memory in the third example;

FIG. 42B is a view showing an example of the mode of learning of starting point information;

FIG. 43 is a principle block diagram showing a fourth example based on the first modified embodiment;

FIG. 45 is a view showing the detailed constitution based on the fourth example;

FIGS. 48A, 48B and 48C are views for explaining the second modified embodiment;

FIGS. 49A, 49B and 49C are views for explaining the fifth example;

FIG. 50 is a general flow chart of the data compression processing in the second modified embodiment;

FIG. 52 is a view showing an example of allocation of fixed length mode codes, RL codes, and DL codes;

FIG. 53 is a view illustrating the picture image data obtained by the flow charts of FIG. 24A and FIG. 24B;

FIG. 54 is a view illustrating the picture image data after rearranging processing is performed on the picture image data of FIG. 53;

FIG. 55A, FIG. 55B, and FIG. 55C are views showing the memories for storing data of the mode information group, RL information group, and DL information group;

FIG. 57 is a view illustrating the picture image data separated into contour units by the processing of FIG. 28A and FIG. 28B;

FIG. 58 is a view illustratively showing the picture image data after rearranging processing is performed on the picture image data of FIG. 57;

FIG. 59A, FIG. 59B, FIG. 59C and FIG. 59D are views showing the memories for storing data of the mode information group, RL information group, and DL information group;

FIG. 63 is a view showing an example of a fixed length code word transformed by the first step in the flow chart of FIG. 62;

FIG. 64A and FIG. 64B are lists showing allocation of fixed length code words by rearrangement into two-line packages;

FIG. 65A to FIG. 65G are views illustrating the types of changing picture element modes used in the two-line package system;

FIG. 67A and FIG. 67B are flow charts showing the detailed operational processing of the two-line package system.

DESCRIPTION OF THE PREFERRED EMBODIMENTS

Before describing the embodiments of the present invention, the related art and the disadvantages therein will be described with reference to the related figures.

FIG. 1 is a list of terminating codes in the MH coding system; and FIG. 2 is a list of makeup codes in the MH coding system.

The MH coding system compresses data by variable length coding of the run lengths of white or black along the main scanning lines using Huffman codes. The Huffman codes are constituted by terminating codes (FIG. 1) showing lengths of up to 64 and makeup codes (FIG. 2) showing multiples of 40 so as to reduce the number of code words. The usual picture image data can be compressed to a fraction of the same by this MH coding system.

Figure 3:
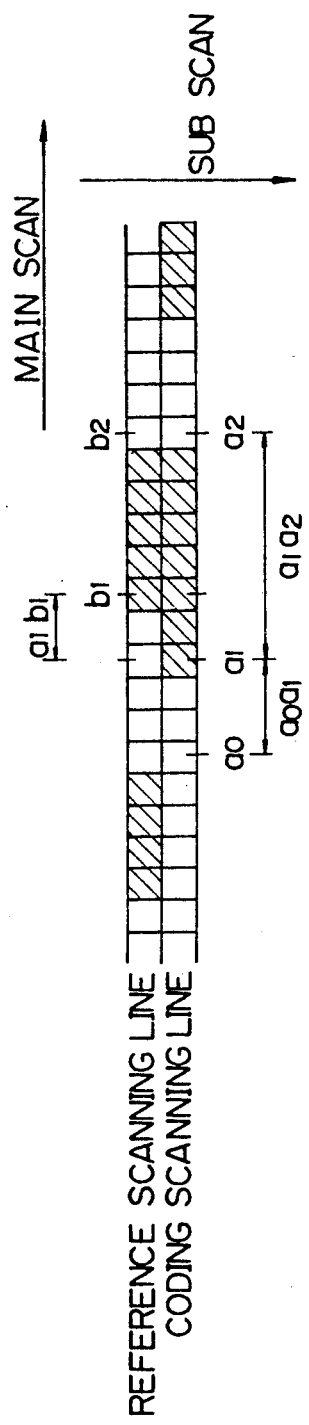
FIG. 3 is a view for clarifying the meaning of changing picture elements in the MMR coding system.
Figure 6B:
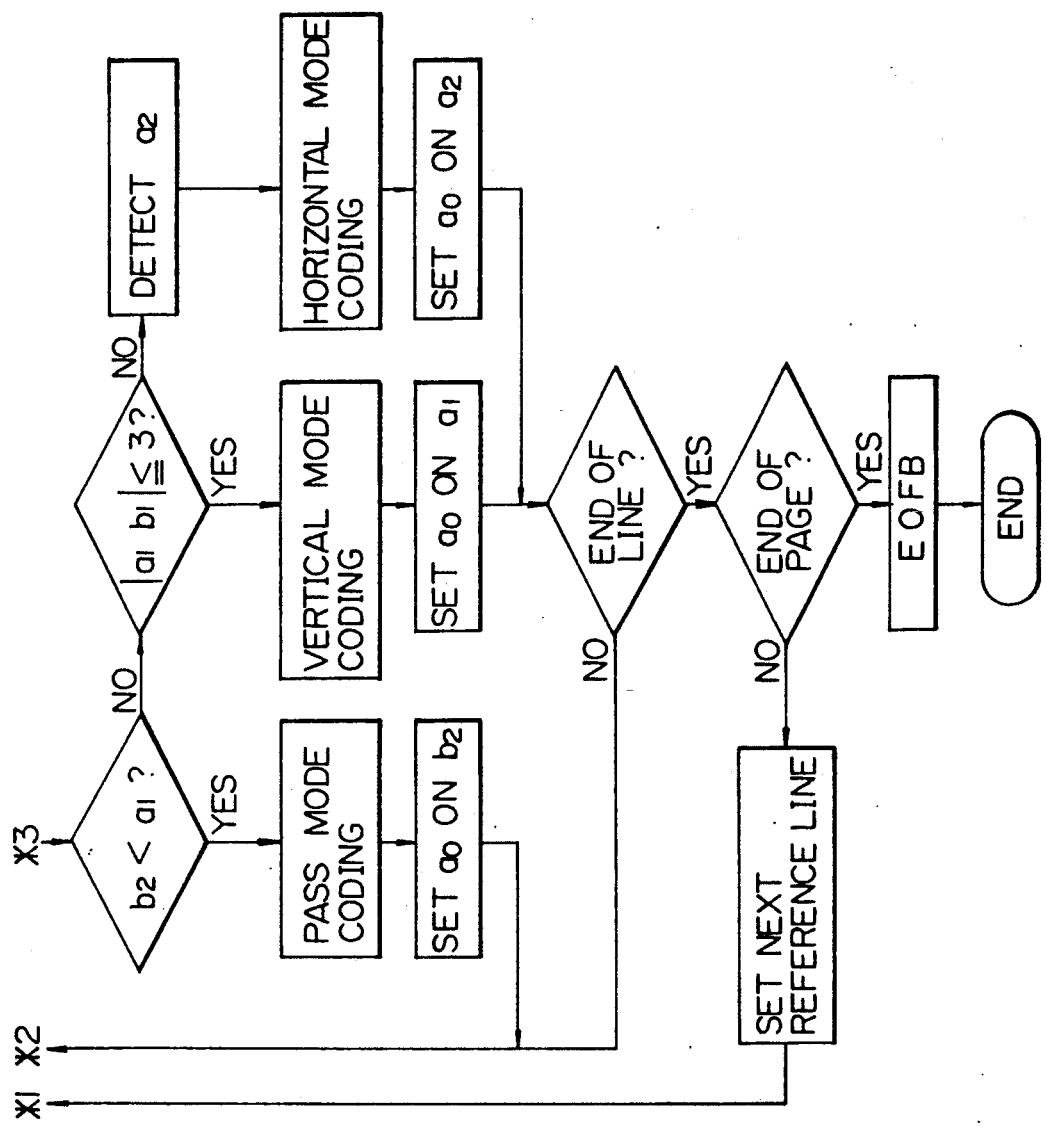

FIG. 3 is a view for clarifying the meaning of changing picture elements in the MMR coding system; FIG. 4 is a list showing the mode classifications and definitions of the mode classifications in the MMR coding system; FIG. 5 is an explanatory view of code words in the MMR coding system; and FIG. 6A and FIG. 6B are flow charts for showing the coding processing in the MMR coding system.

The MMR coding system defines as changing picture elements those elements which change in color (white or black) from the previous picture element on the same scanning line, defines three types of modes: a pass mode, vertical mode, and horizontal mode, from the positional relation of the changing picture elements on the adjoining main scanning lines, and performs coding in accordance with these modes so as to compress data. By this MMR coding system, normal picture image data can be compressed from one-half to less than a tenth of its size. Note that, as will be understood from FIG. 5, even in the MMR coding system, use is made of the MH coding system for the horizontal mode. Further, the modified relative address designate coding system (MR coding system) used in the same way as the MMR coding system enables reduction of the effects of error during coded transmission by coding using the MMR coding system while inserting MH coding system coding every fixed number of lines.

In FIG. 3, the picture elements $a_0$, $a_1$, $a_2$, $b_1$, and $b_2$ are defined as follows:

$a_0$: The reference or starting changing picture element on the coding scanning line, whose position is determined by the coding mode just before. At the start of the coding scanning line (left end), $a_0$ is an imaginary element situated just before (to the left of) the first picture element.

$a_1$: The next changing picture element to the right of $a_0$ on the coding scanning line.

$a_2$: The next changing picture element to the right of $a_1$ on the coding scanning line.

$b_1$: The next changing picture element on the reference scanning line to the right of $a_0$ and of the same color as $a_1$.

$b_2$: The next changing element on the reference scanning line to the right of $b_1$.

However, when there is no $a_1$, $a_2$, $b_1$, or $b_2$ other than $a_0$, these are considered imaginary picture elements situated just after (to the right of) the latest (right end) picture element on the scanning line.

In FIG. 5, further, i) M(·) shows an MH code word. White and black are determined by their respective colors.

ii) In the expansion mode, XXX=111 designates the noncompression mode.

iii) In EOL, T=1 when the next scanning line is of one-dimensional coding and T=0 when two-dimensional.

Note that the flow charts of processing of FIG. 6A and FIG. 6B are similar to the flow charts of processing of the present invention explained later, so a detailed explanation of the flow charts of processing of FIG. 6A and FIG. 6B will be omitted here.

FIG. 7 is a view for explaining the predictive coding system. As shown in the figure, the predictive coding system takes the already coded reference picture elements around the picture element in question which is to be coded, predicts the black or white color of the picture element in question from the black/white state of the reference picture elements, and codes the predictive error. In this predictive coding system, if use is made of the optimal predictive function for the type of data, one can obtain a data compression ratio of the same high level as the MMR system with normal document data, it is known.

However, when the digitalized picture covered by the coding operation is a screen dot picture (where a shaded picture is expressed as a digitalized picture by modulation of the area of the black picture elements), there are various types of screen dots and the pitch of the screen dots cannot be understood in advance in most cases, so effective data compression cannot be achieved with predictive functions tailored to particular screen dots. Therefore, when compressing the data of a screen dot picture, the so-called adaptive predictive coding system is adopted wherein a number of predictors using various screen dot pitches as reference picture elements are arranged, the predictor giving the least frequency of prediction failure is selected, and the coding is performed in accordance with the thus selected predictor.

FIG. 8 is a block diagram showing an example of a data compression apparatus based on the adaptive predictive coding system. As shown in the figure, for example, two predictors are arranged, each with different screen dot pitches, and the predicted values are sought. Then two correspondingly provided prediction failure counters count the prediction failures of the predictors for an interval of a fixed number of input signals and a comparator is used to find which of the number of prediction failures of the predictors is smaller. In accordance with the results, in the next interval, a multiplexer is selected and the prediction error signal from the predictor with the smaller prediction failures is coded. Note that this adaptive predictive coding system is explained in detail in Technical Research Report IE80-12 of the Institute of Electronics and Communication Engineers "Adaptive Predictive Coding for Newspaper Screened Photographs". In general, document data includes not only picture image data, but also character data in many cases. This character data is compressed after being transformed into character code data. For the compression of this character code data, use is made of a universal coding system such as the Ziv-Lempel code. In the Ziv-Lempel code, two algorithms, a universal type and incremental parsing type, are proposed (for details, see, for example, Seiji Munakata: Ziv-Lempel Data Conversion, Information Processing (Joho Shori), Vol. 26, No. 1 (1985)).

Figure 9:
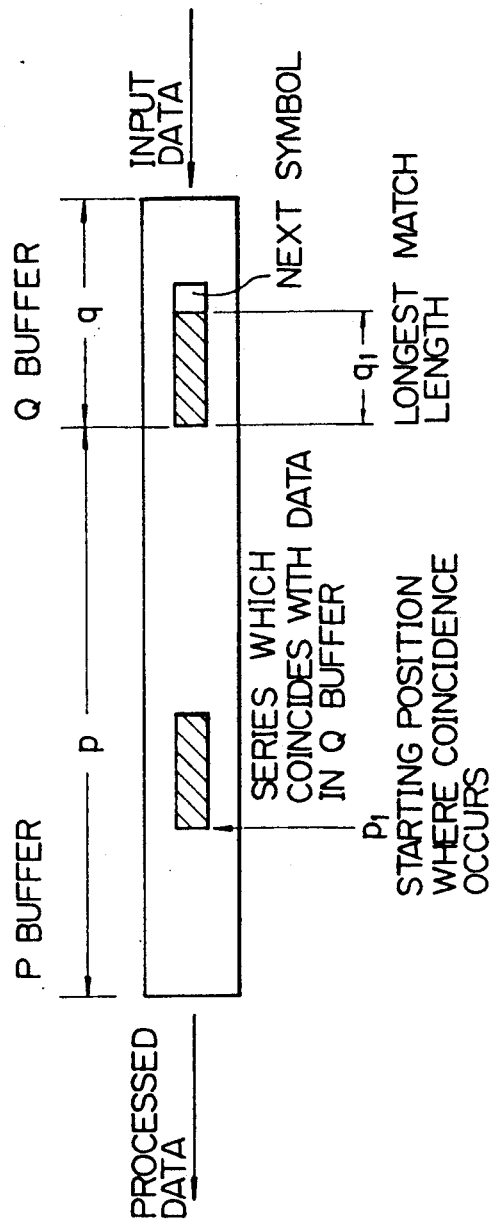
FIG. 9 is a view illustrating a universal type algorithm.

FIG. 9 is a view illustrating a universal type algorithm.

The universal type algorithm in the Ziv-Lempel code divides coding data into series of maximum matching lengths starting from any position of a past data series and codes by replication of the past series. Specifically, as shown in FIG. 9, provision is made of a P buffer for storing already coded input data and a Q buffer for storing data to be coded from now. All the partial series of the data series of the Q buffer and the data series of the P buffer are compared and the partial series of the maximum matching length in the P buffer is found. Then, the partial series with the maximum length in the P buffer is designated by coding the set of the "starting position of the maximum length partial series", the "matching length", and "the next symbol causing a mismatch". Next, the coded data series in the Q buffer is transferred to the P buffer and a new data series of a coded data series in the Q buffer is input. After this, the same processing is repeated, whereby the data is broken down into partial series and coded.

In a universal type algorithm in the Ziv-Lempel code, as mentioned before, there is the disadvantage of a large amount of calculation, though the data compression ratio is high. Therefore, an incremental parsing type of algorithm was thought of in the Ziv-Lempel code, where the input data series is incrementally broken down and coded. In this incremental parsing type of algorithm of the Ziv-Lempel code, if the input data series is made:

$$x = a a b a b a b a a \ldots$$

this "x" is incrementally broken down as $$x = a \cdot ab \cdot aba \cdot b \cdot aa \ldots$$

in accordance with the maximum length series of the previously analyzed component minus the right end symbol, and the incrementally broken down component series are coded expressed as "indexes of the order of appearance of the components" and "next symbols". Explaining this by the above example, the input data series "x" is broken down into the component series "X", where $$X = X_0 X_1 X_2 X_3 X_4 X_5 \ldots$$

$x_0 = \lambda$, $X_1 = x_0 a$, $X_2 = X_1 b$, $X_3 = X_2 a$, $X_4 = x_0 b$, $X_5 = X_1 a$, where $\lambda$ is an empty row.

In these universal coding systems, the data to be processed is expressed broken down into components. As opposed to this, character data has periodic regularity in byte units. If coding character data by the universal coding system, character code data could be efficiently compressed by effectively coding long bit patterns of character codes which repeat periodically.

The data compression based on the above conventional coding systems had the above-mentioned disadvantages and further were not amenable to significant improvements in the data compression ratio, particularly the data compression ratio for picture image data. The present invention was made in consideration of the above circumstances. Below, a detailed explanation will be given, referring to the figures, of the principle of the invention, an embodiment, first, second, and third modified embodiments, and first to fifth examples based on the first modified embodiment.

Figure 10:
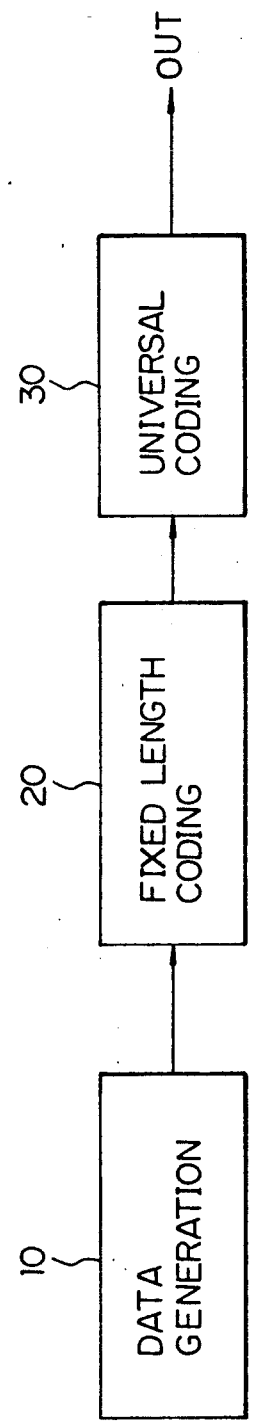
FIG. 10 is a view showing the principle and constitution of the present invention.

FIG. 10 is a view showing the principle and constitution of the present invention. In the figure, reference numeral 10 is a data generating means, from which original data is supplied. For compression of this original data, provision is made of a universal coding means 30. The characteristic feature of this invention is a fixed length coding means 20 provided at the stage before the universal coding means 30 in the figure. When coding picture image data, the time series data of fixed length code words obtained by the fixed length coding means 20 is coded in accordance with a universal coding system by the universal coding means 30.

In this case, the fixed length coding means 30 may be constructed so as to code by allocating fixed length code words for run length codes of the MH coding system or may be constructed so as to code by allocating fixed length code words for different run length codes and mode classifications of the MR coding system.

That is, when compressing picture image data, picture image data read by a line image sensor etc. is processed so as to be input to the fixed length coding means 20. When the picture image data is received, the fixed length coding means 20 either allocates fixed length code words for run length codes of the MH coding system or allocates fixed length code words for the run length code words and mode classifications of the MR coding system, as mentioned before, thus performing processing for allocation of fixed length code words for picture image data input in a form reflecting the statistical nature of the picture image data. Then the fixed length coding means 20 inputs the fixed length code words which are sequentially allocated into the universal coding means 30, and the universal coding means 30 codes the time series data of the fixed length code words in accordance with the universal coding system. This processing enables highly efficient data compression of picture image data using the periodic regularity of the fixed length code words extracted from the picture image data.

Figure 11:
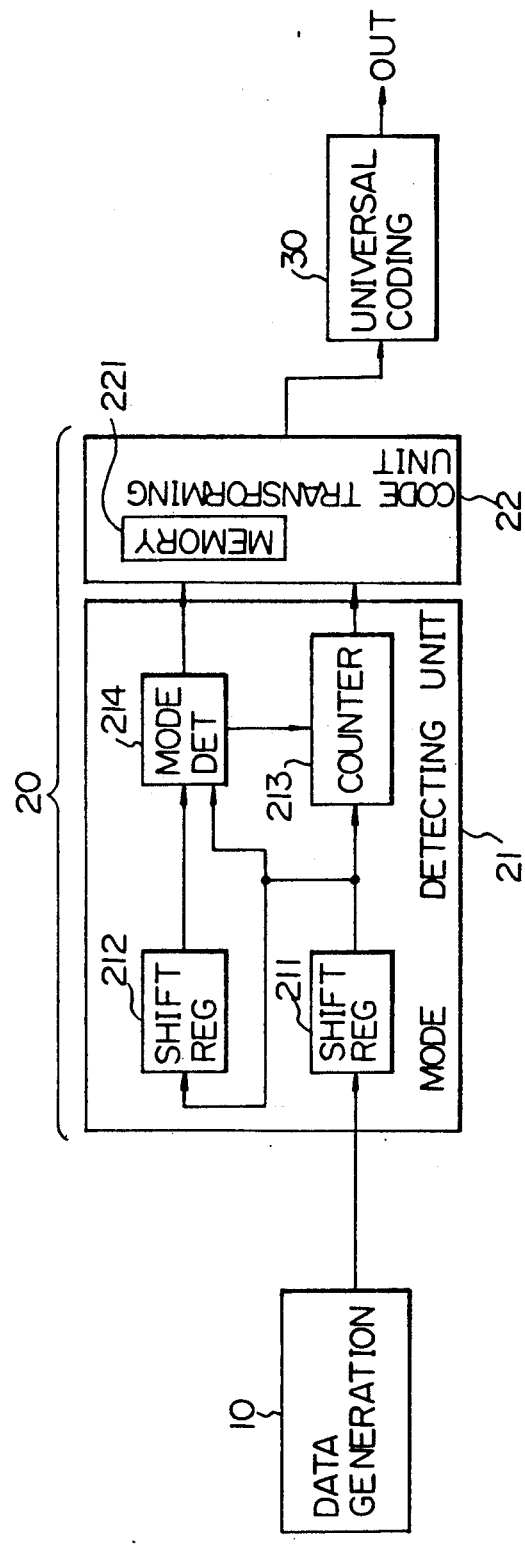
FIG. 11 is a block diagram showing an embodiment of the present invention.

FIG. 11 is a block diagram showing an embodiment of the present invention. As shown, the fixed length coding means 20 includes two blocks 21 and 22. That is, the means 20 may be roughly split into a mode detecting unit 21 and a code transforming unit 22.

Specifically, the mode detecting unit 21 includes a first shift register 211, a second shift register 222, a run-length counter 213, and a mode detecting unit 214. Further, the code transforming unit 22 includes a memory 221.

The first shift register 211 stores black/white information of one line's worth of picture image data to be coded, the second shift register 212 stores black/white information of picture image data stored in the first shift register at the preceding processing cycle, the run-length counter 213 receives as input, one element at a time, the black/white information of the picture elements of the present line from the first shift register 211 and counts the run length of the successive write or black information, the mode detecting unit 214 detects which mode the picture elements of the first shift register 211 being processed are, i.e., the pass mode, vertical mode, and horizontal mode, in the MMR coding system from the connecting relationship of the changing picture elements between the first shift register 211 and the second shift register 212, while the memory 221 performs the processing for reading fixed length code words specified by the run-length value counted by the run-length counter 213 and the mode classifications detected by the mode detecting unit 214.

The above-mentioned memory 221 outputs the time series data of the fixed length code words.

FIG. 12 is a list showing the allocation of fixed length code words transformed by the code transforming unit. Note that in the list, an example is shown of the case where it is assumed that the character codes which are frequently input together with the picture image data have an 8 bit length. The following allocation is performed:

The white run length terminating code of the Huffman code of the MH coding system explained with reference to FIG. 1 is given the fixed length code words "0" to "63", the black run length terminating code of the Huffman code explained in FIG. 1 is given the fixed length code words "64" to "127", the white run length makeup code of the Huffman code explained in FIG. 2 is given the fixed length code words "128" to "167", the black run length makeup code of the Huffman code explained in FIG. 2 is given the fixed length code words "168" to "207", and the modes of the MMR coding system explained in FIG. 4 are given the fixed length code words "208" to "216". Note that for the horizontal mode, the fact that the mode is horizontal is known by the use of the Huffman code of the MH coding system, so the above may be omitted.

FIG. 13 is a list showing an example of a terminating code according to the present invention; and FIG. 14 is a list showing an example of a makeup code according to the present invention. These correspond to FIG. 1 and FIG. 2, respectively.

Next, an example of the use of the present invention will be explained.

In a document handled by a facsimile, optical disk file system, etc., character code data and picture image data are often mixed together. In such a case, in consideration of the fact that the character code data and picture image data differ considerably in nature as binary data, in the past use has been made of coders employing different coding systems for separate coding. Therefore, it would be extremely convenient if character code data and picture image data could be coded by the same coder. Thus, it is necessary to devise means for coding character code data and picture image data by the same coder while improving the data compression ratio.

In the past, picture image data has been compressed by the MH coding system or the MMR coding system, while character code data has been compressed by the universal coding system. That is, the universal coding system is a data storage type data compression method and does not assume in advance the statistical nature of the source of information at the time of data compression, so could be used for compression of various types of data, but in picture image data, there are no boundaries of symbols, so various types of patterns appear evenly and an effective compression ratio cannot be obtained. Further, the MMR coding system compresses data using two-dimensional correlation of picture image data, while the existing universal coding system only uses one-dimensional correlation, so the compression ratio drops. Therefore use has been made of the MH coding system and MMR coding system for data compression of picture image data, which offer higher compression ratios, rather than using the universal coding system.

In the past, as mentioned above, there has been the inconvenience of having to provide two types of coders: a universal coder for data compression of character data and an MH coder for data compression of picture image data (or an MMR coder).

Therefore, by using the present invention, it is possible to effectively compress data by a single universal coder by preprocessing the picture image data to harmonize the differences in statistical properties with the character code data.

Figure 15:
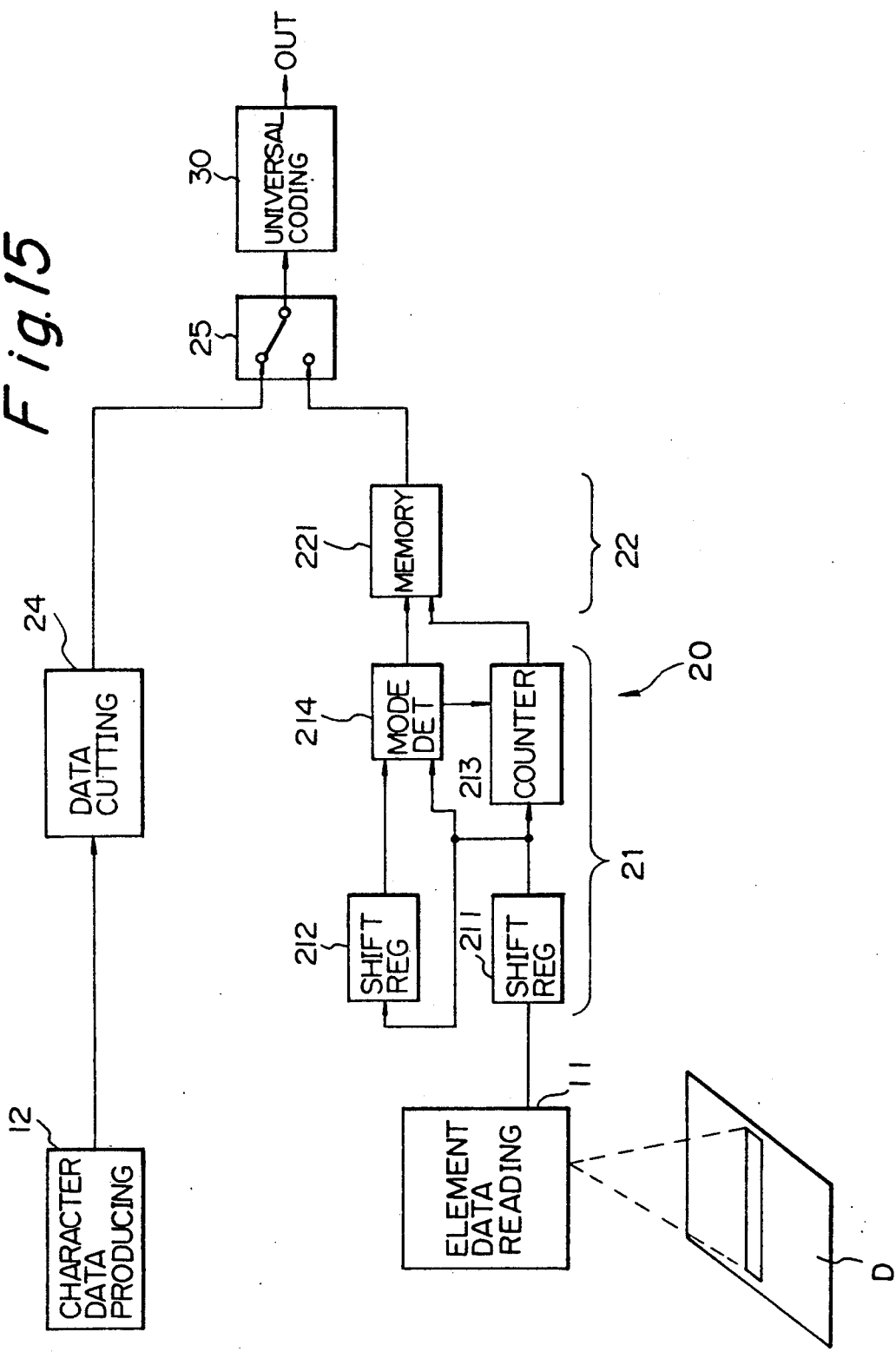
FIG. 15 is a constitutional view showing an example of use of the present invention.

FIG. 15 is a constitutional view showing an example of use of the present invention. Note that throughout the drawings, the same elements are shown by the same reference numerals or symbols. In the figure, D is a document on which is recorded picture and character document data; 11 is a picture element data reading unit (data generating means 10) which performs processing for successively reading picture image data on a document D by a line image sensor, for example, in accordance with the direction of the main scanning line; 12 is a character data producing unit (data generating means 10) which produces the document described by the character code; and 24 is a processing-unit data cutting means which successively cuts out from the character code data prepared by the character data producing unit 12 data having the same bit length as the bit length of the character code (for example, 8 bits) as processing units of data. Reference numeral 20 is the fore-mentioned fixed length coding means. Reference numeral 30 is the forementioned universal coding means, which codes either the time series data of the processing units of data cut out by the processing-unit data cutting means 24 or the time series data of the fixed length code words read out from the memory 221 in accordance with a Ziv-Lempel code or other universal coding system; and 25 is a switching means, which, when coding character code data, inputs the processing units of data cut out by the processing-unit data cutting means 24 into the universal coding means 30 and, when coding picture image data, inputs fixed length code words output from the fixed length coding means 20 into the universal coding means 30.

Next, an explanation will be made of the operational processing.

When coding character code data, the user sets the switching means 25 to the processing-unit cutting means 24 side. If the processing-unit data cutting means 24 is selected, the character data code of the character data prepared by the character data producing unit 12 is successively input to the processing-unit data cutting means 24. When this character code data is received, the processing-unit data cutting means 24 successively cuts out bit patterns serving as processing units of data every bit length, that is, 8 bits, of the character code from the character code data and inputs the same to the universal coding means 30. The universal coding means 30 codes the time series data of the processing units of data in accordance with the universal coding system. This processing makes it possible to compress character code data with a high efficiency utilizing the periodical regularity of byte units of character code data.

The processing of picture image data is as previously explained, but will be explained in more detail here. If the black/white information of one line's worth of picture image data to be coded is stored in the first shift register 211 and black/white information of picture image data of the previous scanning line is stored in the second shift register 212, the mode detecting unit 21 refers to the data stored in the first and second shift registers 211 and 212 and detects from the positional relationship of the changing picture element $a_1$ to be coded, explained in FIG. 3, and the adjoining changing picture element if the mode is the pass mode, vertical mode, or horizontal mode of the MMR coding system. At this time, if the horizontal mode, the run-length counter 213 counts the run-length required for coding. Then, the memory 22 receives the detected mode classification and run length value, then specifies the corresponding code word from among the fixed length code words shown in FIG. 12, and inputs the same to the universal coding means 20.

If fixed length code words of 8 bits specified from the picture image data are sequentially input in this way, the universal coding means 30 universally codes the time series data of the 8-bit fixed length code words in accordance with a Ziv-Lempel code universal type algorithm or incremental parsing type algorithm in accordance with processing the same as for the processing units of data input from the processing-unit data cutting means 24. This coding processing by the universal coding means 30 realizes a highly efficient data compression even with picture image data—the same as for character data, using the periodic regularity of fixed length code words extracted from picture image data.

In this way, in the present invention, consideration was given to the fact that for picture image data, there is no periodic regularity in the bit patterns cut out with the bit lengths of character codes and therefore the data compression ratio cannot be raised by universal coding. The construction was adopted, therefore, of coding by a universal coding means 30 after coding into fixed length code words having periodic regularity.

That is, in the past, picture image data was compressed by transforming data which could be easily expressed as fixed length code words into short code words and transforming data which could not into long words in a thus variable length coding processing, but in the present invention use is made of the regularity of the obtained fixed length code words to compress data with a higher compression ratio by the universal coding means 30.

In FIG. 15, an explanation was made of the case where the user manually switched the switching means in accordance with the object of the processing, but it is of course possible to provide two universal coding means 30, find in parallel the universal code of the processing units of data of the processing-unit data cutting means 24 and the universal code of the code words of the fixed length coding means 20 in accordance with the two units, and select the one of the least size for output, whereby the user need no longer switch the switching means 25 and mixtures of character code data and picture image data can be dealt with.

As explained above, according to the constitution of FIG. 15, character code data is compressed into 8 bit units by universal coding, while picture image data is compressed by universal coding after transforming it into fixed length code words of 8-bit units with matching statistical properties, so data with different natures can be compressed by a higher compression ratio than with a single universal coder. Further, by producing fixed length code words corresponding to the MH coding system or MMR coding system, it becomes possible to effectively compress series with similar run lengths, screen dot pictures with similar connecting relationships of changing picture elements with the preceding line, etc.

The present invention is not limited to fixed length code words which are allocated one to one with respect to the MMR coding system or MH coding system codes. These may be allocated one to one with respect to compressed codes using the run length or other statistical properties. At this time, if 8 bits are insufficient, use is made of other code allocations.

FIG. 16 is a list showing another allocation of fixed length code words according to the present invention. As shown in the figure, it is possible to use two bytes and express run lengths from "0" to "127" by a first byte with "0" as the head bit and express run lengths from "128" to "16383" by the second byte with "1" as the head bit.

Further, the explanation was made assuming one to one allocation of fixed length code words with respect to the codes of the MMR coding system, but with a one to one allocation with respect to the codes of the MH coding system, the fixed length coding means 20 does not require provision of the second shift register 222 and the mode detecting unit 214. In this case, the memory 221 may read out corresponding fixed length code words in accordance with run length values obtained by the run length counter 53.

Figure 17:
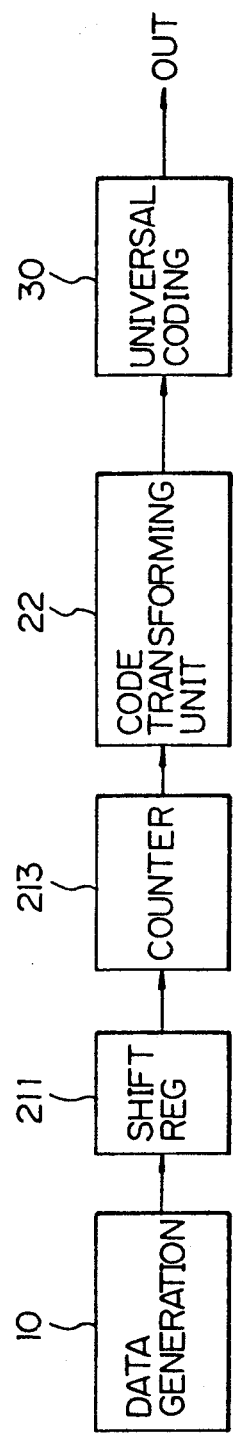
FIG. 17 is a view showing an example of a mode detector in the case of use of the MH coding system.

FIG. 17 is a view showing an example of a mode detection unit in the case of use of the MH coding system. The mode detecting unit 21 of FIG. 17 includes a first shift register 211 and a run length counter 213. The code transforming unit 22 outputs fixed length code words corresponding to the run length count and applies the same to the universal coding means 30.

Further, in the above explanation, the case was shown of the use for picture image data read by a picture image data reading means 10 such as a facsimile, but it is also possible to use this for picture image data stored in a file. Further, the above explanation was made assuming the universal coding means 30 performed the universal coding processing according to Ziv-Lempel code universal type or incremental parsing type algorithms, but use may be made of other universal coding systems. For example, use may be made of an improved version of a universal type algorithm of the LZSS coding system (T. C. Bell, "Better OPM/L Text Compression", IEEE Trans. on Commun., Vol. COM-34, No. 12, Dec. (1986)) or an improved version of an incremental parsing type algorithm of the LZW coding system (T. A. Welch, "A Technique for High Performance Data Compression", Computer, June (1984)).

Next, an explanation will be made of a first modified embodiment.

Figure 18:
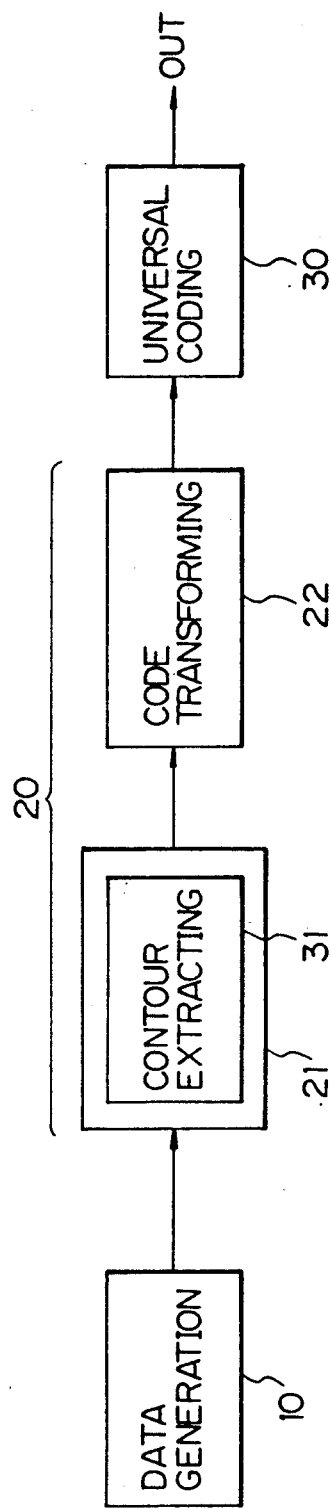
FIG. 18 is a block diagram showing the principle and constitution of a first modified embodiment.

FIG. 18 is a block diagram showing the principle and constitution of the first modified embodiment. In the first modified embodiment, fixed length code words are generated using as parameters the data forming contours in the picture image data. In FIG. 18, the block 31 is the contour extracting means which not only scans picture image data in line units, but also uses picture image data grouped by contours.

Specifically, the contour extracting means 31 may be constructed by a mode detecting means which detects, from the positional relationship between changing picture elements on a main scanning line to be coded and the changing picture elements on the adjoining main scanning line coded before the main scanning line, if the changing picture elements on the main scanning line to be coded belong to the horizontal mode for showing the start of the contour, belong to the vertical mode for showing connection of contours, or belong to the pass mode for showing the end of the contour. The changing picture elements on the main scanning line to be coded are coded by allocating fixed length code words, by the code transforming unit 22, in accordance with the mode classifications and mode conditions detected by the mode detecting means.

Figure 19:
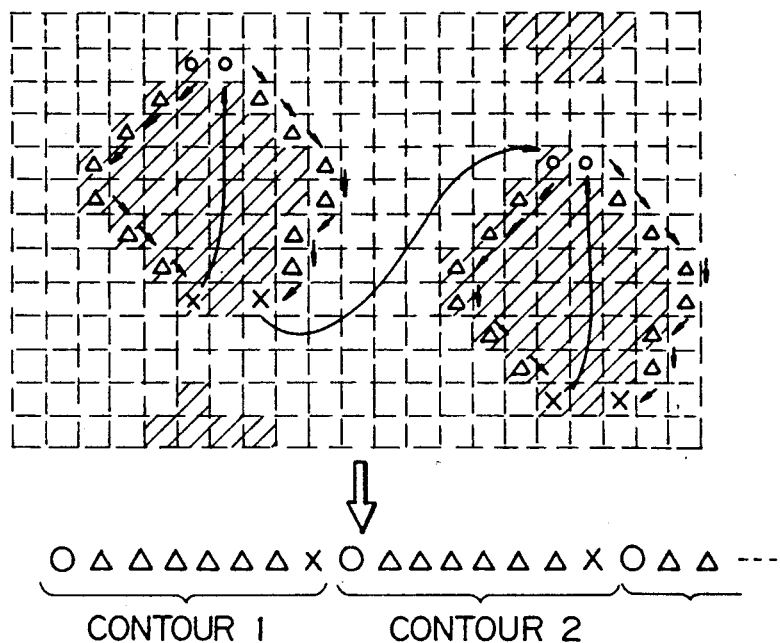
FIG. 19 is a pattern diagram for illustratively explaining the operation of a first modified embodiment.
Figure 20:
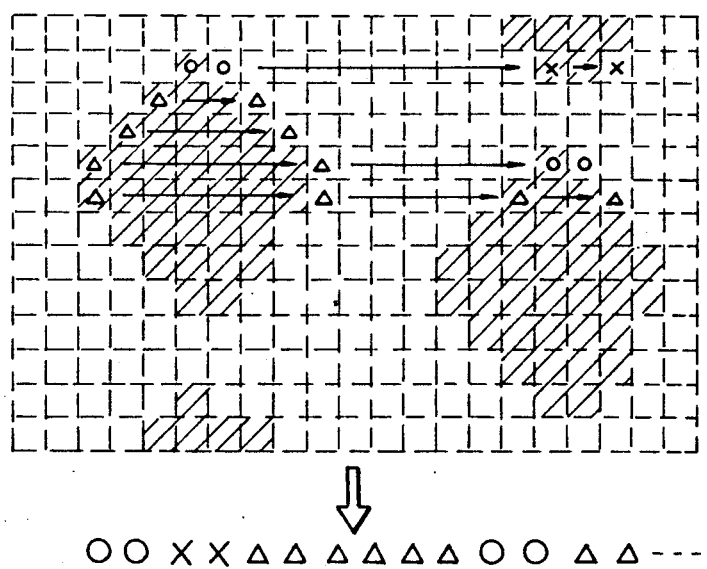
FIG. 20 is a pattern diagram for illustratively explaining the operation of an embodiment of the present invention.

FIG. 19 is a pattern diagram for illustratively explaining the operation of the first modified embodiment; FIG. 20 is a pattern diagram for illustratively explaining the operation of an embodiment of the present invention. By comparing the two drawings, the significance of the contours becomes clear. In the two drawings, the o marks indicate the starting points of the picture pattern, the Δ marks the connecting points, and the x marks the end points. In the first modified embodiment (FIG. 18), the picture image data is output in accordance with the contours of the picture pattern (see bottom of FIG. 19). As opposed to this, in the embodiment of the present invention (FIG. 11), the picture pattern is scanned in line units and picture image data is output as is in that order (see bottom of FIG. 20).

Figure 21:
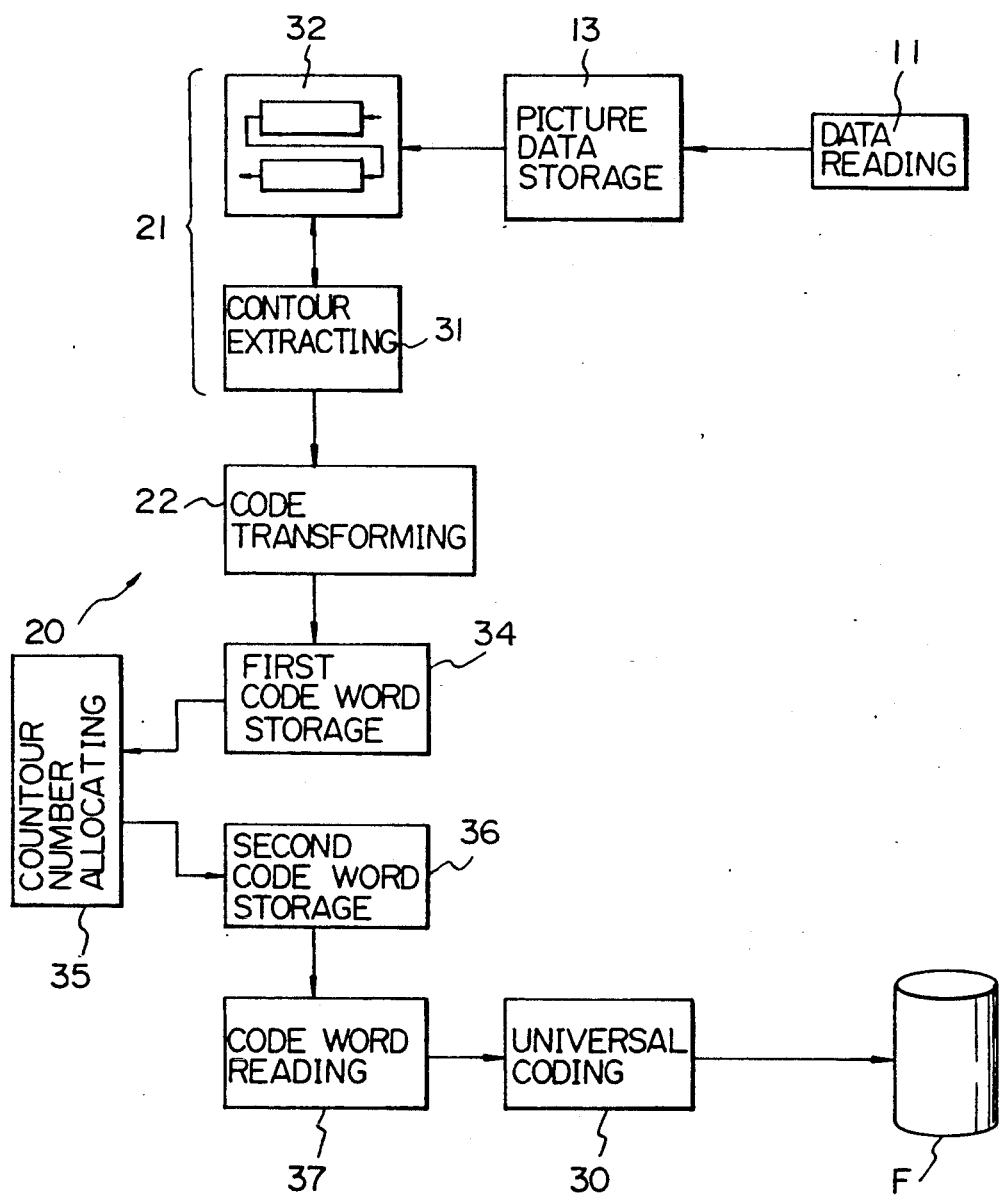
FIG. 21 is a block diagram showing a first example based on the first modified embodiment.

FIG. 21 is a block diagram showing a first example based on the first modified embodiment. In the figure, reference numeral 11 is a picture image data reading unit which reads the picture image data in good order in accordance with the main scanning lines, F is an output file which stores code words coded by the data compression system, 13 is a picture image data storage unit which stores a plurality of main scanning lines' worth of picture image data read by the picture image data reading unit 11, 32 is a two-line storing means which stores two lines' worth of picture image data successively output from the picture image data storage unit 13 by a shift register etc., 31 is a contour extracting means which refers to the data stored in the two-line storing means 32 to detect if the changing picture elements on the main scanning lines to be coded belong to the horizontal mode for showing the start of the contours, belong to the vertical mode for showing the connection of contours, or belong to the pass mode for showing the end of the contours, 22 is the fore-mentioned code transforming unit which codes the changing picture elements on the main scanning line to be coded by allocating fixed length code words corresponding to the mode classifications and mode conditions detected by the contour extracting means 31, 34 is a first code word storing means which stores code words coded by the code transforming unit 22 in accordance with the order on the main scanning lines, 35 is a contour number allocating means which allocates contour numbers to code words on the main scanning lines stored in the first code word storing means, 36 is a second code word storing means which stores code words coded by the code transforming unit 22 in accordance with the order of the contour number allocated by the contour number allocating means 35, 37 is a code word reading means which reads in good order the code words with the same contour numbers from the second code word storing means 36, and 30 is the fore-mentioned universal coding means which codes the time series data of the code words read out by the code word reading means 37 in accordance with the universal coding system.

In FIG. 21, the contour extracting means 31 refers to the two-line storing means 32 and judges from the relationship of the changing picture elements $a_1$, $a_2$, and $b_2$ explained in FIG. 10 that the changing picture element $a_1$ is in the pass mode if the relationship $$b_2 < a_1$$

stands, judges it is in the vertical mode if the relationships $$b_2 \geq a_1 \text{ and } a_2 \geq b_1$$

stand, and judges it is in the horizontal mode if the relationships $$b_2 \geq a_1 \text{ and } a_2 < b_1$$

stand. Further, the code transforming unit 22 allocates the specific fixed length code words for the pass mode, allocates fixed length code words corresponding to the number of picture elements of $a_1 b_1$ for the vertical mode, and allocates fixed length code words corresponding to the number of picture elements $a_0 a_1$ for the horizontal mode. The fixed length code words allocated in this way according to the mode classification and the mode conditions are stored in the order of the main scanning lines in the first code word storing means 34.

In accordance with the mode classification detected by the contour extracting means 31, the contours of the picture image data read by the picture image data reading unit 11 shift in the fashion of horizontal mode→vertical mode→pass mode starting from the horizontal mode code words, successively connecting by the vertical mode code words, and ending with the pass mode code words. The contour number allocating means 35 sequentially reads out the code words of the first code word storing means 34 in accordance with the direction of the main scanning line and stores the same in the second code word storing means 36, at which time the generation of new contours by the horizontal mode code words and the disappearance of contours by the pass mode code words are detected. At the same time the code words arranged in the order of detection on the main scanning line are rearranged so that those with the same contour numbers are arranged together and are stored in the second code word storing means 36.

The code word reading means 37 performs processing for reading out in good order the code words with the same contour numbers from the second code word storing means 36. This processing enables the code words on the same contour read by the picture image data reading unit 11 to be read out in good order in the order of the smallest contour number up, so the universal coding means 30 codes the time series data of the code words for each contour read out in accordance with the universal coding system and stores it in the output file F in the coding processing.

Figure 22:
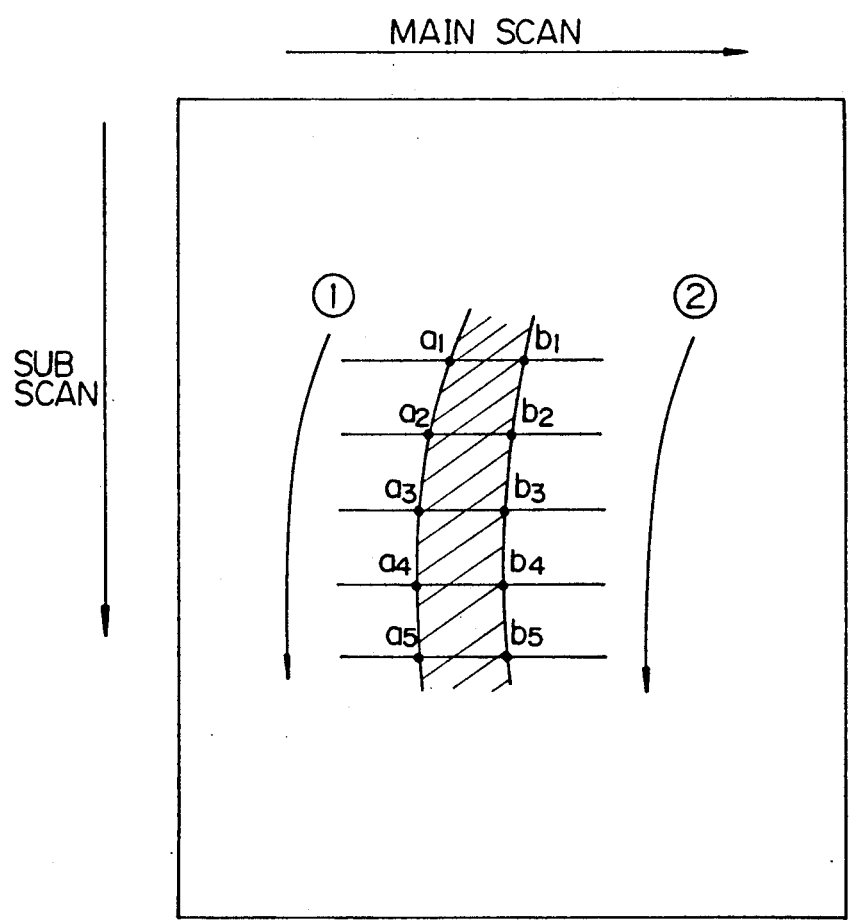
FIG. 22 is a pattern diagram showing part of a contour.

FIG. 22 is a pattern diagram showing part of a contour, with the hatched portion being the contour. The circle 1 and 2 in the figure show the contour number and direction of reading of data.

The universal coding means 30 executes universal coding by, for example, the Ziv-Lempel code, as mentioned earlier. The Ziv-Lempel code proposes two algorithms: the universal type and the incremental parsing type. The universal coding means 30 may be one using the universal type or may be one using the incremental parsing type.

In this way, in the first modified embodiment, note is taken of the fact that there is similarity between the linearity and curve of character lines and that, for screen dot pictures as well, there is similarity with contours from the periodicity of the screen dots and the identity of the screen dot shape and the code words are coded while learning the statistical properties by the universal coding system, whereby the redundancy of similarity of character lines and the similarity of screen dot pictures is greatly reduced and effective data compression is performed. By adopting this type of coding system, the regularity of contours is designated as replication from the regularity of contours already coded, so that even when the resolution rises, the regularity may be captured as a group and therefore the amount of codes does not increase and high efficiency coding can be performed. Further, there is no need for predicting the statistical properties of the picture image data as in the predictive coding system, so there is no need to provide a plurality of predictors and there is no enlargement of the size of the circuit. Further, effective data compression can be realized even for screen dot pictures, not only for character images.

Figure 23:
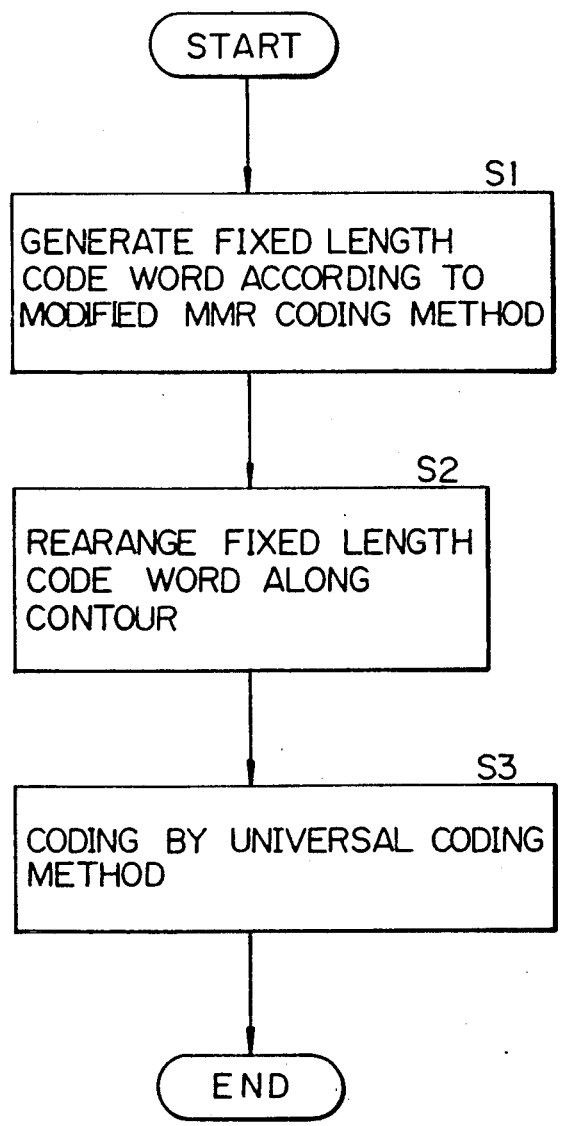
FIG. 23 is a general flow chart showing the data compression processing based on the first modified embodiment.

FIG. 23 is a general flow chart showing the data compression processing based on the first modified embodiment. As shown, first, as the first step S1, the picture image data to be processed is coded in accordance with a modified MMR coding system and fixed length code words are produced.

Next, as the second step S2, the fixed length code words produced in the first step are rearranged from the main scanning line units to contour units.

Finally, as the third step S3, the code words rearranged at the second step are coded in accordance with the universal coding system and thus the data is compressed.

Figure 24B:
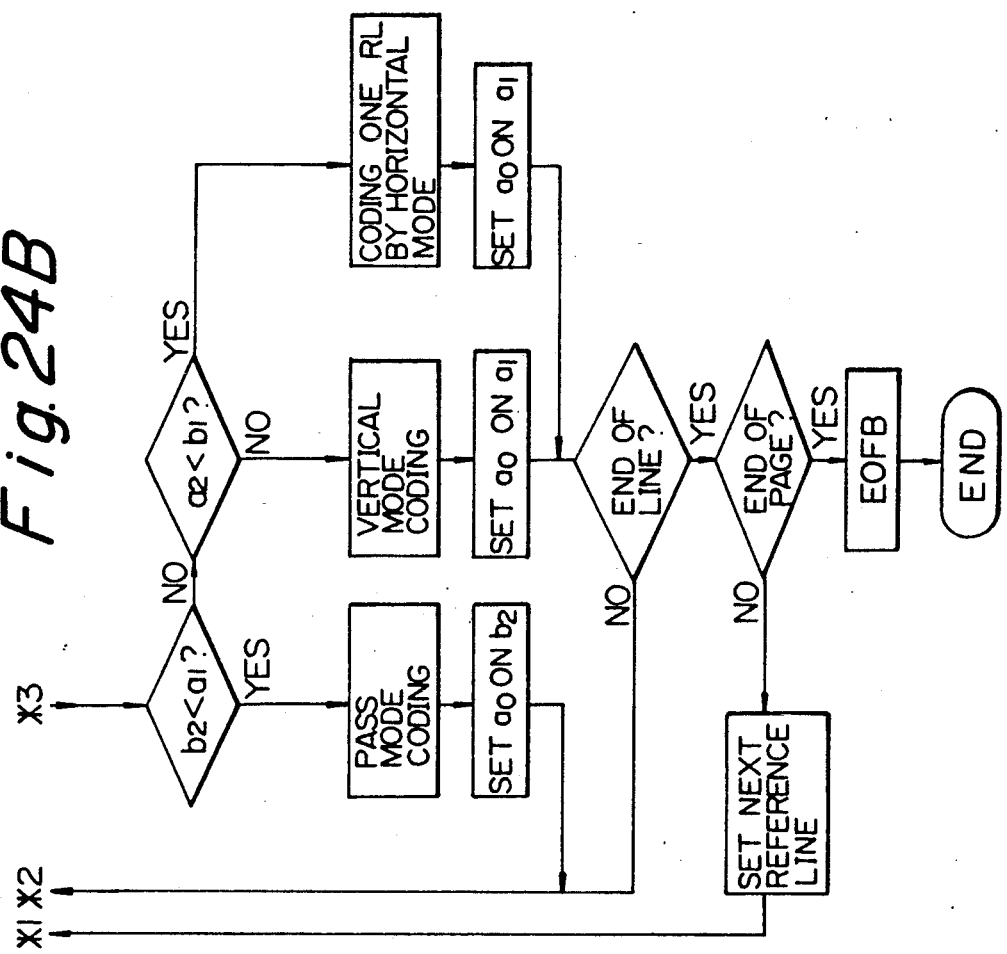

FIG. 24A and FIG. 24B are flow charts showing in detail a first step in the flow chart of FIG. 23. The flow charts of FIG. 24A and FIG. 24B and the flow charts of FIG. 6A and FIG. 6B (which are flow charts of the usual MMR coding system) when compared will show that in the modified MMR coding system used in the first modified embodiment it may be judged from the relationship of the changing picture elements $a_1$, $a_2$, and $b_2$ that the changing element $a_1$ to be coded is in the vertical mode when the relationships:

$$b_2 \geq a_1 \text{ and } a_2 \geq b_1$$

stand and is the horizontal mode when the relationships $$b_2 \geq a_1 \text{ and } a_2 < b_1$$

stand. That is, in the usual MMR coding system, when the distance between the changing picture element $a_1$ and the changing picture element $b_1$ grows larger, even a contour with a connecting relationship with the adjoining main scanning line is treated as a horizontal mode, but in modified MMR coding system used in the first modified embodiment, the size of the distance between the changing picture element $a_1$ and the changing picture element $b_1$ is irrelevant and when a contour of the picture image data is connected, it is treated as a vertical mode. By doing this, it is possible to code more accurately connecting relationships of contours of picture image data.

In accordance with these definitions of mode classifications, the contours of picture image data follow the mode transition of horizontal mode→vertical mode→pass mode In the usual MMR coding system, when in the horizontal mode, the two MH codes of $M(a_01)$ and $M(a_1a_2)$ (see FIG. 5) are generated once in correspondence to the generation of a new contour, then "SET $a_0=a_2$" is set and the next coding processing is executed. As opposed to this, in the modified MMR coding system used in the first modified embodiment, a single fixed length code word corresponding to $M(a_0a_1)$ is produced, then "SET $a_0=a_1$" is set and the next coding processing is performed. By doing this, even in the horizontal mode, sometimes only a single code word appears, but this case can also be handled.

FIG. 25 is a view showing an example of a fixed length code word transformed in the first step S1 in the flow chart of FIG. 23. As shown in the figure, specific fixed length code words are allocated for the pass mode, i.e., the end point information of contours of picture image data, fixed length code words corresponding to the "run length" of "$a_1b_1$" are allocated for the vertical mode, i.e., the connecting point information of the contours of the picture image data, and fixed length code words corresponding to the "run length" of "$a_0a_1$" are allocated for the horizontal mode, i.e., the starting point information of the contours of picture image data. In this way, the fixed length code words coded by the processing of the first step are allocated to show what mode (horizontal mode/vertical mode/pass mode) the picture element $a_1$ to be coded is in and show the mode condition, i.e., to what extent of a "run length" apart it is situated.

As mentioned above, in the present invention, the regularity of the contours is efficiently coded by the universal coding system, whereby the picture image data is effectively compressed. Therefore, in the modified MMR coding system used in the first step S1, the connection of the changing picture elements is found in units of main scanning lines, so the fixed length code words of the changing picture elements appearing at the i-th position of the main scanning lines do not always belong to the same contour. This will be explained referring to the figures.

Figures 26A, 26B:
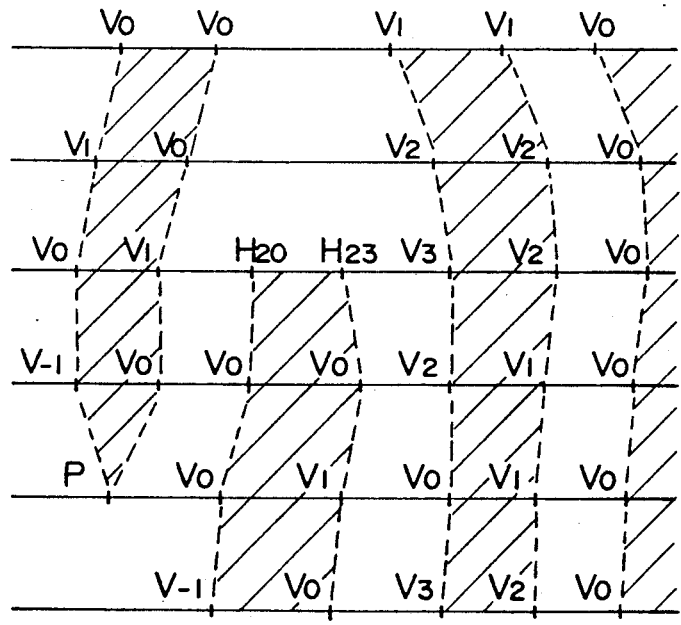
FIG. 26A and FIG. 26B are views for explaining the connecting relationships of fixed length code words found by step S1 in FIG. 23.

FIG. 26A and FIG. 26B are views for explaining the connecting relationship of fixed length code words found by step 1 in FIG. 23. Even when fixed length code words are in the connecting relationship of contours shown in FIG. 26B, since the code words are found in units of main scanning lines, the obtained code words are stored in the memory in a packed state as shown in FIG. 26A. In FIG. 26, $V_2$ shows a vertical mode code word with a mode condition of a deviation of the contour to the right of 2, "$H_{20}$" shows a horizontal mode code word with a mode condition of a run length of 20, and "P" shows the pass mode code word.

At the second step S2, the produced fixed length code words are rearranged in contour units from the main scanning line units, whereby it is detected to which contours the code words on the main scanning lines belong. Explaining this using FIG. 26 as an example, at the second step S2, the code words on the third contour counted from the left are the $H_{20}$ of digit 3 of line no. 3 in FIG. 26A, $V_0$ of digit 3 of line no. 4, $V_0$ of digit 2 of line no. 5, and $V_{-1}$ of digit 1 of line no. 6.

Figure 27A:
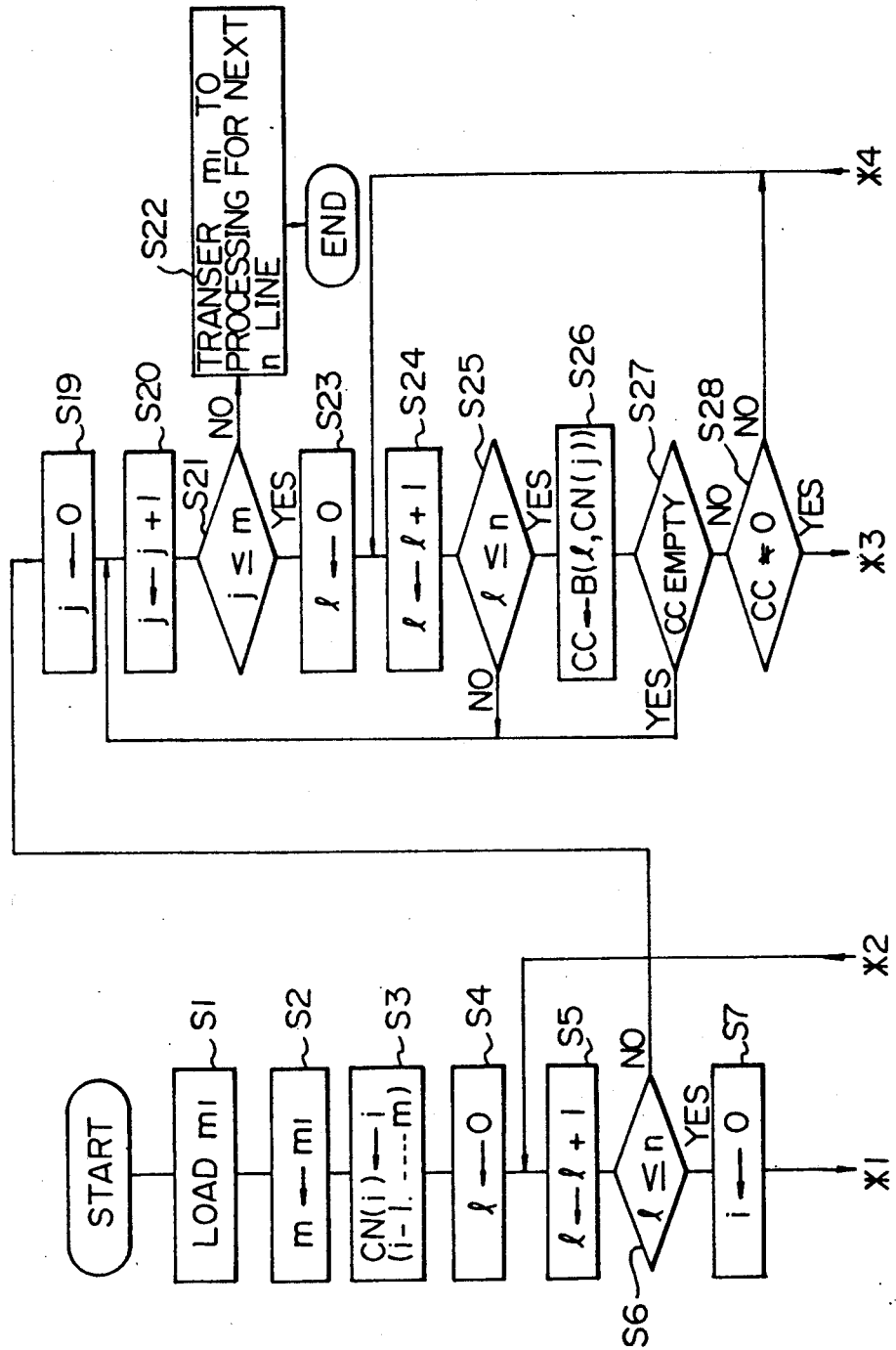
FIG. 27A and FIG. 27B are flow charts showing in detail the second step in FIG. 23.
Figure 27B:
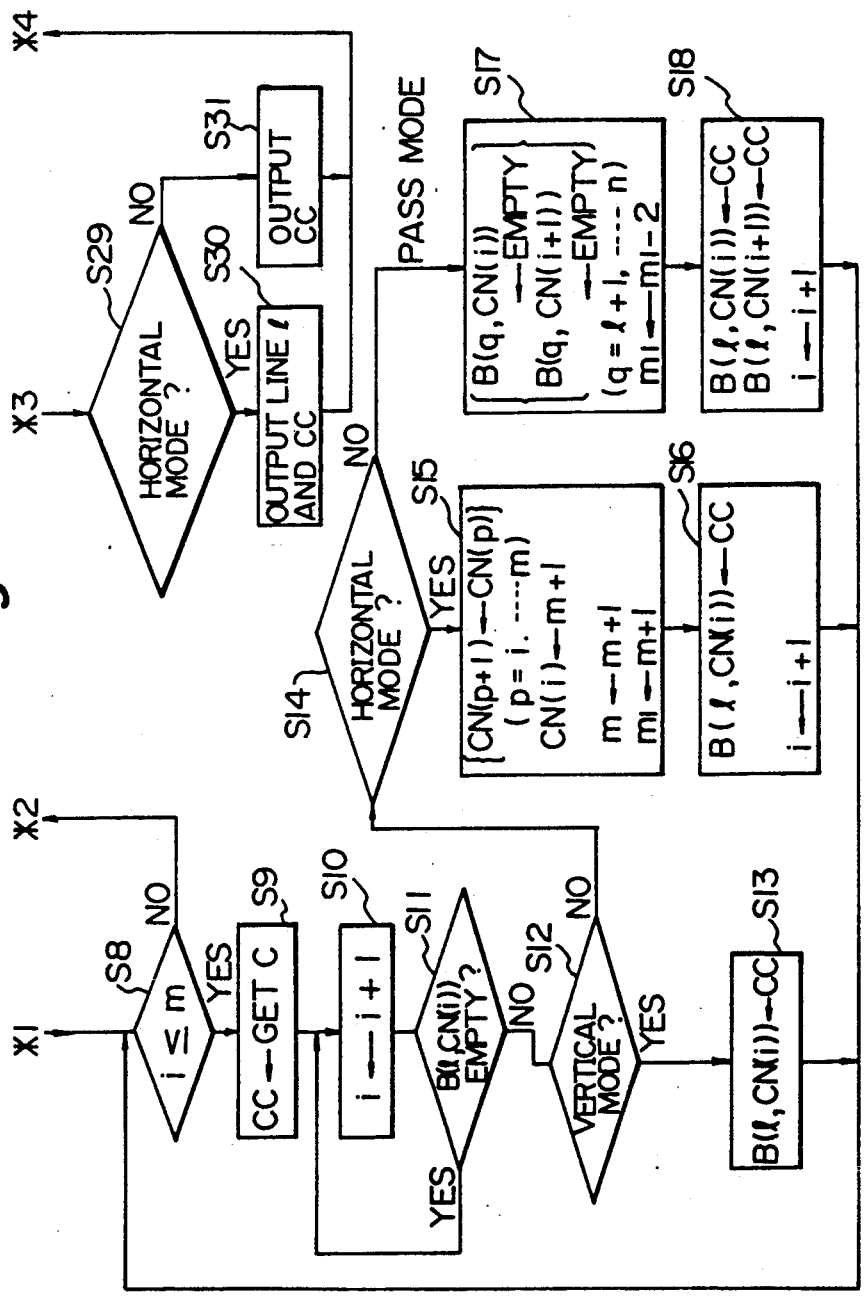

FIG. 27A and FIG. 27B are flow charts showing in detail the second step in FIG. 23. That is, they show an embodiment of the processing for rearrangement of the code words performed at the second step S2 in the flow chart of FIG. 23. If the array of the memory in which the fixed length code words found by the processing of the first step S1 are stored is expressed by:

B (l, k)

where,
l: line number
k: digit number when the code words stored in the array B (l, k) are of the horizontal mode, the appearance of a new contour would throw off the order of arrangement, while when the code words stored in the array B (l, k) are of the pass mode, the disappearance of a contour previously existing would through off the order of arrangement. Therefore, in these flow charts, provision is made of an array CN(i) for managing the stored digit numbers of the code words belonging to the contour number i, and the array B (l, k) of the code words is rearranged in contour units.

That is, when rearranging n lines, first of all, as shown by step S1 and step S2 of the flow chart of FIG. 27A, the number ml of code words of the final line found when rearranging n lines previously is loaded for the variable m showing how many contours there are. Next, as shown by step S3 of FIG. 27A, CN(i) is initially set as "i" (i=1 to m). Next, as shown from step S4 to step S10, one main scanning line is selected in the order of the freshest line numbers and the fixed length code words stored in B(l, CN(i)) on the main scanning line selected are read one by one in the rising order of i from the memory. The "GET C" of step S9 is the step for reading the code words.

If it is judged in accordance with the judgement of step S12 that the code words of the read B(l, CN(i)) are of the vertical mode, then, as shown in step S13, processing is performed so that the vertical mode code words read at the position of B(l, CN(i)) of the prepared memory are stored. This processing is performed since the order of arrangement of the direction of the main scanning lines corresponds to the order of arrangement of the contour numbers in the case of vertical mode code words.

On the other hand, if it is judged in accordance with the judgement of step S14 that the code words of the read B(l, CN(i)) read by the processing of step S9 are of the vertical mode, then, as shown in step S15 and step S16, in correspondence with the appearance of a new contour, processing is performed so that "m+1" is set for CN(i) and the horizontal mode code words read at the position of B(l, CN(i)) newly provided are stored and processing is performed so that CN(p) of p=i to m is set for CN(p+1), whereby the code words on the same contour as the previous line are stored at the array position of the same digit number.

Then, if it is judged in accordance with the judgement of step S14 that the code words of the B(l, CN(i)) read by the processing of step S9 are of the pass mode, then, in correspondence with the disappearance of two contours previously existing, as shown in step S17 and step S18, processing is performed so that the pass mode code words read at the position of B(l, CN(i)) and B(l, CN(i+1)) are stored and processing is performed sc that "empty" is stored at the B(q, CN(i)) and B(q, CN(i+1)), where q=l+1 to n, whereby, through the processing of step S11, code words on the same contour as the previous line are stored at array positions of the same digit number.

In this way, code words stored as shown in FIG. FIG. 26A in accordance with the processing of the second step are rearranged in contour units as shown in FIG. 28A. FIG. 28 shows the value of CN(i) at the point of time when the rearranging processing ends. That is, as will be understood from the CN(i) of the figure, for example, code words on the contour of the contour number 3 where i=3 are stored at the array position of the digit 6, i.e., CN(3)=6, and the connecting condition of the contour of FIG. 26B may be expressed by the code words in accordance with the array of FIG. 28A.

At the third step S3 of FIG. 23, the rearranged code words are read out in good order by contour in the order of the smallest contour number up and the read out coding data is universally coded in accordance with a universal coding system such as the Ziv-Lempel code, whereby the data is compressed.

The processing of step 19 S19 to step S31 of the flow chart of FIG. 27A corresponds to the reading processing of the code words. Explaining this more specifically by the example of FIG. 28A, processing is performed so as to read out the code words of n lines in the digit direction (sub scanning direction) in the order of digit no. 1→digit no. 2→digit no. 6→digit no. 7→digit no. 3→digit no. 4→digit no. 5 that is, the order of the smallest contour number up. This reading processing enables the fixed length code words found at the first step to be read out in good order by contours. Note that as shown in step S30, processing is performed so as to output the line number before the code words for code words of the horizontal mode so that it may be understood what lines they appear at.

The universal coding system is then used for the coded data output so as to efficiently compress the data of the various types of binary pictures.

Above, an explanation was made of the coding processing, but the same coding procedure in reverse may be used to reproduce the picture image data. That is, it may be reproduced by decoding the universal codes, rearranging the decoded words arranged by contours into units of main scanning lines, and then decoding in accordance with the modified MMR coding system.

Note that, while this may be said for the present invention as a whole, the universal coding system is not limited to the Ziv-Lempel code. Use may be made of other universal coding systems. For example, use may be made of an improved version of a universal type algorithm of the LZSS coding system or an improved version of an incremental parsing type algorithm of the LZW coding system. Further, the fixed length code words were explained using this embodiment, but are not limited to the same.

According to the above first modified embodiment, the coding can be performed $b_2$ just tracing the contours, so there is no need for covering the picture image as a whole and further it is possible to use the techniques of the MMR coding system so as to process each plurality of lines, thus a large capacity picture image memory is not required and high speed processing is possible in accordance with serial processing in line units.

Next, an explanation will be made of a second example based on the first modified embodiment. First, a more detailed analysis will be made of the first modified embodiment.

Figure 29:
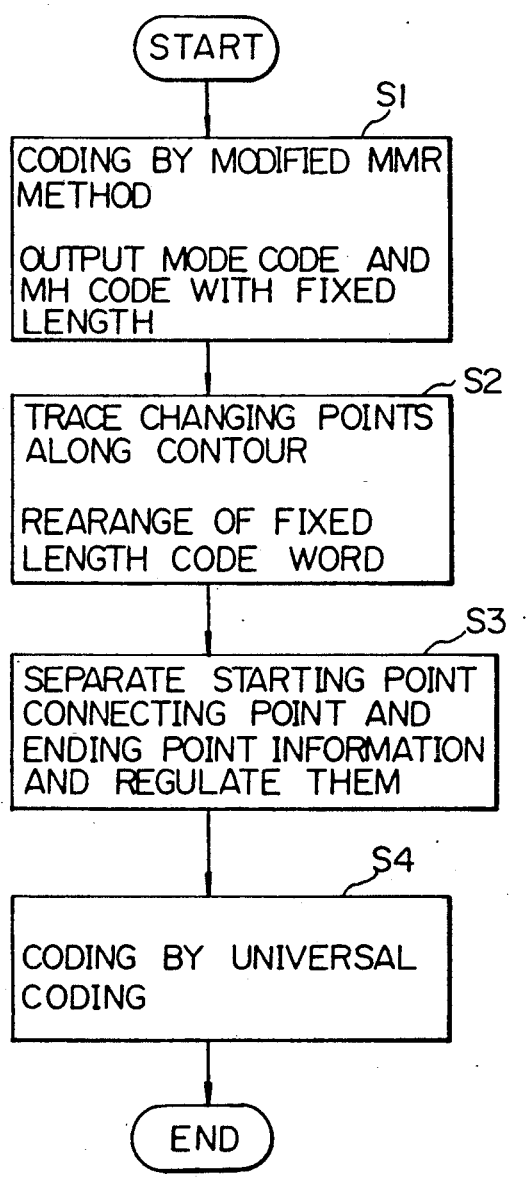
FIG. 29 is a flow chart analyzing in a bit more detail the first modified embodiment.

FIG. 29 is a flow chart analyzing in a bit more detail the first modified embodiment. Steps S1, S2, and S4 of the flow chart correspond to steps S1, S2, and S3 of the flow chart of FIG. 23. Step S3 of FIG. 29 is further extracted.

First, at step S1, the input picture image data is transformed to fixed length mode codes and fixed length RL codes (run length codes) by a modified version of the standard MMR coding system shown in FIG. 24.

Figure 30A:
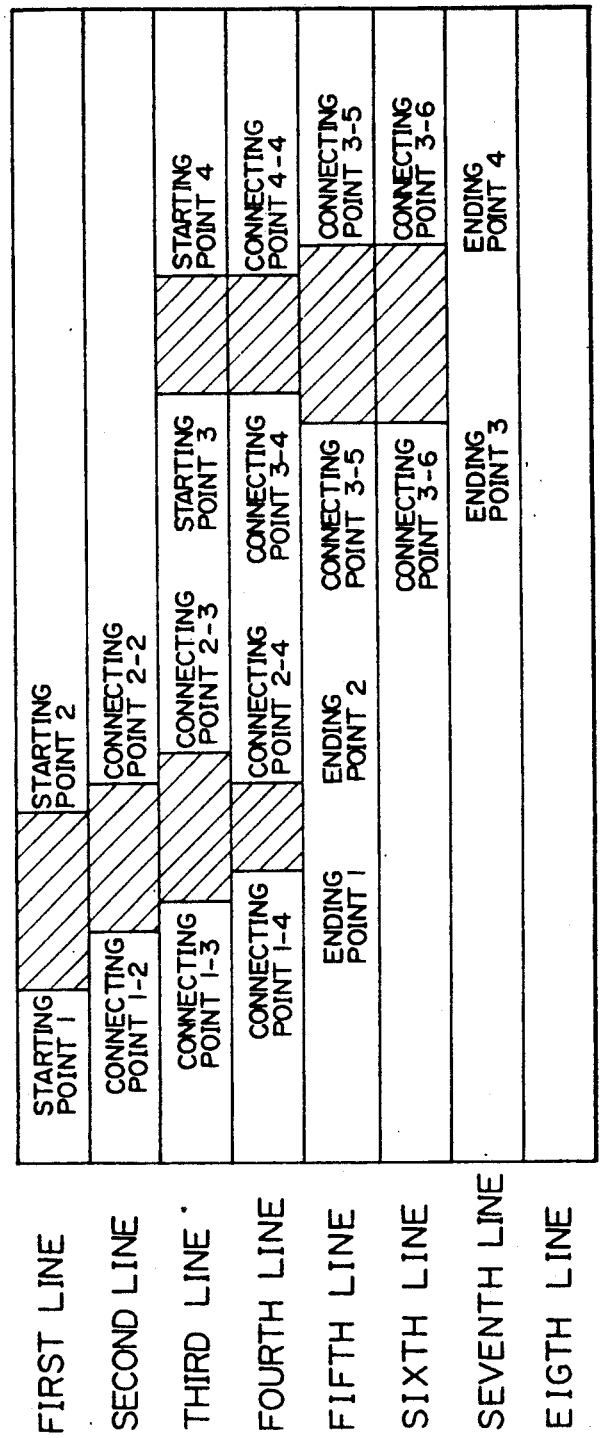
FIG. 30A is a pattern diagram showing an example of the contour of a picture image.
Figure 30B:
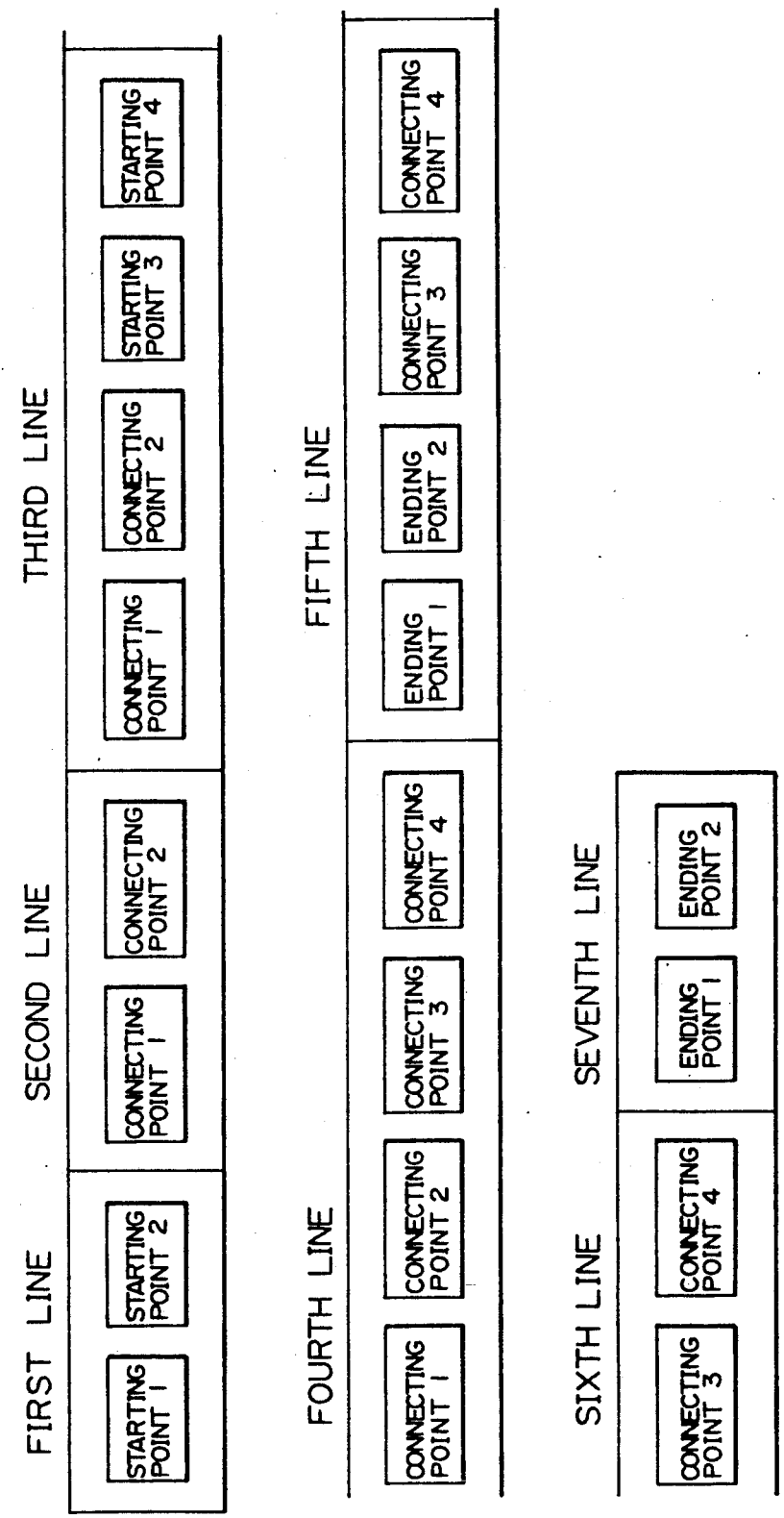
FIG. 30B is a view showing the array of code words stored in the storing means 34 of FIG. 21.

FIG. 30A is a pattern diagram showing an example of the contour of a picture; FIG. 30B is a view showing the array of code words stored in the storing means 34 of FIG. 21; and FIG. 30C is a view showing the array of code words stored in the storing means 36 of FIG. 21. Referring to these, the contour information shown in FIG. 30A is coded by line as shown in FIG. 30B by the procedure of FIG. 24.

The arrangement of the fixed length code words is changed from one of line units to contour units as shown in FIG. 30C, then the universal coding system is used for compression.

FIG. 31 is a view showing an example of allocation of 2-byte fixed length code words in a modified MMR coding system. The fixed length code words of the modified MMR coding are expressed by two-byte units during the coding as shown in FIG. 31 and are rearranged by contours (FIG. 32), then are transformed to fixed length code words of one-byte units as shown in FIG. 25 to raise the learning efficiency, then are universally coded.

The difference of the modified MMR coding system of FIG. 24 from the standard system is step S10, as has already been mentioned. The procedures for rearrangement of n lines of the fixed length code words was explained in reference to FIG. 27.

Regarding the reading of the fixed length code words, as shown in FIG. 30C, the starting point information of the contours comprised of the horizontal mode and the connecting information comprised of the vertical and pass modes are read out, then are compressed by the universal coding system.

In the second example of the first modified embodiment, the processing for rearrangement into contour units in the first example is performed more efficiently.

Figure 33:
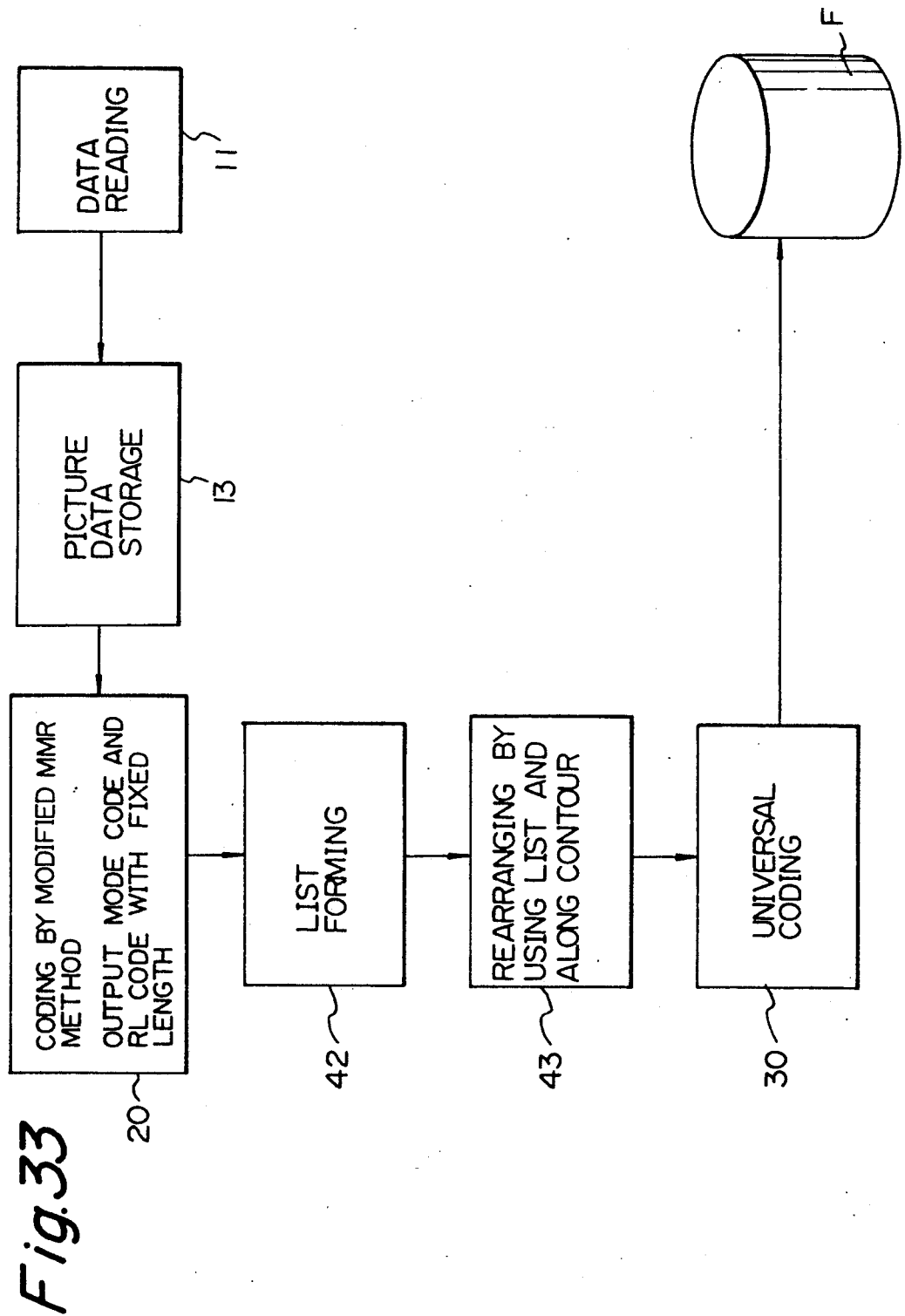
FIG. 33 is a principle block diagram showing a second example based on the first modified embodiment.

FIG. 33 is a principle block diagram showing a second example based on the first modified embodiment. In the figure, the block 20 is the same as the fixed length coding means 20 shown in FIG. 18. The characteristic feature in the second example lies in the provision of a list forming means 42 and rearranging means 43. That is, there are provided a list forming means 42 which forms a list of starting point information showing the starting points of the contours output from the fixed length coding means 20 and a list of the connecting points showing connecting points of the contours designated from the list of the starting points and a rearranging means 43 which rearranges the connecting relationships of the changing picture elements of scanning line units formed by the list forming means 42 into connecting relationships of contour units. The universal coding means 30 compresses and codes the connecting relationships arranged in contour units by the rearranging means 43 as a replication of the already coded connecting relationships.

Here, the list forming means 42 acquires a list region each time a starting point of a contour appears and releases an outputted list region each time compression and coding of a connecting relationship of a contour end.

Figure 34:
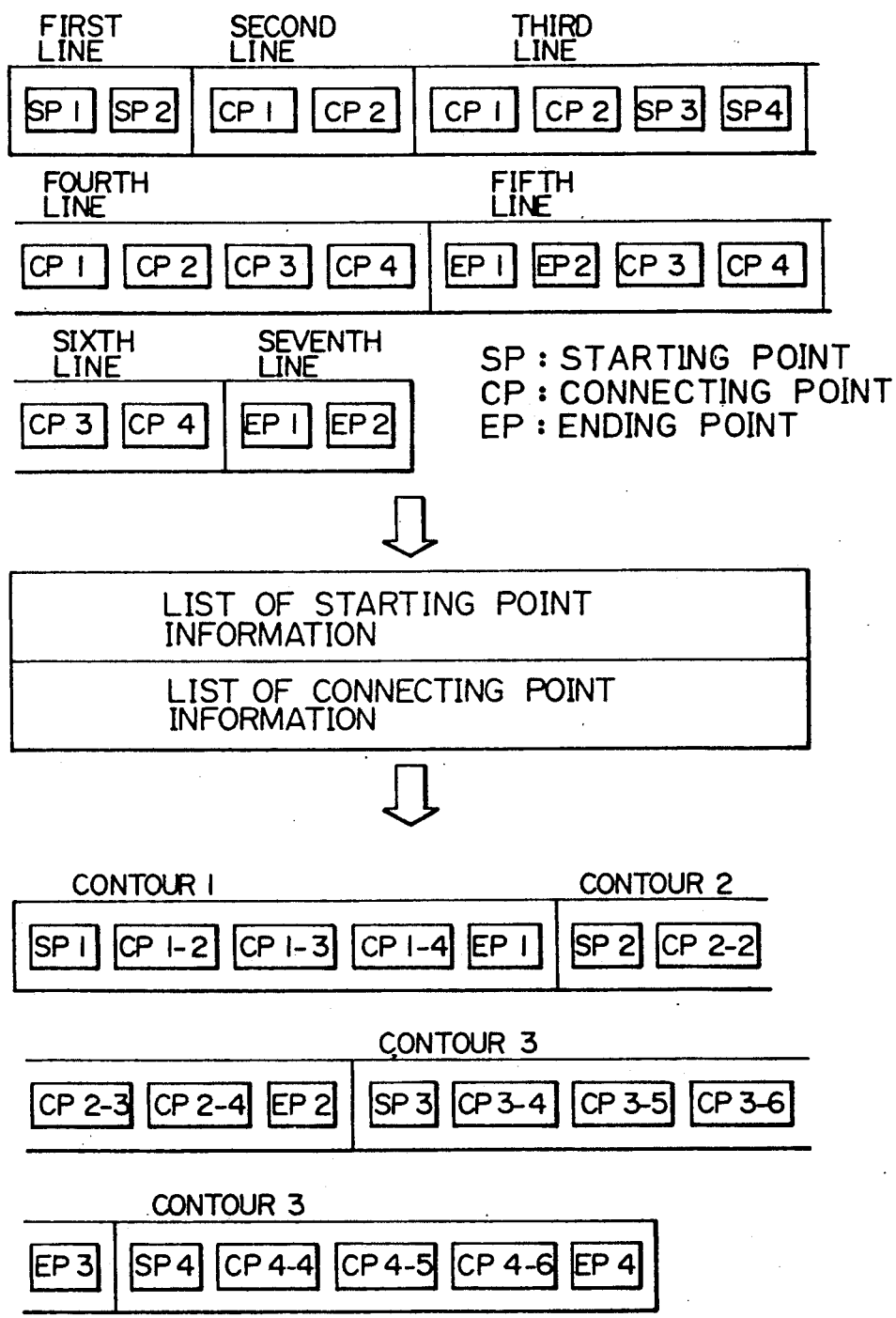
FIG. 34 is a view for explaining the list structure in the second example (FIG. 33)

FIG. 34 is a view for explaining the list structure in the second example (FIG. 33). As shown in the figure, a list structure is introduced for the rearrangement of the fixed length code words found by the modified MMR and the code words are managed divided into a:

[1] List of starting point information storing starting point information of the contours

[2] List of connecting point information storing the contours designated from the starting point list whereby it becomes easy to rearrange along contours one plane's worth of code words. Further, each time compression of one contour is finished, a list is released, so it is possible to suppress to the minimum necessary extent the memory regions used.

Figure 35:
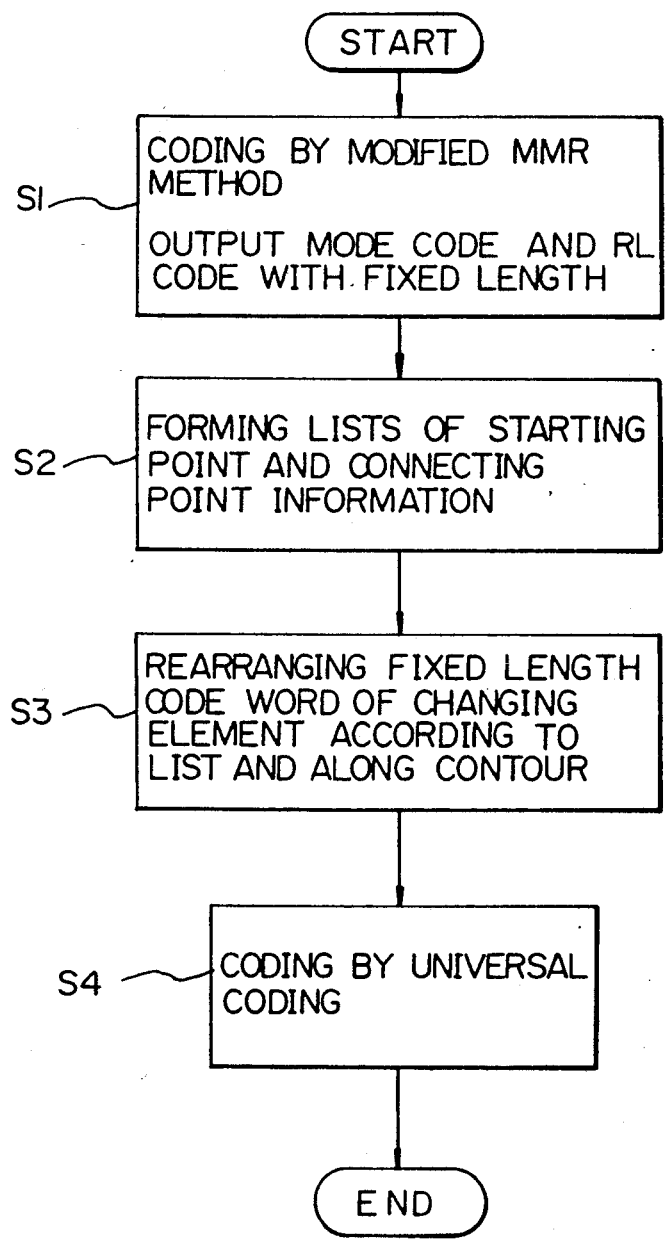
FIG. 35 is a flow chart showing the processing procedure of the second example (FIG. 33)

FIG. 35 is a flow chart showing the processing procedure of the second example (FIG. 33). First, the picture image data input at step S1 is transformed into fixed length mode codes and fixed length run length codes by a modified version of the MMR coding system shown in FIG. 24.

Next, the control proceeds to step S2, where a starting point information list showing the starting points of the contours and a connecting point information list showing the connecting points (including end points) of the contours designated by the starting point information list are prepared from the changing point modes of the scanning line units obtained by the modified MMR coding.

Next, the control proceeds to step S3, where the changing point modes of scanning line units are transformed to changing point modes of contour units in accordance with the list information prepared at step S2.

Then, finally, at step S4, the changing point modes arranged in contour units are compressed by universal coding such as a Ziv-Lempel code and output.

Figure 36:
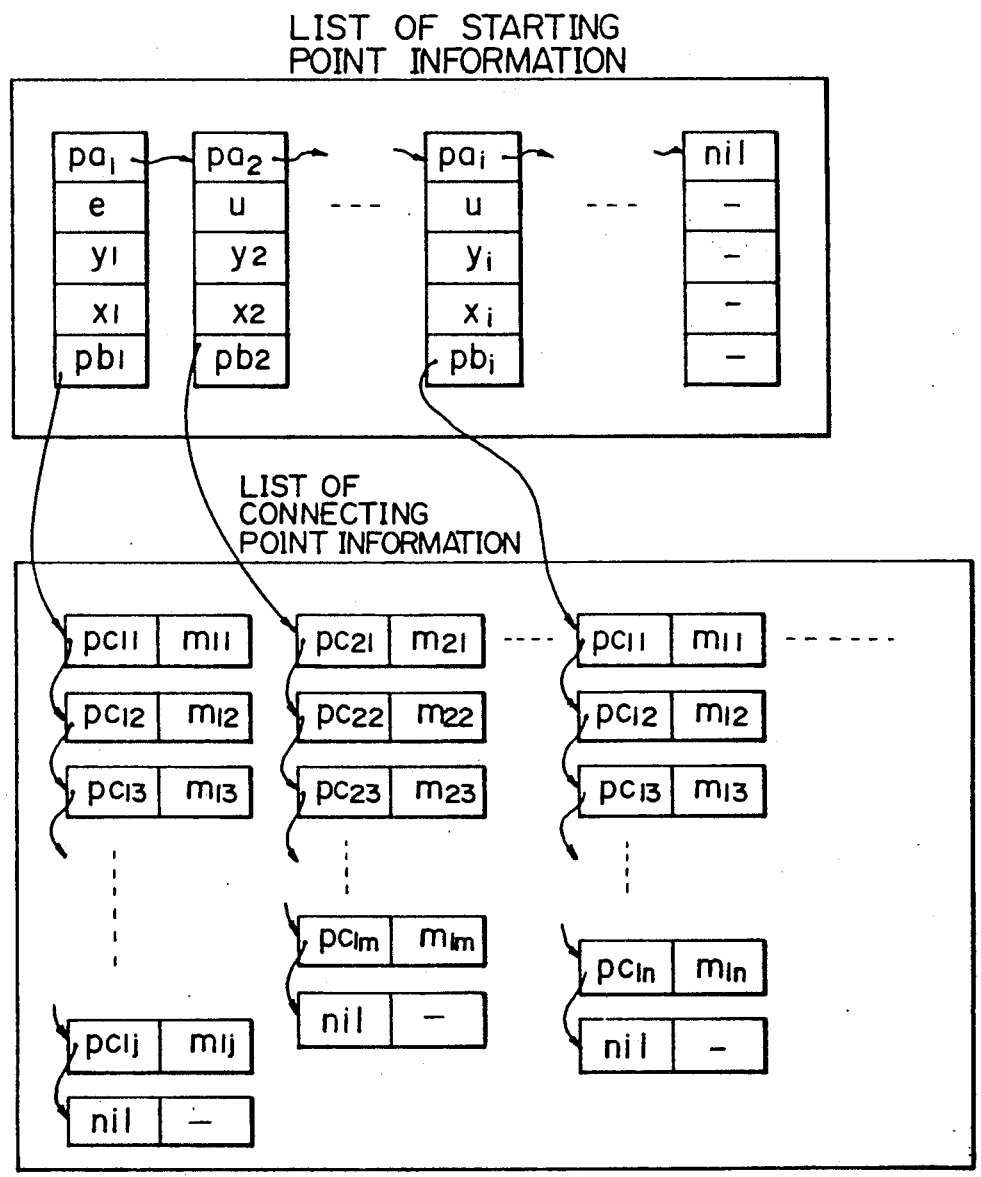
FIG. 36 is a view showing the expressions of the starting point information and the connecting point information according to the list in the second example.

FIG. 36 is a view showing the expressions of the starting point information and the connecting point information according to the list in the second example and shows the structure of a list of contour information prepared at step S2 of FIG. 35. However, the symbols in FIG. 36 have the following meanings:

$pa_i$: Pointer to starting point information of ist contour
$pb_i$: Point to connecting point information of i-th contour
$pc_{ij}$: Pointer to jst connecting point information of i-th contour
$y_i$: Line number in vertical direction (sub scanning)
$x_i$: Picture element address in horizontal direction (main scanning)
$m_{ij}$: Mode information of jst connecting (changing) point of i-th contour
u: Flag showing contour is being coded
e: Flag showing contour is finished being coded
nil: End of list First, the contour information is stored separated into the starting point information list and the connecting point information list.

The starting point information list shows the entire information for each contour. As mentioned above, it is comprised of:

[1] The pointer $Pa_i$ to the next starting point information

[2] The flag u showing that the contour is currently being coded

[3] The flag e showing that the contour is finished being coded

[4] The horizontal direction address $Y_i$ and the vertical direction address $X_i$ of the starting point

[5] The pointer $Pb_2$ to the connecting point information

On the other hand, the connecting point information list is comprised of, as mentioned above,

[1] The changing point $m_{ij}$ of the contour (m=H, V, P)

[2] The pointer $P_{ij}$ to the changing point mode of the next line

Figure 37A:
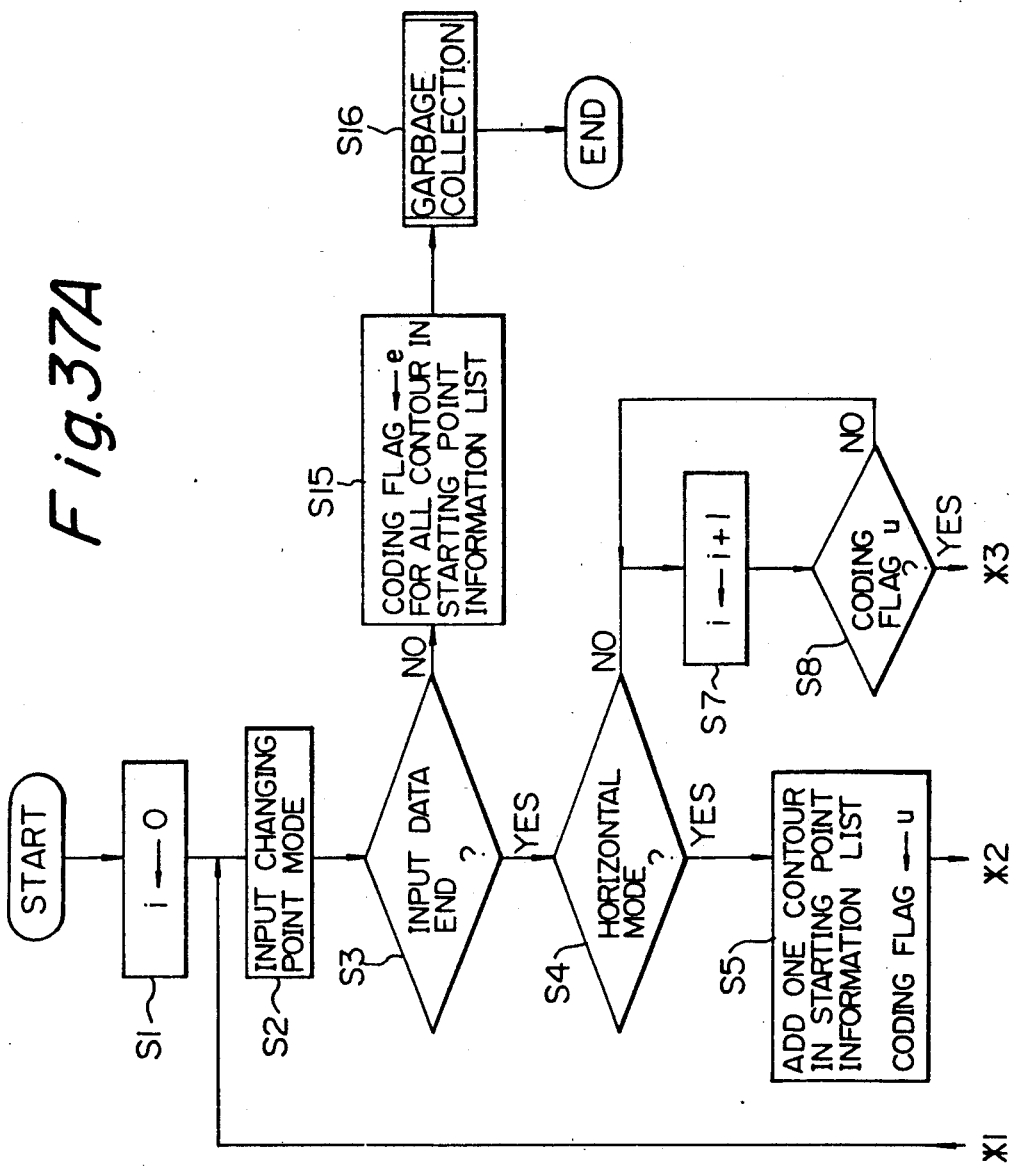

FIG. 37 is a flow chart of the rearranging processing of the changing point modes in a list in the second example. The changing point mode (H, V, P) output by the procedure of modified MMR coding shown in FIG. 24 is changed to information of the list structure shown in FIG. 36 in accordance with the procedure of the list forming processing shown in FIG. 37.

Figure 38:
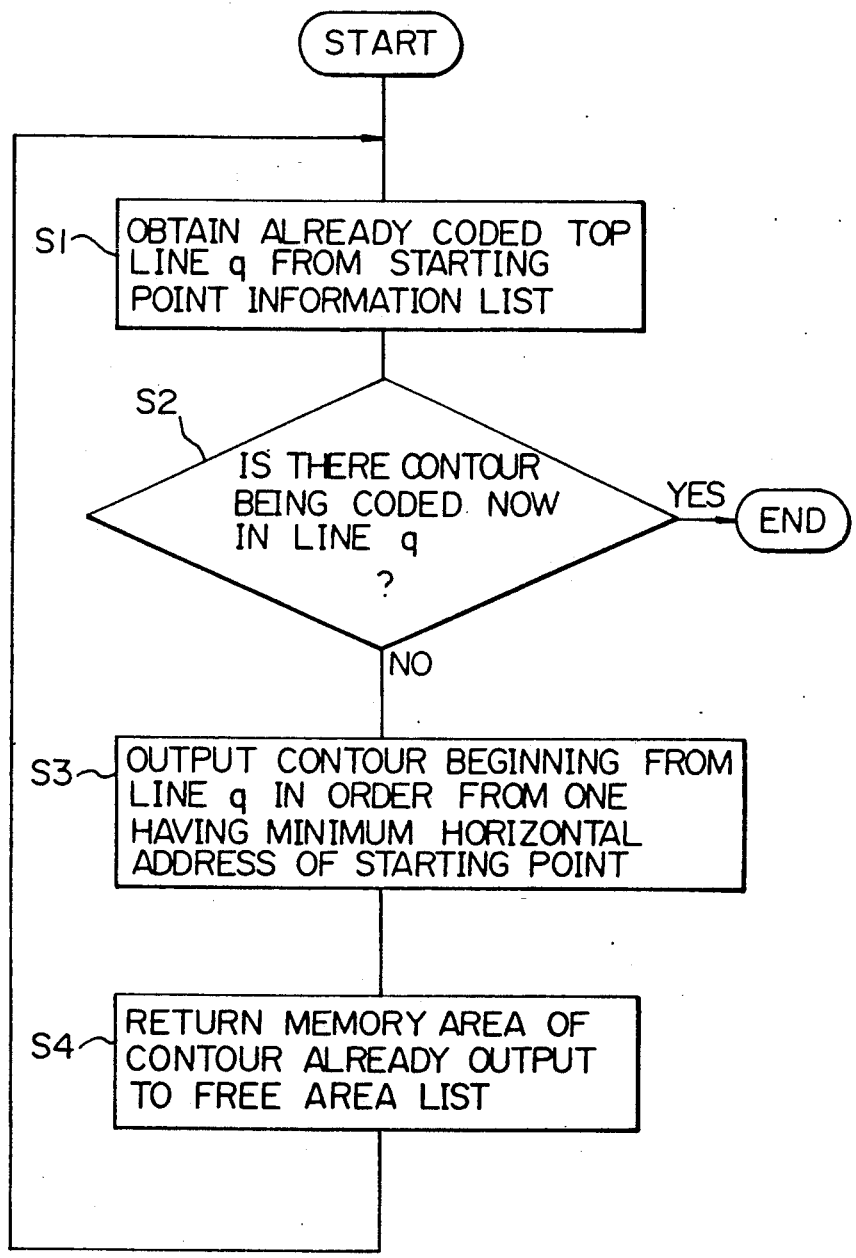
FIG. 38 is a flow chart of "garbage collection" for rearranging the changing point modes by contours.

The rearrangement of the changing point modes by contours is performed in accordance with the list of FIG. 4 by the procedure of the processing flow of "garbage collection" shown in FIG. 38.

Next, an explanation will be made of the processing for forming a list of FIG. 37. In the figure, unless otherwise specified, the list information, for example, a list of free regions, is set. Then, each time a region for storing list information becomes necessary, the region is acquired from the list of free regions and each time a region being used becomes unnecessary, the region is returned to the list of free regions. This method enables the memory to be effectively used.

In FIG. 37, first, at step S1, "0" is set for i showing the number of the contour in one line. Then, one of the changing point modes obtained by the modified MMR coding of FIG. 24 is input. If the data input of the changing point mode is not finished, then the control proceeds to step S2 to step S3 to investigate if it is the horizontal mode H. If the horizontal mode H, then a new contour has appeared, so a contour is inserted into the starting point information list at step S5, the in-coding flag u is set, and the vertical address $x_i$ and the horizontal address $H_i$ of the contour are stored. Further, a region is secured in the list of connecting point information for storing the changing point modes of the contour.

Next, the control proceeds to step S6 of FIG. 38, where if the changing point is not the final changing point of the line, the control returns to step S2 and the next changing point mode is input.

If the input changing point mode is other than the horizontal mode, the control proceeds from step S4 to S7 where the contour number i in the starting point information list is incremented by "1". At step S8, a contour for which the in-coding flag u is set is searched for in the starting point information list, then the control proceeds to step S9. At step S9, if the changing point mode is the vertical mode V, then the control proceeds to step S10, where the connecting point information list is referred to and the mode of the input connecting point is added to the end of the list. If, at step S6, the changing point is not the final changing point of the line, the control returns to step S2 and the next changing point mode is input.

If the changing point which is input is the pass mode P, the control proceeds from step S9 to step S11 and the in-coding flag in the starting point information list of the contour i is set to the end-coding flag e. Next, the control proceeds to step S6, where similarly it is investigated if the changing point is the last changing point of a line.

If judged the last changing point at step S6, the garbage collection processing shown in FIG. 38 is performed and at step S14 "0" is set for the contour number i, then once again the control moves to step S2 for inputting the next changing point mode.

When it is judged at step S3 that the input of the changing point modes has been completed, the control proceeds to step S15 where the in-coding flag of all the contours in the starting point information list is set to the end-coding flag e, then at step S16 the garbage collection processing of FIG. 38 is performed and then processing ended.

Next, an explanation will be given of the garbage collection of FIG. 38.

In the second example, the changing point information rearranged according to the contours is output with priority given to the contours beginning higher. Further, contours beginning from the same line are output with priority given to the contours to the left. Therefore, contours in which pass modes appear are completed in the MMR coding and may be coded and output in accordance with the above priority order.

In FIG. 38, first, at step S1, the q of the end-coding contour in the starting point information list which has the smallest vertical address (line number) $y_i$ is found. Next, the control proceeds to step S2, where it is investigated if coding is in progress at other contours beginning from line q. If it is, the process ends. If it is not, the control proceeds to step S3, where the following are output for the contours beginning from the q line in the order of the smallest horizontal address (picture element address) $x_i$ up:

[1] Vertical and horizontal addresses of starting point information

[2] Changing point modes of lines of connecting point information

At step S4, the memory regions of the starting point information and connecting point information lists for the output contours are returned to the list of free regions and the control again returns to step S1.

In the above explanation, a priority order was set for the output of the contour information, but it is also possible to output the same by garbage collection in the order of completion of coding. The method of output in the order of completion of coding is the best in terms of efficiency of use of the memory.

As explained above, according to the second example of the first modified embodiment, there is provided a contour universal coding system wherein coding is performed while learning by matching the linearity and regularity of the curves of contours to the picture being processed, wherein when the changing point modes are arranged in accordance with the contours, the starting point information and the connecting point information of the changing points are stored in the memory in a list structure and are output each time a contour is finished being coded, so it becomes possible to code contours in page units and further, since the memory capacity is effectively used, the processing becomes possible even with a relatively small memory capacity.

Next, a third example based on the first embodiment will be explained. This third example is similar in basic concept to the second example and enables a much high rate of data compression than the first example.

Figure 39:
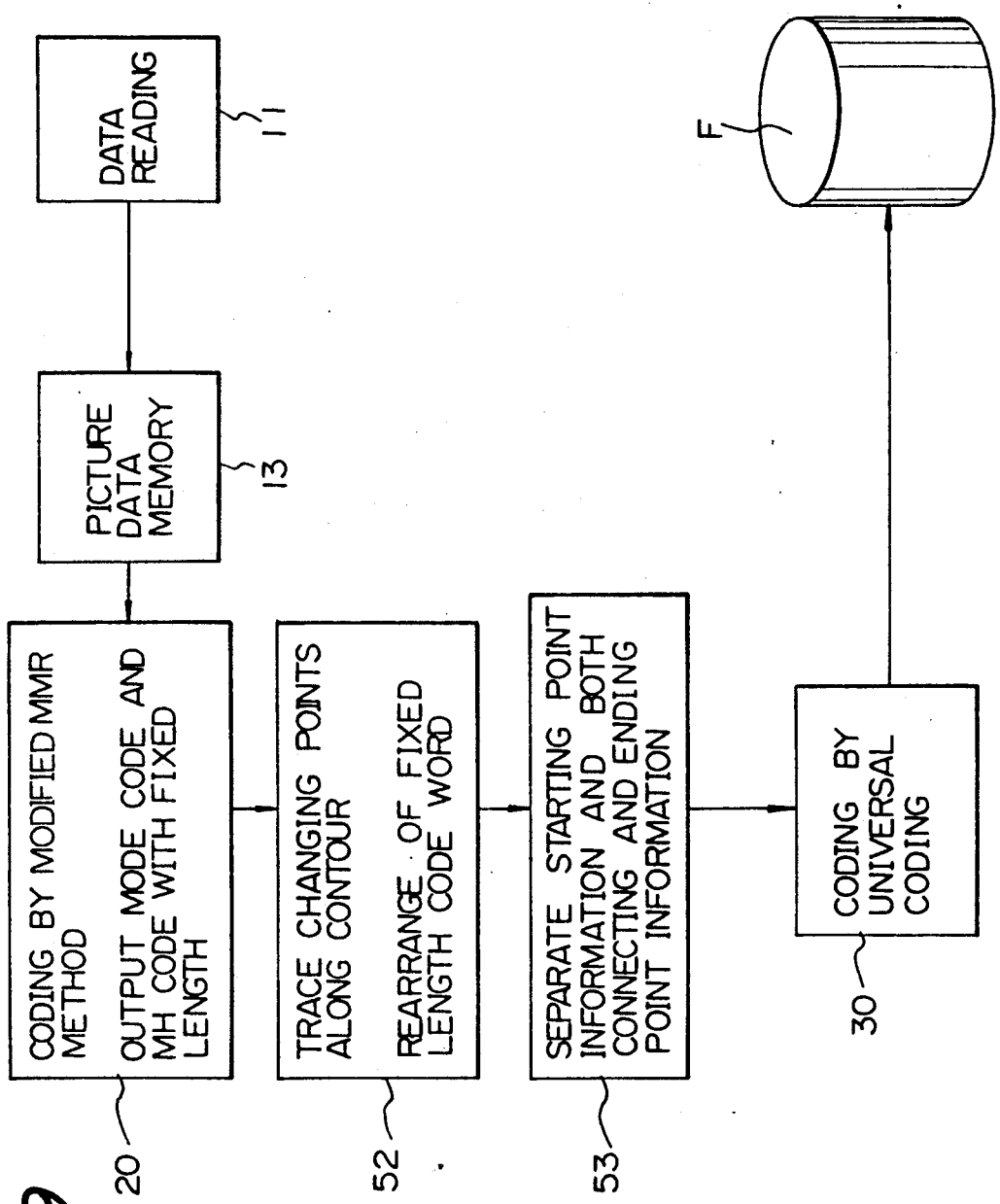
FIG. 39 is a principle block diagram showing a third example based on the first modified embodiment.

FIG. 39 is a principle block diagram showing the third example based on the first modified embodiment. In the figure, the block 20 is the same as the fixed length coding means shown in FIG. 18. The characterizing feature of the third example is the provision of the rearranging means 52 and the regulating means 53. That is, provision is made of a rearranging means 52 for rearranging the connecting relationships output from the fixed length coding means 20 and coded by the modified MMR coding system to connecting relationships of changing picture elements arranged by contours of the picture and a regulating means 53 for dividing the connecting relationships of the changing picture elements rearranged by contours in the rearranging means 52 into just starting point picture element information and starting point and end point picture element information. The universal coding means 30 codes the connecting relationships regulated by the regulating means 53 as replications of the already coded connecting relationships.

Here, as the universal coding means 30, use may be made of a universal type Ziv-Lempel coding system which codes connecting relationships to be coded at present as information designating the reproduced position and reproduced length of already coded connecting relationships or an incremental parsing type Ziv-Lempel coding system which codes the connecting relationships to be coded at present by designation by the number of a partial series of already coded connecting relationships divided into different partial series.

Figure 40:
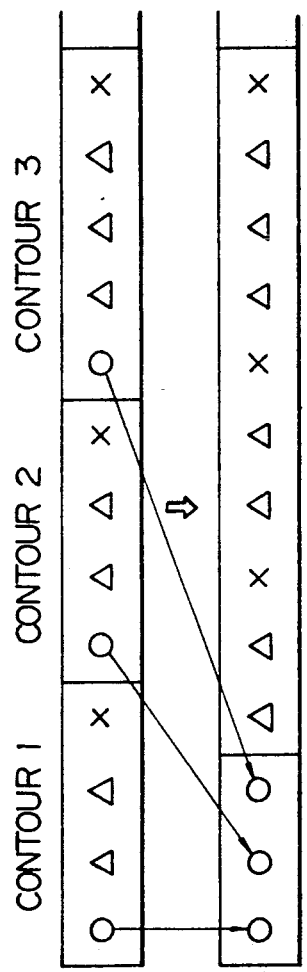
FIG. 40 is a pattern diagram illustrating the operation of the third example.

FIG. 40 is a pattern diagram illustrating the operation of the third example. The concept of the third example will be clear from this at one glance. The o marks, Δ marks, and x marks in the figure have the meanings explained in FIG. 19 and FIG. 20. That is, in the third example, picture image data is compressed divided into a group of only starting point information and a group of connecting point information and starting point information.

Figure 41A:
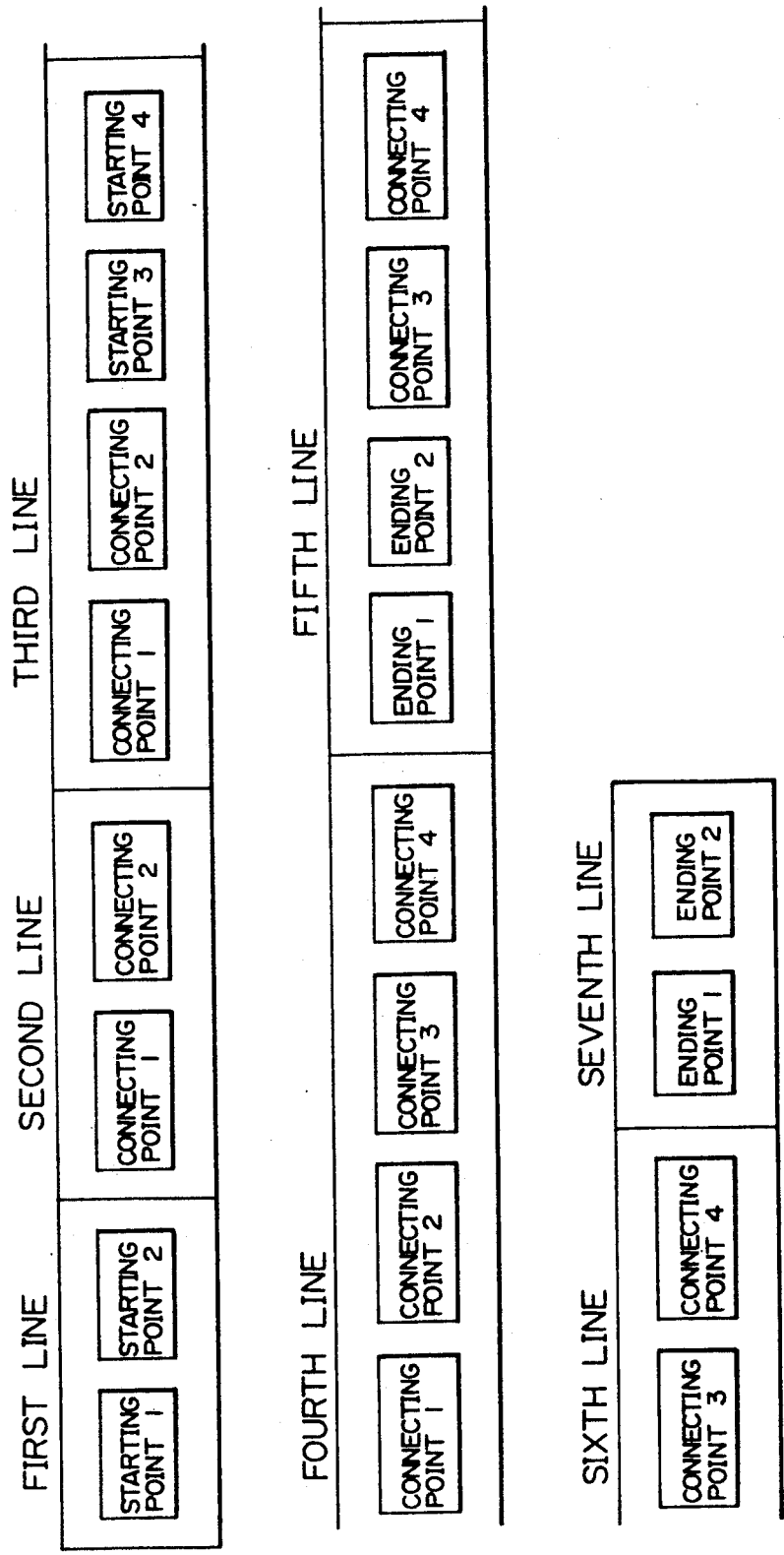

FIG. 41A, FIG. 41B, and FIG. 41C are views for explaining the operation of the third example. As shown in FIG. 41A, first, the input picture is transformed into tracking data of the connecting relationships arranged by contours, then as shown in FIG. 41B, this is rearranged to connecting relationships arranged by contours, and the linearity, curves, and other statistical properties of the contours are optimized, with learning, by the universal coding system, then, as shown in FIG. 41C, the connecting relationships arranged by contours are divided into a group of only starting point information and a group of connecting point information and starting point information, rearranged then the information of different nature assembled and learned, whereby the effect of learning can be enhanced and the compression ratio can be improved. Here, a starting point is the position where a contour first appears, the end point is the position where the contour ends, and a connecting point is a portion which the contour between the starting point and end point connects to.

The above-mentioned processing procedure is substantially the same as in the flow chart shown in FIG. 29. First, at step S1, the picture image data input is transformed into fixed length mode codes and fixed length RL codes by a modified MMR coding system shown in FIG. 24A and FIG. 24B. These fixed length codes are in one byte units and are arranged as shown in FIG. 41A. FIG. 41A covers the picture element disposition of FIG. 30A.

Next, the control proceeds to step S2, where the fixed length codes are rearranged from line units to contour units and given the arrangement shown in FIG. 41B.

Next, the control proceeds to step S3, where the data is divided into a group of just starting point information and a group of connecting point and end point information and rearranged to the arrangement of FIG. 41C.

Then, finally, at step S4, the connecting relationships with the arrangement of FIG. 41C are coded by the universal coding system.

Note that details of the above procedure are substantially the same as in the explanation made using FIGS. 24A, 24B, 25, 26A, 27A, 27B, 28A, and 28B.

FIG. 42A is a view illustratively showing the mode of data expression in the memory in the third example, and FIG. 42B is a view showing an example of the mode of learning of starting point information.

When reading out a fixed length code, for the horizontal mode, as shown in FIG. 42A, the line number and the picture element number are collected in the starting point information memory region A so that it may be determined at what picture element (X) in what line (Y) it appeared at. Further, the vertical modes are stored in the memory region B as connecting point information and further the pass modes are stored as end point information.

After the fixed length codes of all of the contours are stored, as shown in FIG. 42B, the number of contours N, the relative value $\Delta Y$ of the line number, and the relative value $\Delta X$ of the picture element number are found for the starting point information and these are read out in that order by fixed lengths. Next, the connecting point information and end point information stored in the memory region B of FIG. 42A are read out for each contour.

The information read out in this way is compressed by the universal coding system and then output.

The above explanation was made in reference to coding, but the reverse procedure of that shown in FIG. 29 may be used for reproduction (decoding) of the picture image data. That is, the fixed length codes arranged by contours are decoded, then the fixed length codes are rearranged in line units and decoded by the modified MMR coding system.

Further, in the above explanation, in the rearrangement of the fixed length codes, the output was in the order of the contours starting at the left for every plurality of lines, but it is also to output giving priority to the contours starting at the upper lines and giving priority to those starting at the left in a line.

As explained above, according to the third example, since coding is performed while learning by matching the linearity and regularity of curves of contours, it is possible to effectively compress data irregardless of the type of the picture.

Further, since the contours are grouped by different information expressing the contours, i.e., starting point information and connecting point information and end point information, it is possible to learn the regularity of the contours with a good efficiency and a high rate of compression can be obtained.

Further, the regularity of the contours is designated as replication from the regularity of already coded contours, so even when the resolution rises, the regularity is grasped as a group and therefore high efficiency coding can be performed without the amount of codes increasing proportionally to the resolution.

Further, since the coding follows contours, there is no need for covering the picture image as a whole and therefore it is possible to process in groups of every certain number of lines using the MMR coding system, so a large capacity picture image memory is not required and high speed processing is possible by serial processing in line units.

Next, an explanation will be given of a fourth example based on the first modified embodiment. The fourth example is substantially the same in construction as the fore-mentioned third example, but enables a higher efficiency of data compression than the case of the third example. This is because it ignores unnecessary picture image data not requiring complete reproduction. Since such data does not require complete reproduction, even if ignored, there is no noticeable deterioration of the picture image. Note that the already explained FIGS. 24A, 24B, 25, 30A, 30B, 30C, 31, and 39 are assumed in the explanation of the fourth example.

FIG. 43 is a principle block diagram showing a fourth example based on the first modified embodiment. In FIG. 43, the block 20 is the fixed length coding means 20 shown in FIG. 18, and the rearranging means 62 is a composite of the rearranging means 52 and regulating means 53 of FIG. 39. The output of the rearranging means 62 is stored once in the buffer memory 63. The output of the buffer memory 63 is input to the fixed length coding means 30 and a rough coincidence judging means 64 characterizing the fourth example.

The fixed length coding means 30 includes, in the fourth example, a Ziv-Lempel type universal coding unit 38 and a pattern memory 39. The judging means 64 compares the content of the pattern memory and the buffer memory 63 and uses the results of the comparison for controlling the coding unit 38.

In a screen dot picture, the shape of the screen is similar on the macro level, but on the micro level, due to quantizing noise etc., it is not always possible to determine the regularity by universal coding and therefore there is the advantage of a reduction in the compression ratio.

The fourth example shows the hues of the screen dotted picture by the density of black picture elements. Note was taken of the fact that even without complete reproduction up to the quantizing noise, the difference is not discernable to the human eye and a high compression ratio was obtained by contour universal coding of screen dot and other picture image data not requiring complete reproduction.

Therefore, in FIG. 43, the difference between the connecting relationships of changing picture elements rearranged according to contours by the rearranging means 62 and the partial series of the connecting relationships of changing picture elements already coded and obtained from the pattern memory 39 is detected and if that difference is within a predetermined range of similarity, the compression and coding by the already coded partial series are commanded for the Ziv-Lempel type coding unit 38.

The universal coding by the coding unit 38 incrementally analyzes, for example, the series of MMR fixed length codes in accordance with the contours. On the occasion of coincidence between an already coded series and a series to be coded, when the difference of the deviation between the connecting points at the rough coincidence judging means 64 is less than a predetermined threshold T1 and the sum of the differences of deviation of thee connecting points is less than a predetermined threshold T2, deems them to be the same series and treats them in the same way as with coincidence. When the number of noncoincidences exceeds the above threshold, for the first time it deems that noncoincidence has occurred and analyzes this as a partial series.

According to the data compression system of the fourth example, the connecting relationships of contours are roughly matched with connecting relationships which previous occurred and similar contours are lumped together for universal coding of the information nonstorage type, so a high compression ratio can be achieved by universal coding of connecting relationships of contours even in the case of screen dot pictures.

As a result, even for picture image data not requiring complete reproduction, such as screen dot pictures, it is possible to optimize the codes while learning, by techniques of the universal coding system, the linearity, curves, and other statistical properties from contour information, the advantage of the contour universal coding system, that is, the first modified embodiment, and it is possible to achieve highly efficient compression of the information nonstorage type in pictures of various properties.

Figure 44A:
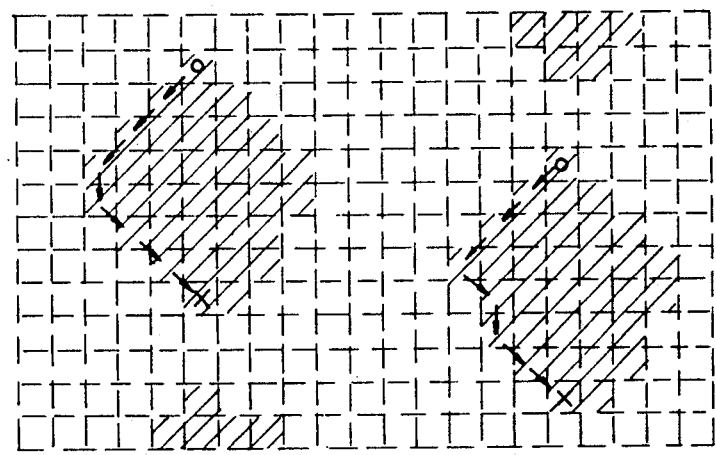
FIG. 44A and FIG. 44B are pattern diagrams illustrating the operation of the fourth example.
Figure 44B:
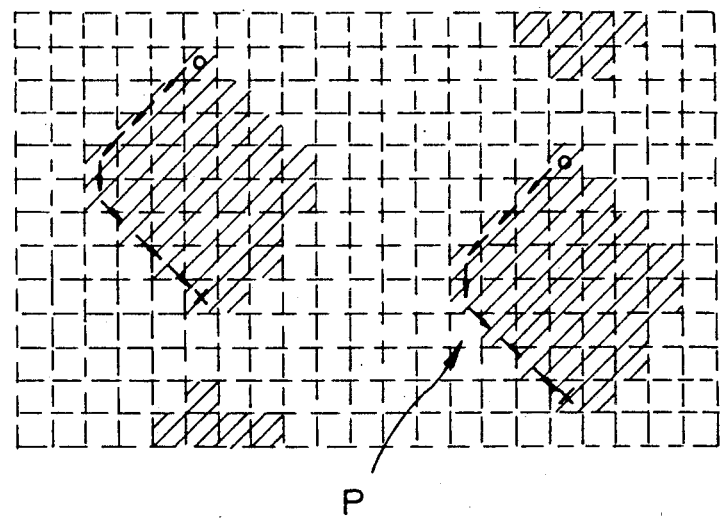

FIG. 44A and FIG. 44B are pattern diagrams illustrating the operation of the fourth example. Assume that there is stored in the pattern memory 39 as a registered pattern the one shown in FIG. 44A and next that the pattern newly stored in buffer memory 63 is the one shown in FIG. 44B. Comparing FIG. 44A and FIG. 44B, the two differ only at the portion of the arrow P in FIG. 44B. This being so, the pattern of FIG. 44B may be approximated by the existing components, the pattern of FIG. 44A. This raises the data compression ratio much higher. The degree of the similarity is judged by the rough coincidence judging means 64.

Specifically, after rearranging by contours the fixed length mode codes and RI, codes found by the modified MMR coding system in scanning line units, when universally coding the fixed length codes, the difference with the series already registered in the dictionary is sought and if the difference is within an allowable range, the series is approximated with the dictionary series. In the universal coding, the connecting points after the starting point of a contour and the end point are considered as a single data series.

FIG. 45 is a view showing the detailed constitution based on the fourth example.

In FIG. 45, the binary data of the picture elements of the picture image signals read by the line scanning of a reading apparatus etc. is successively stored in a two-line storage means 32. In the means 32, when two lines' worth of data are collected in a buffer, the two picture elements following above and below the two lines are successively input into an MMR fixed length calculating circuit 51.

The MMR fixed length calculating circuit 51 classifies the MMR modes in accordance with the procedure of FIGS. 24A and 24B from the series of the two picture elements of the two lines input and finds the fixed length codes shown in FIG. 31.

The MMR fixed length rearranging circuit 52 receives the fixed length codes from the MMR fixed length calculating circuit 51, rearranges the fixed length codes by contours as shown in FIG. 30C, and outputs them to the buffer memory 63.

Reference numeral 38 is a Ziv-Lempel type universal coding unit and is provided with address control circuits 381 and 382, an end point detecting circuit 383, a pattern memory 39, a longest match detecting circuit 385, and a coding circuit 386. Further, 64 is a rough coincidence judging circuit which is provided with a subtracting circuit 641, comparison circuit 642, and accumulating circuit 643.

The address control circuits 381 and 382 control the readout of the buffer memory 63 and pattern memory 39, respectively, and compare the series of fixed length codes arranged by contours registered in the pattern memory 39 and the series of fixed length codes in the buffer memory 63 based on the results of judgement of the rough coincidence judging means 64.

The address control circuit 382 reads out from the pattern memory 39 the series of fixed length codes registered there in the order of the fixed length code at the head of the series on and simultaneously the address control circuit 381 reads out the fixed length codes from the heading of the buffer memory 63 in order. The difference $\Delta i$ of the two fixed length codes read out is found by the subtracting circuit 641 and the difference $\Delta i$ is added to the comparison circuit 642 and the accumulating circuit 643. In the accumulating circuit 643, the sum $\Sigma \Delta i$ of the series of fixed length codes is found, and the result is added to the comparing circuit 642. The comparing circuit 642 is set with the two threshold values T1 and T2 in advance. If $$|\Delta i| \leq T1 \text{ and}$$

$$\Sigma \Delta i \leq T2$$

then it is considered that the series of fixed length codes are the same and the comparison of series is continued.

Further, if $$|\Delta i| > T1 \text{ or}$$

$$\Sigma \Delta i > T2$$

then it is considered that the series do not coincide and the control shifts to the comparison of the fixed length code series.

In summary, $|\Delta i| > T1$ is used for the judgement when the deviation between the pattern of FIG. 44A and the pattern of FIG. 44B is large, even at only one location (one portion), and it is deemed that the two patterns are not similar. Further, $\Sigma \Delta i > T2$ is used for the judgement when the deviation between the pattern of FIG. 44A and the pattern of FIG. 44B is small when seen individually, but becomes a large value when deviations are added together and it is deemed that the two patterns are not similar.

The contours of the series of fixed length codes input from the buffer memory 63 appear as series of starting points, connecting points, and end points. The end point detecting circuit 38 detects the end point of the series, notifies the address control circuit 382 and the pattern memory 39 that one contour has ended, forcibly segments the input fixed length code series, and segments it into partial series.

The longest match detecting circuit 385 receives input from the address control circuit 382 and the buffer memory 63, holds the indexes showing the order of registration in the pattern memory 39 of the fixed length code series found, the length of the same (number of fixed length codes = number of words), and the content $C_j$ of the next fixed length code, detects the maximum length of the series, and outputs the index thereof and the next fixed length code. The coding circuit 386 codes by variable length the information input from the longest match detecting circuit 385 and outputs the result as compressed codes.

When the coding of the fixed length code series of the longest length ends at the coding circuit 386, the amount of increase of the fixed length series in the pattern memory 39 due to the data of the fixed length code series which has been coded is registered in the pattern memory 39 and, further, the coded fixed length code series are discarded from the buffer memory 63, and the same number of fixed length codes are newly input to and registered in the buffer memory 63, for a refresh processing.

In the above example, mention was made of the case of use of the incremental parsing type of Ziv-Lempel code as the universal rode, but use may also be made of the LZW code or other universal codes.

Further, in the above example, the rough coincidence was sought for all of the partial series, but in another example it is possible to switch between complete coincidence for cases where the partial series is smaller than a predetermined length and rough coincidence for cases where it is larger.

Further, it is possible not to fix the threshold value T1 for judging the range of rough coincidence of the fixed length codes and to enlarge the threshold T1 little by little along with increases in the number of fixed length codes of the series with rough coincidence and thus change the same in accordance with the number of codes.

Still further, in the above embodiment, the judgement of rough coincidence was made taking the difference between the series of the pattern memory and the input series, but instead of a simple difference, use may be made of a squared error.

As explained above, according to the fourth example, coding is performed by matching to the picture, with learning, the linearity and regularity of curves of contours even for picture image data for which complete reproduction is unnecessary, such as screen dot pictures (information nonstorage type coding), so irregardless of the type of picture, effective data compression can be performed and the compression ratio can be improved without causing noticeable deterioration of the picture.

Further, since the contours are grouped by starting point information and by connecting point information and end point information, good efficiency learning is possible for regularity of contours and a high compression ratio can be obtained.

Further, the regularity of the contours is designated as replication from the regularity of already coded contours, so even if the resolution rises, the regularity is determined as a *group and the amount of codes does not increase proportionally to the resolution.

Next, an explanation will be given of a final example, that is, a fifth example, of the first modified embodiment (FIG. 18). Further, an explanation will also be given of a second modified embodiment derived from the embodiment of FIG. 11. This is because the two feature common basic concepts.

Figure 46:
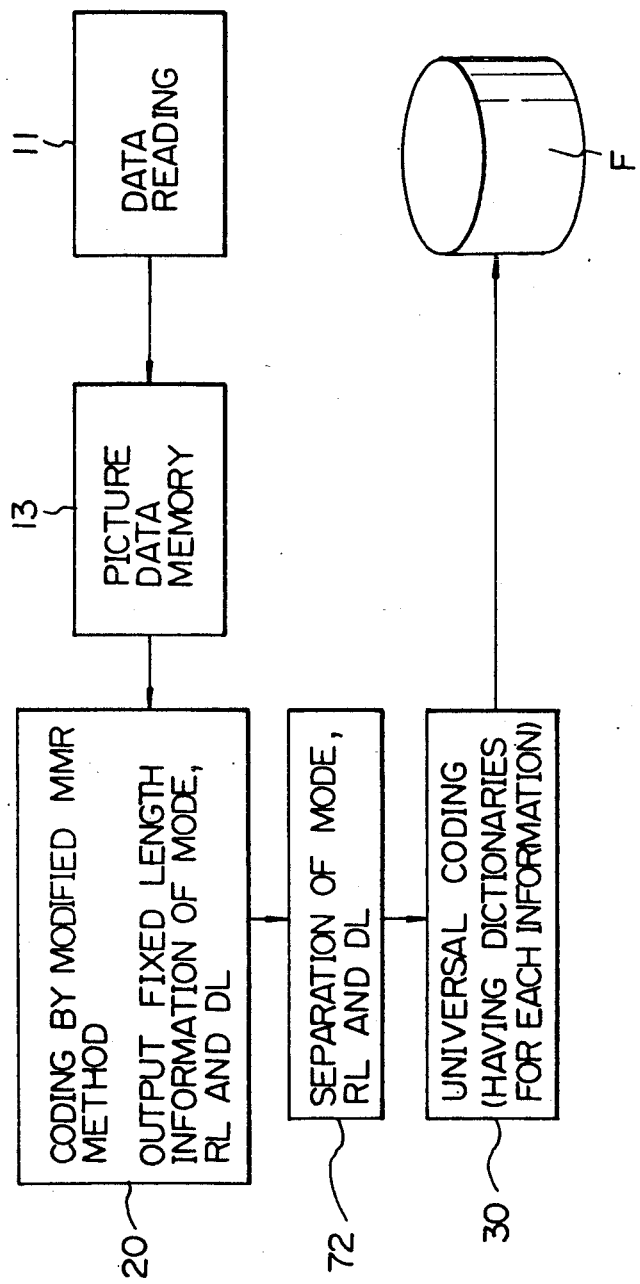
FIG. 46 is a block diagram showing the data compression system based on a second modified embodiment.

FIG. 46 is a block diagram showing the data compression system based on a second modified embodiment. Provision is made of a fixed length coding means (modified MMR coding) 20 which divides into a number of types and finds the connecting relationships of changing picture elements between adjoining scanning lines of binary picture image data and a separating means 72 which groups the connecting relationships of the changing picture elements found by the fixed length coding means 20 into types of connecting relationships. The connecting relationships of each of the plurality of types grouped by the separating means 72 are coded by the universal coding means 30 as replications from the already coded connecting relationships.

Here, the separating means 72 separates the connecting relationships among adjoining scanning lines and groups them as follows:

(a) Three types of mode information: horizontal, vertical, and pass (b) Run length information for determining the relative position of starting point changing picture elements defined by the horizontal mode (c) Deviation length information for determining the relative position of connecting point changing picture elements defined by the vertical mode Further, the universal coding means 30 performs universal type coding or incremental parsing type coding.

That is, universal coding codes by designating the connecting relationships to be coded at the present by the replication position and replication length of already coded connecting relationships.

Further, incremental parsing type coding codes connecting relationship to be coded at the present by designating numbers of partial series of already coded connecting relationships divided into different partial series.

Figure 47:
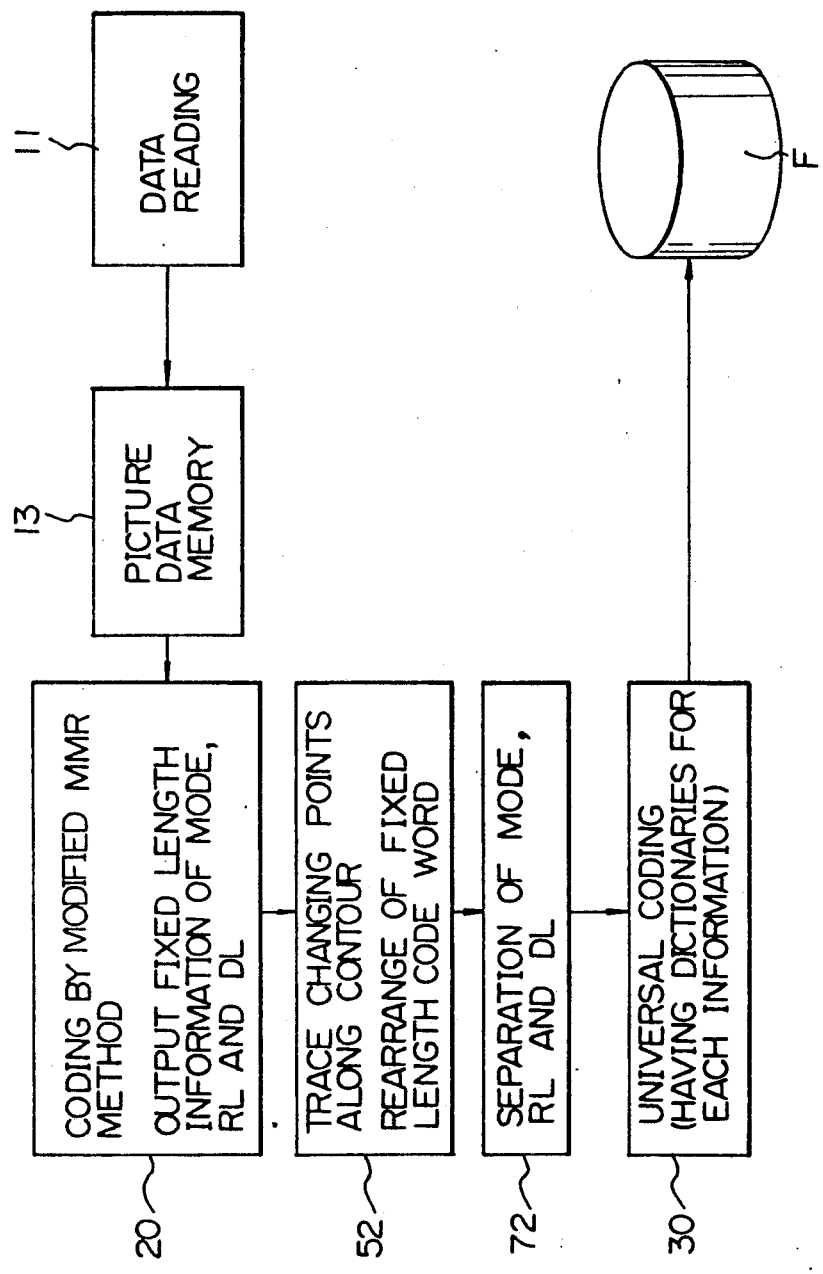
FIG. 47 is a block diagram showing the constitution based on a final (fifth) example based on the first modified embodiment.

FIG. 47 is a block diagram showing the constitution based on a final (fifth) example based on the first modified embodiment. The fifth example, like the second modified example, has a fixed length coding means 20, a separating means 72, and a universal coding means 30. This fifth example further has a rearranging means 52 (already explained) for rearranging the connecting relationships of changing picture elements found by the fixed length coding means 20 arranged by the contours serving as the sub scanning direction. The connecting relationships of the changing picture elements rearranged by contours by the rearranging means 52 are divided into a number of types of connecting relationships and rearranged by the separating means 72. The connecting relationships of the changing picture elements separated by the separating means 72 are coded by the universal coding means 30 as replications from already coded connecting relationships.

The separating means 72 of the fifth example separates and rearranges the following as connecting relationships of changing picture elements among adjoining scanning lines:

(a) Three types of mode information: horizontal, vertical, and pass (b) Line number information for determining the line number of starting point changing picture elements defined by the horizontal mode (c) Run length information for determining the relative position of starting point changing picture elements defined by the horizontal mode (d) Deviation length information for determining the relative position of connecting point changing picture elements defined by the vertical mode Further, the universal coding means 30 of the fifth example performs universal type coding or incremental parsing type coding in the same way as the second modified embodiment.

Figure 48C:
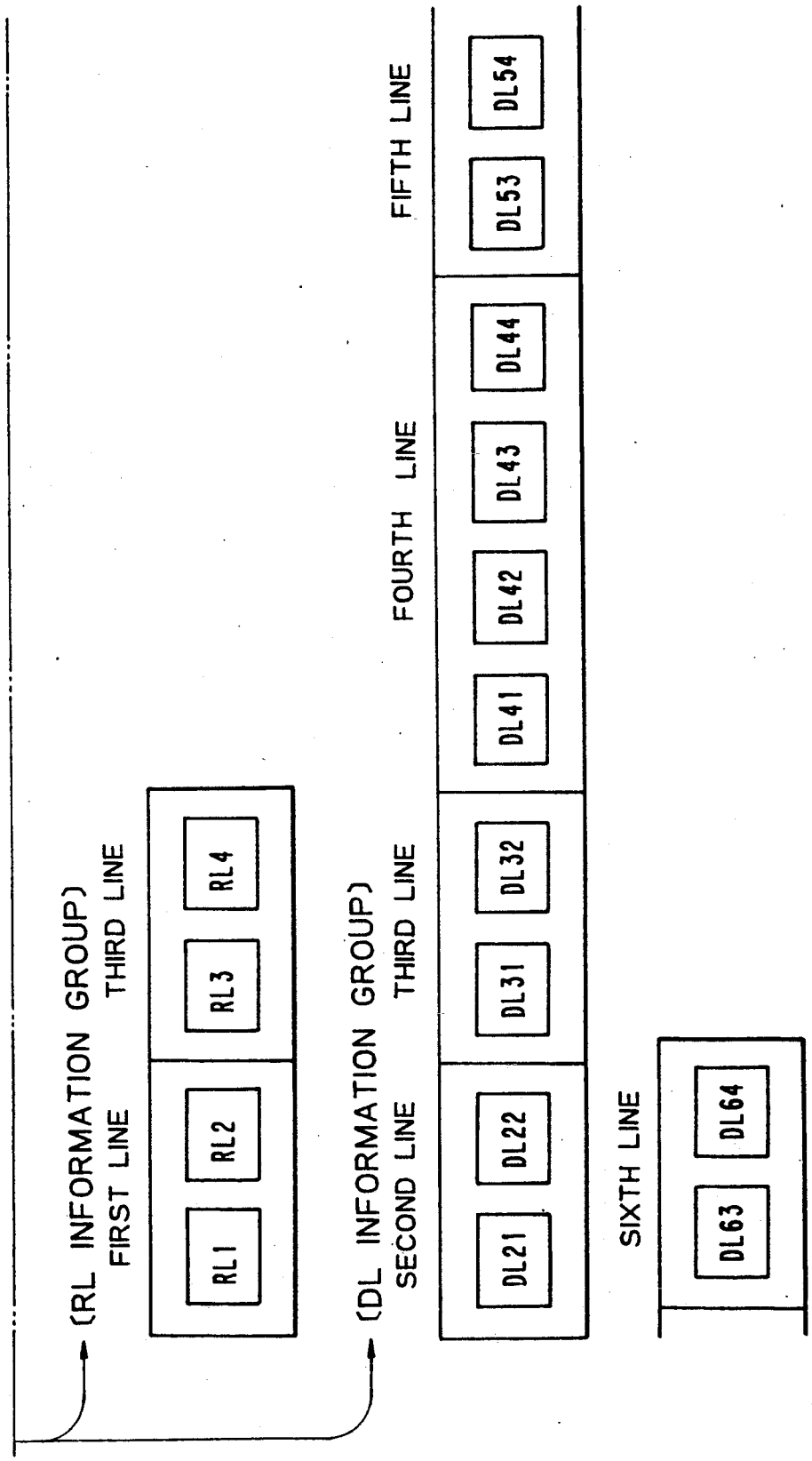
Figure 49B:
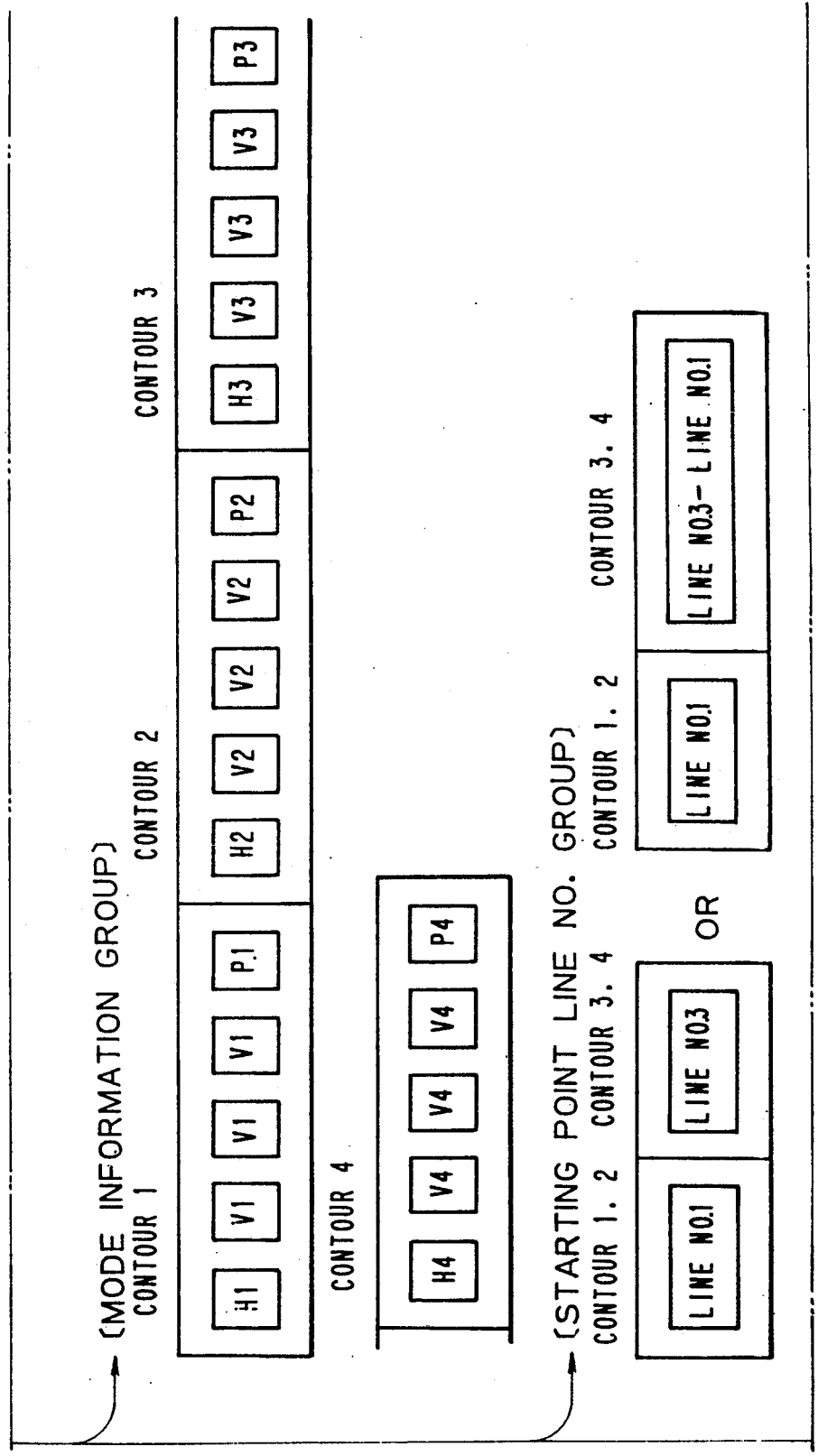
Figure 49C:
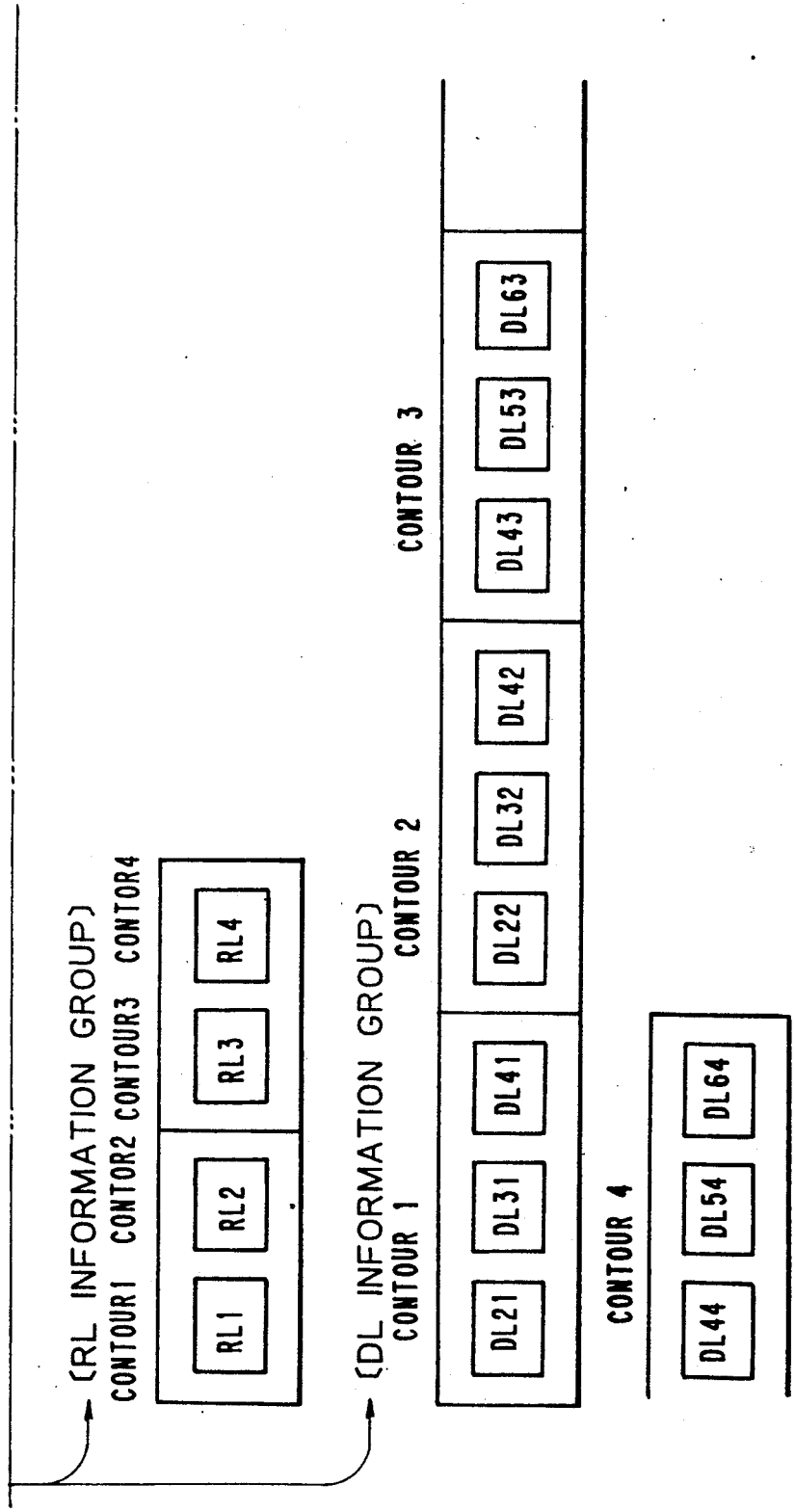

FIG. 48 is a view for explaining the second modified embodiment. In the figure, H shows the horizontal mode, V the vertical mode, P the pass mode, RL the run length, and DL the deviation length.

[1] The input picture image data is transformed into relative addresses of changing picture elements, then

[2] The statistical properties such as the continuity of the transformed picture elements in the scanning direction are separated from the transformed data

[3] The finally separated components are learned and the coding optimized by the universal coding system.

FIG. 50 is a general flow chart of the data compression processing in the second modified embodiment. In FIG. 50, first, at step S1, the picture image data input is coded by the modified MMR coding system shown in FIG. 24A and FIG. 24B, and the coded data is transformed into fixer length mode codes (H, V, P), RL codes, and DL codes in accordance with the allocation of fixed length codes of FIG. 52. These fixed length codes are in one byte units.

Next, at step S2, the codes are rearranged in line order separated into the mode codes, RL codes, and DL codes.

Then, at step S3, the data rearranged separated in accordance with codes is coded by universal coding system.

FIG. 52 is a view showing an example of allocation of fixed length mode codes, RL codes, and DL codes.

The various modes of the changing picture elements coded by the modified MMR coding system of FIG. 24A and FIG. 24B, that is, the RL codes and the DL codes, are shown by fixed length codes based on FIG. 52. That is, the changing picture elements are first classified into the mode code H, V, or P. Since the classification of the succeeding RL code or DL code can already have been distinguished by the previous mode code, so only the discrimination code of the number of bytes (1 or 2 bytes) showing the RL code and DL code is added.

Next, an explanation will be made of the specific steps for compression by the second modified embodiment using the deployment of the picture image of FIG. 51.

FIG. 53 is a view illustrating the picture image data obtained by the flow charts of FIG. 24A and FIG. 24B; and FIG. 54 is a view illustrating the picture image data after rearrangement processing is performed on the picture image data of FIG. 53.

Figure 51:
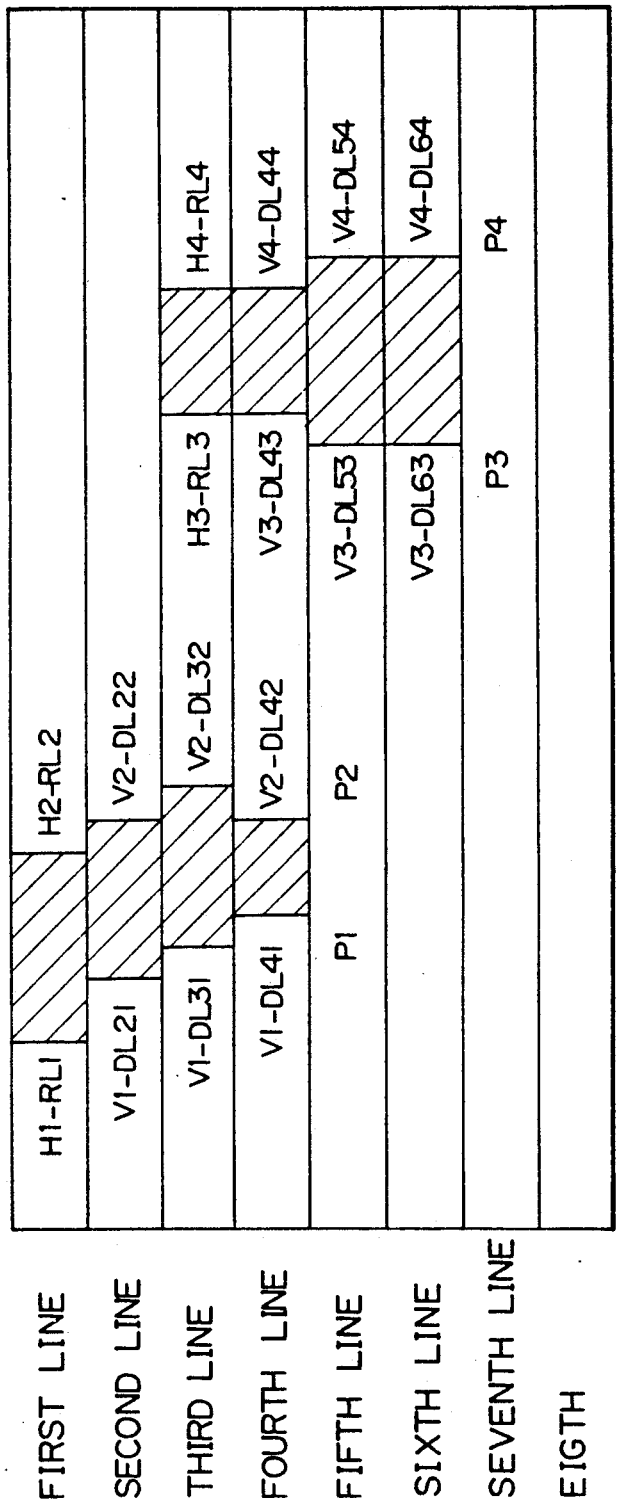
FIG. 51 is a pattern diagram showing an example of the deployment of the starting points, connecting points, and end points of a picture image.

First, using the modified MMR coding system shown in FIG. 24A and FIG. 24B, the changing picture elements of each line in the picture image of FIG. 51 are sequentially transformed into the mode, RL, and DL code information as shown in FIG. 53. For example, the initial changing picture element and the next changing picture element of the first line are starting points, so are expressed as (H1-RL1), (H2-RL2)

Further, the initial changing picture element and next changing picture element of the second line are connecting points, so are expressed as (V1-DL21), (V2-DL22)

The same is true for the following.

Next, as shown in FIG. 54, the codes are separated into mode, RL, and EL code information and rearranged for each code information. That is, in the mode information group, in the order of appearance of the changing picture elements, the three types of mode information H, V, and P are arranged in the line order, in the RL information group, the horizontal mode RL information is arranged in line order, and in the DL information group, the vertical mode DL information is arranged in line order.

Figure 55C:
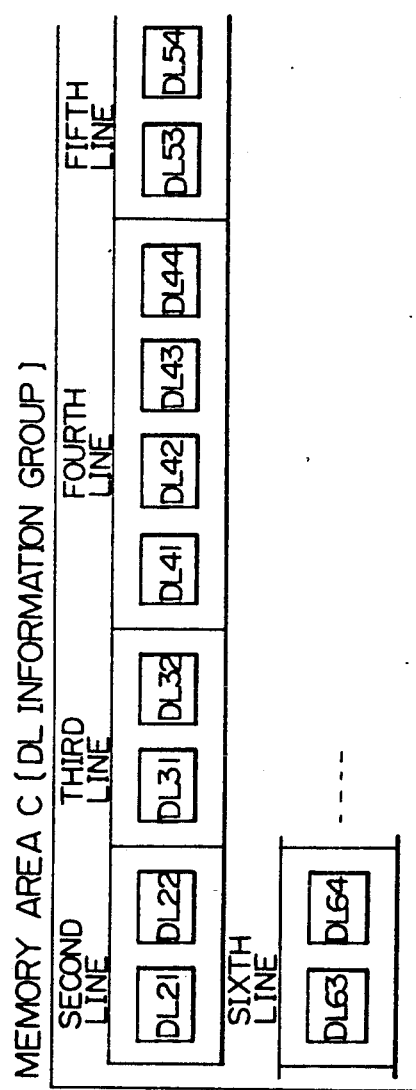

FIG. 55A, FIG. 55B, and FIG. 55C are views showing the memories for storing data of the mode information group, RL information group, and DL information group.

The code information rearranged after separation is stored for each code information group in the memory regions A, B, and C as shown in these figures. Then, after complete separation for each of the coded information, universal coding is performed by the universal type coding or incremental parsing type coding so as to achieve effective compression.

Figure 56:
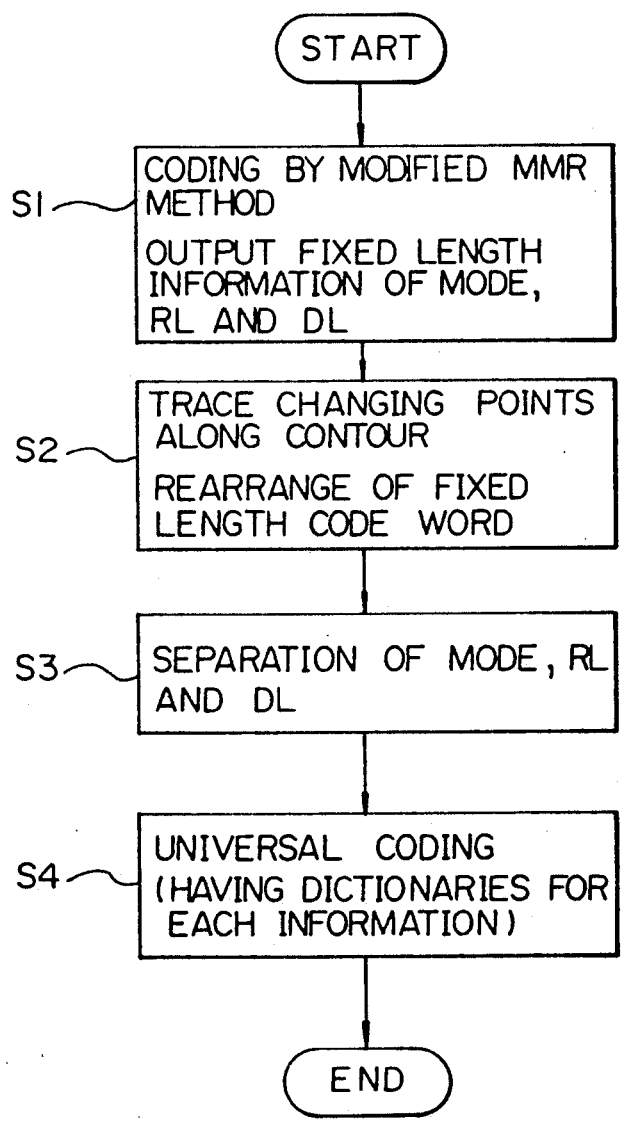
FIG. 56 is a general flow, chart of the data compression processing in the fifth example based on the first modified embodiment.

FIG. 56 is a general flow chart of the data compression processing in the fifth example based on the first modified embodiment.

The modified MMR coding in step S1 of FIG. 56 is the same as in the second modified embodiment. The input picture image data is transformed into fixed length mode codes, RL codes, and DL codes by the modified MR coding of step S1, then the control proceeds to step S2 and the data is rearranged for each contour in the sub scanning direction. Next, the code information rearranged along with the contours is separated at step S3 according to the code information and then rearranged for each contour. Then, finally, at step S4, coding is performed according to the universal coding system.

The processing for rearranging information in fixed length codes along with contours at step S2 of FIG. 56 is the same as in the already explained FIG. 27A and FIG. 27B. Further, the method of rearrangement is as already explained by FIG. 26A, FIG. 28A, and FIG. 32.

Next, an explanation will be made of the data compression in the case of application of the fifth example to the picture image shown in FIG. 51 with reference to the next figure.

Figure 59B:
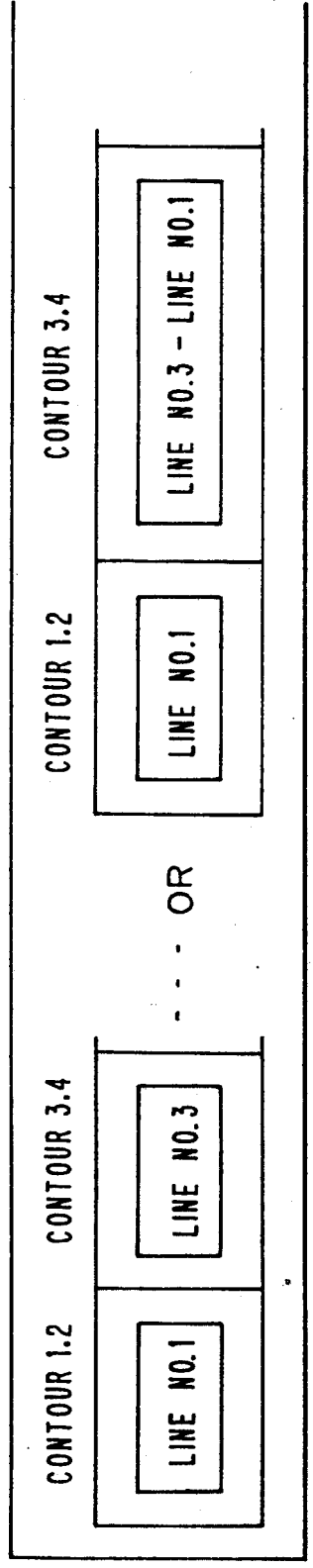
Figure 59C:
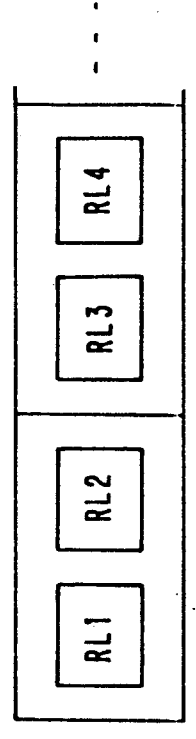

FIG. 57 is a view illustrating the picture image data separated into contour units by the processing of FIG. 28A and FIG. 28B; FIG. 58 is a view illustratively showing the picture image data after rearrangement processing is performed on the picture image data of FIG. 57; and FIG. 59A, FIG. 59B, and FIG. 59 are views showing the memories for storing data of the mode information group, RL information group, and DL information group.

FIG. 57 shows rearrangement of the data for each of the four contours 1 to 4 of FIG. 51. In FIG. 58, the code information based on the contours of FIG. 57, including in addition to the mode codes, RL codes, and DL codes, the line number information of the starting point picture elements, is separated and rearranged for each type of code information. The data rearranged for each type of code information after separation is stored in the memory regions A, B, C, and D for each type of code information as shown in FIG. 59, then is universally coded by universal type coding or incremental parsing type coding.

In the above explanation, explanation was made of the coding of picture image data, but the reverse of the above procedure may be used for reproduction of the picture image data. That is, in the second modified embodiment, the fixed length codes are rearranged in line units, then reproduced by the modified MMR system. Further, in the fifth example, after the fixed length codes arranged by contours are reproduced, the fixed length codes are rearranged in line units and reproduced by the modified MMR system.

In the above fifth example, in the rearrangement of the fixed length codes, the output was in the order of the contours to the left to right for each of a plurality of lines, but priority may also be given to contours at the top lines or priority given to contours at the left in the same line.

As explained above, effective data compression is possible without regard to the type of the picture image since the coding is performed, with learning, matching to the continuity of the changing picture elements and linearity and regularity of curves of the contours to the picture image covered. In particular, when the regularity of black/white patterns is higher, it is possible to obtain a high compression ratio close to vector coding.

Further, the regularity of the contours is designated as replication from the regularity of already coded contours, so even when the resolution rises, it is possible to determine the regularity as a group and a high efficiency coding is possible without an increase in the amount of codes in proportion to the resolution.

Further, the above-mentioned coding follows along contours, so there is no need for covering the picture image as a whole and it is possible to process for every number of lines using the modified MMR coding system, so a large capacity picture image memory is not needed and high speed processing is possible by serial processing of line units.

Finally, an explanation will be made of a third embodiment derived from the embodiment of FIG. 11.

Figure 60:
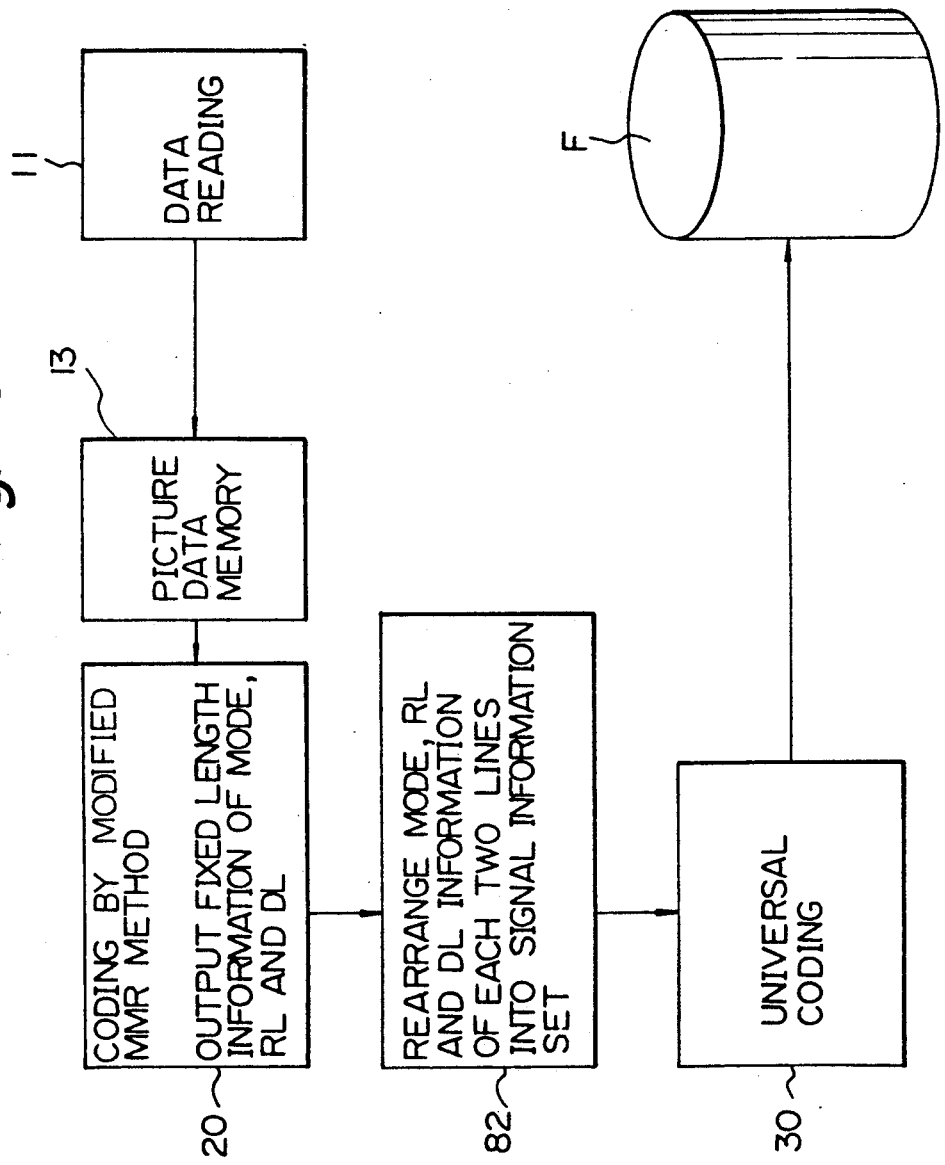
FIG. 60 is a block diagram showing the data compression system based on a third modified embodiment.

FIG. 60 is a block diagram showing the data compression system based on a third modified embodiment. This third modified embodiment is provided with a fixed length coding means (modified MMR coding) 20 which finds in scanning line units the connecting relationships of changing picture elements between adjoining scanning lines of binary picture image data and a rearranging means 82 which rearranges connecting relationships of changing picture elements in scanning line units found by the fixed length coding means 20 into connecting relationships of changing picture elements of units of two scanning lines. The universal coding means 30 codes connecting relationships of changing picture elements rearranged by the rearranging means 72 as replications from connecting relationships already coded.

For example, if the picture image data shown in FIG. 51 is input, the fixed length coding means 20 transforms the relative address data of the changing picture elements of each line as shown in FIG. 53. According to the third modified embodiment, the data shown in FIG. 53 is input to the rearranging means 82, the statistical properties of the connecting relationships (contours) of the changing picture elements in the direction of the sub scanning lines are grouped in two-line packages, then the coding is optimized with learning by the universal coding system and thus efficient compression enabled in picture images of various characteristics.

Figure 61:
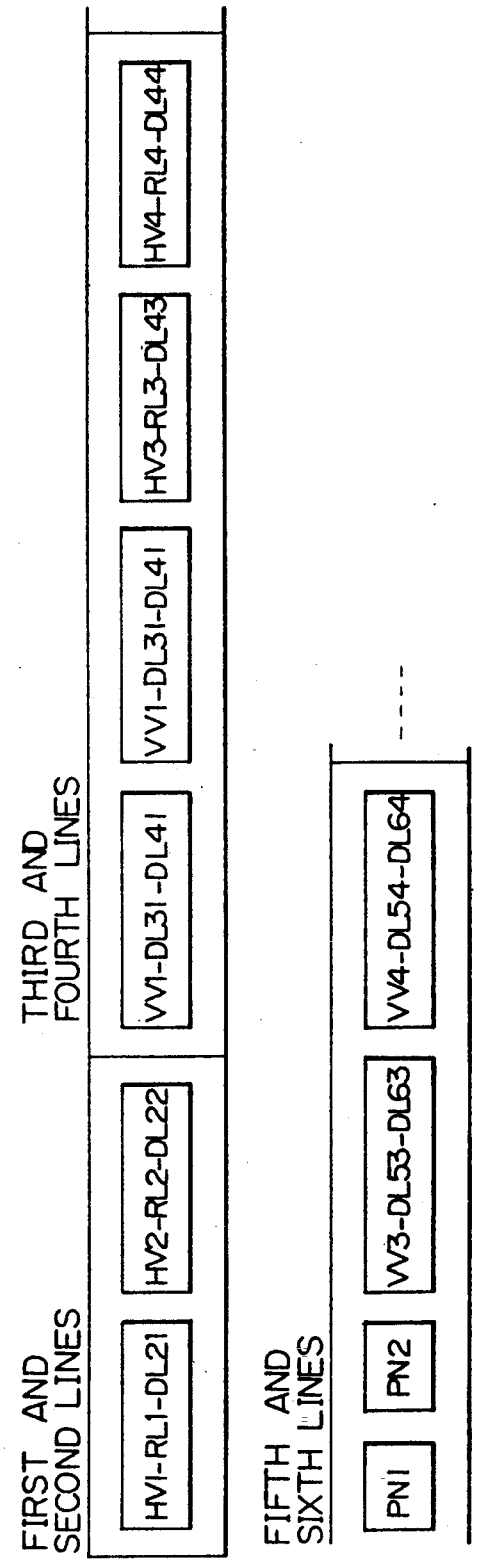
FIG. 61 is a view illustrating the rearrangement of data in the third modified embodiment.

FIG. 61 is a view illustrating the rearrangement of data in the third modified embodiment. The above two-line package rearrangement, i.e., the rearrangement in the first and second lines, third and fourth lines, fifth and sixth lines, etc. may be easily understood from this.

Figure 62:
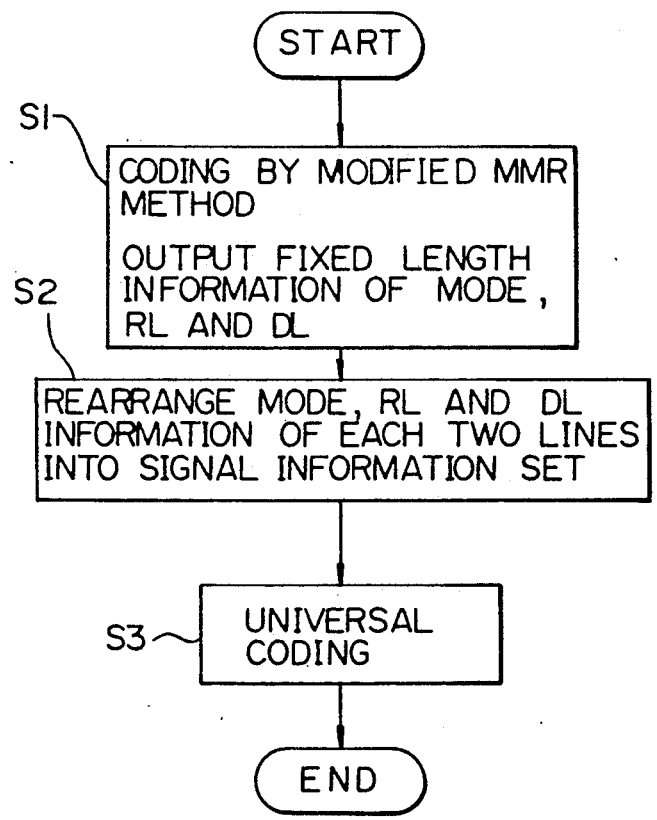
FIG. 62 is a general flow chart of the data compression processing based on the third modified embodiment.

FIG. 62 is a general flow chart of the data compression processing based on the third modified embodiment. In FIG. 62, first, the picture image data input at step S1 is transformed to fixed length mode codes, RL codes, and DL codes by the modified MMR coding system shown in FIG. 24A and FIG. 24B. The fixed length codes obtained by the modified MMR coding system are of one-byte units as shown in FIG. 63.

FIG. 63 is a view showing an example of a fixed length code word transformed by the first step in the flow chart of FIG. 62.

Next, the control proceeds to step S2, where the codes are rearranged in two-line packages.

FIG. 64A and FIG. 64B are lists showing allocation of fixed length code words by rearrangement in two-line packages.

Finally, the control proceeds to step S3 of FIG. 62, where the connecting relationships rearranged in two-line package expressions are coded by the universal coding system.

The fixed length codes in the case of two-line package processing are shown in FIGS. 64A and B. The mode in FIG. 64 is a combination mode of two lines, so there are seven modes NH, PH, HP, HV, VV, VP, and PN, where N is the Null mode.

Here, an explanation will be made of the specific procedure for compression for picture image data having the form of FIG. 51. Even in the third modified embodiment, the changing picture elements for each line are sequentially transformed to mode, RL, and DL information as in FIG. 53 by the modified MMR coding system of FIG. 24A and FIG. 24B. Note that details of FIG. 53 have already been given, so will be omitted here.

Next, the changing picture elements are rearranged in two-line packages as shown in FIG. 61. For example, in FIG. 61, the first changing picture element (H1-RL1) of the first line in FIG. 53 and the first changing picture element (V1-DL21) of the second line are joined to make (HV1-RL1-DL21). The second changing picture element (H2-RL2) and changing picture element (V1=DL22) of the same first and second lines are similarly joined to make (HV2-RL2-DL22). The same is true for the following.

The connecting relationships expressed by two-line packages in this way are expressed by a single fixed length code based on the two-line package expressions of FIG. 64A and FIG. 64B. As a result, two changing picture elements are grasped in a single state. Finally, universal coding is applied, whereby effective compression can be expected.

The above third modified embodiment will be explained in further detail below.

FIG. 65A to FIG. 65G are views illustrating the types of changing picture element modes used in the two-line package system. Note that the definitions of the changing picture elements used as reference when judging the changing picture element modes are as follows:

$a_0$: The reference or starting changing picture element on the coding scanning line 2, whose position is determined by the coding mode just before. At the start of the coding scanning line 2 (left end), $a_0$ is an imaginary element situated just before (to the left of) the first picture element.

$a_1$: The next changing picture element to the right of $a_0$ on the coding scanning line 2. This is a color opposite to $a_0$ and is the changing picture element to be next coded.

$a_2$: The next changing picture element to the right of $a_1$ on the coding scanning line 2.

$b_0$: The reference or starting changing picture element on the coding scanning line 1, whose position is determined by the coding mode just before. At the start of the coding scanning line 1 (left end), $b_0$ is an imaginary element situated just before (to the left of) the first picture element.

$b_1$: The next changing picture element on the coding scanning line 1 to the right of $b_0$ and $a_0$ and of the same color as $a_1$.

$b_2$: The next changing element on the coding scanning line to the right of $b_1$.

$c_1$: The next changing picture element on the reference scanning line to the right of $b_0$ and of the same color as $b_1$.

$c_2$: The next changing picture element on the reference scanning line to the right of $c_1$.

The two-line package system covers the reference line and two coding scanning lines 1 and 2 and performs fixed length coding on the changing picture elements of the coding scanning lines 1 and 2 as a package. Therefore, the coding scanning line 2 coded just before becomes the next reference scanning line.

Now, an explanation will be made of the definitions of the changing picture element modes:

[1] NH mode: See FIG. 65A.

The NH mode is defined as the case where there are no changing picture elements on the reference scanning line or coding scanning line 1 and there is a changing picture element corresponding to the horizontal (H) mode defined by the modified MMR coding system only on the coding scanning line 2.

[2] PH Mode: See FIG. 65B.

The PH mode is defined as the case where there is a changing picture element corresponding to the pass (P) mode on the reference scanning line and there is a changing picture element corresponding to the horizontal (H) mode on the coding scanning line 2. Further, the fact that there is a changing picture element corresponding to the pass (P) mode on the reference line indicates that there is no changing picture element on the coding scanning line 1.

[3] HP mode: See FIG. 65C.

The HP mode is defined as the case where there are no changing picture elements on the reference scanning line and coding scanning line 2 and there is a changing picture element corresponding to the H mode on only the coding scanning line 1.

[4] HV mode: See FIG. 65D.

There HV mode is defined as the case where there is no changing picture element on the reference scanning line and there is a changing picture element corresponding to the vertical (V) mode on the coding scanning line 2.

[5] VV mode: See FIG. 65E.

The VV mode is defined as the case where there are changing picture elements corresponding to the V mode on both the coding scanning line 1 and the coding scanning line 2.

[6] VP mode: See FIG. 65F.

The VP mode is defined as the case where there is a changing picture element corresponding to the V mode on the coding scanning line 1 and further there is no changing picture element on the coding scanning line 2.

[7] PN mode: See FIG. 65G.

The PN mode is defined as the case where there is a changing picture element corresponding to the P mode on only the reference scanning line and there is no changing picture element on either the coding scanning line 1 or 2.

Figure 66A:
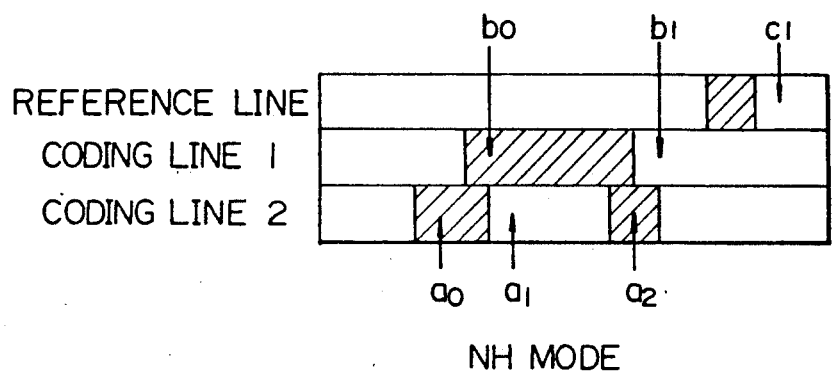
FIG. 66A and FIG. 66B are views illustrating special changing picture element modes in a two-line package system.
Figure 66B:
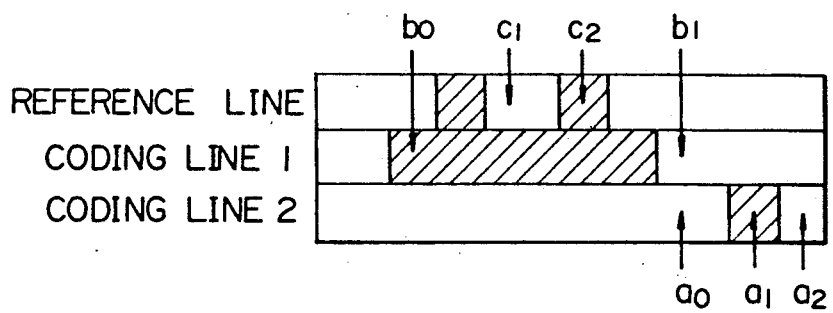

FIG. 66A and FIG. 66B are views illustrating special changing picture element modes in a two line package system. In these special examples, processing is performed by the NH mode in the case of FIG. 66A and by the PN mode in the case of FIG. 66B. The changing picture elements of the coding scanning lines 1 and 2 are coded in accordance with these modes.

Figure 67B:
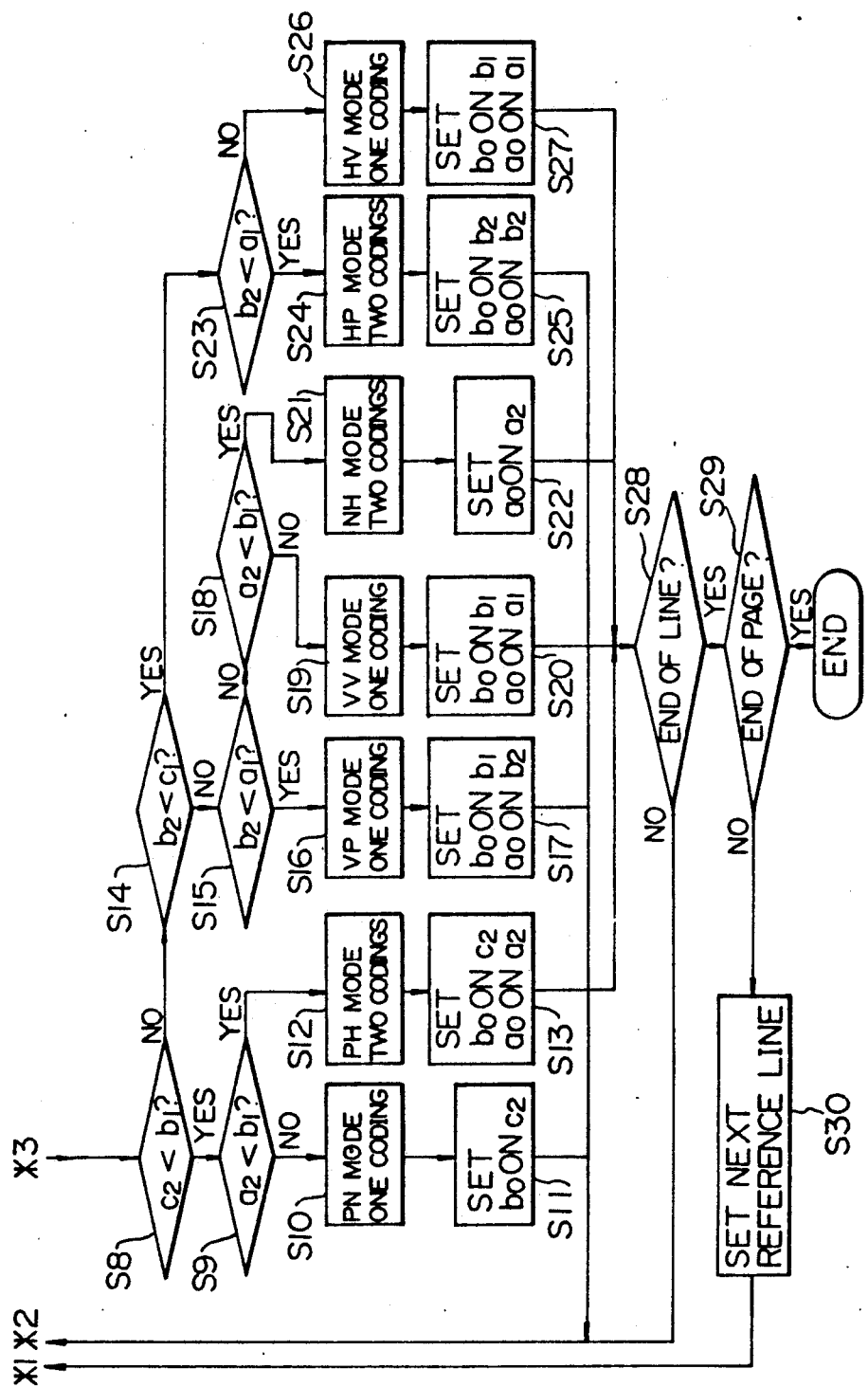

FIG. 67A and FIG. 67B are flow charts showing the detailed operational processing of the two line package system. An explanation will be made based on these figures.

In step S1, as the start of one page, all the imaginary reference scanning lines are made white and the changing picture elements other than the final picture element are eliminated.

At step S2, the coding scanning lines 1 and 2 to be coded next are set.

At step S3, first, the reference picture element $b_0$ of the start of the coding scanning line 1 and the reference element $a_0$ of the start of the coding scanning line 2 are placed just before the first picture elements.

At step S4, "0" is set for $a_0$ and $b_0$ as the actual execution of the step S3.

At step S5, $a_1$ and $a_1$ on the coding scanning line 2 defined in FIG. 1 are detected.

At step S6, $b_1$ and $b_2$ on the coding scanning line 1 defined in FIG. 1 are detected.

At step S7, $c_1$ and $c_2$ on the reference scanning line defined in FIG. 1 are detected.

At step S8, the addresses of the changing picture elements $c_2$ and $b_1$ are compared. If $c_2 < b_1$, then the mode of the changing picture element of the coding scanning line 1 is judged to be P and the control proceeds to step S9. If $c_2 \geq b_1$, then the mode of the changing picture element on the coding scanning line 1 is judged to be V or H and the control proceeds to step S14.

At step S9, the addresses of the changing picture elements $a_2$ and b are compared. If $a_2 < b_1$, then the mode of the changing picture element on the coding scanning line 2 is judged to be H and the control proceeds to step S12. If $a_0 \geq b_1$, then it is judged that there is no changing picture element on the coding scanning line and the control proceeds to step S10.

At step S10, the coding of the PN mode is performed by the judgement of steps S8 and S9.

At step S11, the reference changing picture element $b_0$ on the coding scanning line 1 is set to the position of $c_2$ and the control returns to the step S5.

At step S12, the coding Of the PH mode is performed by the judgement of steps S8 and S9. In this case, the run lengths between the changing picture elements $a_0$ and $a_1$ and between $a_1$ and $a_2$ are made into two codes.

At step S13, the reference changing picture element $b_0$ on the coding scanning line 1 is set to the position of $c_2$ and the reference changing picture element $a_0$ on the coding scanning line 2 is set to the position of $a_2$ and the control proceeds to step S28.

At step S14, the addresses of the changing picture elements $b_2$ and $c_1$ are compared. If $b_2 < c_1$, the mode of the changing picture element on the coding scanning line 1 is judged to be H and the control proceeds to step S23. If $b_2 \geq c_1$, the mode of the changing picture element on the coding scanning line 1 is judged to be V or null and the control proceeds to step S15.

At step S15, the addresses of the changing picture elements $b_0$ and $a_1$ are compared. If $b_2 < a_1$, then the mode of the changing picture element on the coding scanning line 2 is judged to be P and the control proceeds to step S16. If $b_2 \geq a_1$, the mode of the changing picture element on the coding scanning line 2 is judged to be P or H and the control proceeds to step S18.

At step S16, the coding of the VP mode is performed by the judgement of steps S8, S14, and S15. In this case, the deviation length of the changing picture element $b_1$ is coded.

At step S17, the reference changing picture element $b_0$ of the coding scanning line 1 is set to the position of b and the reference changing picture element $a_0$ on the coding scanning line 2 is set to the position of $b_2$, and the control returns to step S5.

At step S18, the addresses of the changing picture elements az and b are compared. If $a_2 < b_1$, the mode of the changing picture element on the coding scanning line 2 is judged to be H and the control proceeds to step S21. If $a_2 \geq b_1$, the mode of the changing picture element on the coding scanning line 2 is judged to be V and the control proceeds to step S19.

At step S19, the coding of the VV mode is performed by the judgement of steps S8, S14, S15, and S18.

At step S20, the reference changing picture element $b_0$ on the coding scanning line 1 is set to the position of b and the reference changing picture element $a_0$ on the coding scanning line 2 is set to the position of $a_1$, then the control proceeds to step S28.

At step S21, the coding of the NH mode is performed by the judgement of steps S8, S14, S15, and S18. In this case, the run lengths between the changing picture elements $a_0$ and $a_1$ and between $a_1$ and $a_2$ are made two codes.

At step S22, the reference changing picture element $a_0$ on the coding scanning line 2 is set to the position of $a_2$ and the control proceeds to step S28.

At step S23, the addresses of the changing picture elements $b_2$ and $a_1$ are compared. If $b_2 < a_1$, the mode of the changing picture element on the coding scanning line 2 is judged to be P and the control proceeds to step S24. If $b_2 22 a_1$, the mode of the changing picture element on the coding scanning line 2 is judged to be V and the control proceeds to step S26.

At step S24, the coding of the HP mode is performed by the judgement of steps S8, S14, and S23. In this case, the run lengths between the changing picture elements $b_0$ and $b_1$ and between $b_1$ and $b_2$ are made two codes.

At step S25, the reference changing picture element $b_0$ on the coding scanning line 1 is set to the position of $b_2$ and the reference changing picture element $a_0$ on the coding scanning line 2 is set to the position of $b_2$, then the control returns to step S5.

At step S26, the coding of the HV mode is performed by the judgement of steps S8, S14, and S23. In this case, the run length between the changing picture elements $b_0$ and $b_1$ and the deviation length of $a_1$ are coded together.

At step S27, the reference changing picture element $b_0$ on the coding scanning line 1 is set to the position of $b_1$ and the reference changing picture element $a_0$ on the coding scanning line 2 is set to the position of $a_1$ and the control proceeds to step S28.

At step S28, it is judged if the line is ended and if the line is ended the control proceeds to step S29 and if not it returns to step S5.

At step S29, it is judged if the page is ended and if the page is ended the processing is ended. If not, the control proceeds to step S30.

At step S30, the current coding scanning line 2 is set as the next reference scanning line and the control returns to step S2.

As explained above, according to the third modified embodiment, the connecting relationships of changing picture elements are coded with learning in two-line packages, so it is possible to effectively compress data without regard to the type of the picture image. In particular, in the case of a high regularity of black/white patterns, it is possible to obtain a high compression ratio close to vector coding.

Further, since it is possible to processing data of every two lines using the MMR coding system, a large capacity picture image memory is unnecessary.

We claim:

1. A data compression system, comprising:
   data generating means for supplying original data to be compressed;
   fixed length coding means for detecting mode classifications and mode conditions of changing picture elements in the original data that appear when sequentially scanned, and for transforming code words representative of pairs of the mode classifications and mode conditions to fixed length code words and for outputting time series picture data including the fixed length code words; and
   universal coding means for predictively coding the time series pictured data including the fixed length code words based on previously adjacent picture elements to perform universal coding and to output compressed data.

2. A data compression system according to claim 1, wherein said fixed length coding means comprises
   a mode detecting unit operatively connected to receive the original data from said data generating means, to detect the mode classifications and the mode conditions relating to the original data, and to output the code words corresponding thereto; and
   a code transforming unit, operatively connected to said mode detecting unit, to transform the code words sequentially output from said mode detecting unit into the fixed length code words.

3. A data compression system according to claim 2, wherein said code transforming unit comprises a memory, operatively connected to said mode detecting unit, to store predetermined fixed length code words corresponding to the code words.

4. A data compression system according to claim 2, wherein said mode detecting unit comprises
   a first shift register operatively connected to store black/white information of one line's worth of picture image data of the original data,
   a second shift register operatively connected to store black/white information of picture image data previously stored in said first shift register in a preceding processing cycle,
   a run-length counter operatively connected to receive one element at a time of the black/white information of the picture elements of the present line from said first shift register and to count a run-length value of successive of the black/white information, and
   a mode detecting unit, operatively connected to said first and second shift registers, to detect mode classifications based on whether the picture elements of the first shift register are in a coding system including a modified modified relative address coding system or a modified relative address coding system in response to a connecting relationship of changing picture elements between said first shift register and said second shift register, and
   wherein said code transforming unit comprises a memory, operatively connected to said mode detecting unit and said run-length counter, to generate the fixed length code words based on the run-length value counted by said run-length counter and the mode classifications detected by said mode detecting unit.

5. A data compression system according to claim 3, wherein said mode detecting unit comprises:
   a first shift register operatively connected to store black/white information of one line's worth of picture image data at the original data; and
   a second shift register operatively connected to said first shift register to store black/white information of the picture image data previously stored in said first shift register.

6. A data compression system according to claim 1, wherein said data generating means comprises
   a picture image data reading unit operatively connected to said fixed length coding means, and
   a document data forming unit, and
   wherein said system further comprises processing-unit data cutting means for sequentially receiving character code data in line units from said document data forming unit and for successively cutting out, from the character code data, data having a bit length the same as the bit length of character codes of the character code data as time series character data of processing units of data when coding character code data, the time series character data of the processing units of data cut out by said processing-unit data cutting means is coded by said universal coding means, and when coding picture image data, the fixed length code words found by said fixed length coding means is coded by said universal coding means.

7. A data compression system according to claim 6, further comprising switching means for selectively applying to said universal coding means the fixed length code words output by said fixed length coding means and the time series character data of the processing units of data cut out by said process-unit data cutting means.

8. A system as set forth in claim 2, wherein
   said mode detecting unit includes a contour extracting means which extracts portions of contours in picture image data included in said original data and
   said fixed length code words are output from said fixed length coding means using as parameters the extracted contour information.

9. A system as set forth in claim 8, wherein
   said contour extracting means is comprised of a mode detecting means which detects from the positional relationships of changing picture elements on a main scanning line to be coded and changing picture elements on an adjoining main scanning line coded before said main scanning line whether said changing picture elements on the main scanning line to be coded are of a horizontal mode showing the start of a contour, a vertical mode showing connection of contours, or a pass mode showing an end of a contour.

10. A system as set forth in claim 9, wherein said code transforming unit performs the coding by allocating fixed length code words corresponding to mode classifications and mode conditions detected by said mode detecting means.

11. A system as set forth in claim 10, wherein provision is made, in the input stage of said universal coding means, of a contour number allocating means for allocating contour numbers to code words of a number of main scanning lines coded by said code transforming unit and a code word reading means for reading in good order code words having the same contour numbers allocated by said contour number allocating means.

12. A system as set forth in claim 11, wherein
provision is made, between said code transforming unit and said contour number allocating means, of a first code word storage means which stores in the order on the main scanning lines the code words from said code transforming unit and
provision is made, between said contour number allocating means and said code word reading means, of a second code word storage means which stores code words coded by said code transforming unit in the order of the contour numbers allocated by said contour number allocating means.

13. A system as set forth in claim 8, wherein there is further provided a list forming means which prepares a list of starting points showing starting points of contours and a list of connecting point information showing connecting points of contours designated from said starting point information list, based on contour information extracted by said contour extracting means.

14. A system as set forth in claim 13, wherein there is further provided a rearranging means which rearranges the connecting relationships of changing picture elements of scanning line units coded by said fixed length coding means to connecting relationships of contour units in accordance with list information prepared by said list forming means, then inputs the same into said universal coding means.

15. A system as set forth in claim 14, wherein said list forming means acquires list regions each time a starting point of a contour appears and releases the list regions for which output is finished each time coding of connecting relationships of contours is finished.

16. As system as set forth in claim 13, wherein said starting point information list is comprised of:
[1] the pointer $Pa_1$ to the next starting point information
[2] the flag u showing that the contour is currently being coded
[3] the flag e showing that the contour is finished being coded
[4] the horizontal direction address Yi and the vertical direction address Xi of the starting point
[5] the pointer $Pb_1$ to the connecting point information and, on the other hand, the connecting point information list is comprised of, as mentioned above,
[1] the changing point node mlj of the contour (m=H, V, P)
[2] the pointer Pij to the changing point mode of the next line 17. A system as set forth in claim 8, wherein provision is made of a rearranging means which rearranges connecting relationships of changing picture elements along contours of picture images based on contour information extracted by said contour extracting means and
a regulating means which groups connecting relationships of changing picture elements rearranged along with contours by said rearranging means into only starting point picture element information and connecting picture element information and end point picture element information and
code words showing connecting relationships regulated by said regulating means are input to said universal coding means.

18. A system as set forth in claim 17, wherein the number of contours N, the relative value $\Delta Y$ of the line number, and the relative value $\Delta X$ of the picture element number are found for the starting point information and these are read out in that order by fixed lengths and, then, the connecting point information and end point information stored in a memory region are read out for each contour and input to the universal coding means.

19. A system as set forth in claim 8, wherein provision is made of
a buffer memory for storing said fixed length code words output from said fixed length coding means and using as parameters said contour information and
a rough coincidence judging means which receives as a first input the output of said buffer memory and receives as a second input the output from said buffer memory, among a pattern memory and coding unit constituting said universal coding means, for judging if these first and second inputs roughly coincide with each other,
the results of the judgement of said rough coincidence judgement means being used to control the coding operation in said coding unit and already coded data being used for data compression when said first input is similar to said second input.

20. A system as set forth in claim 19, wherein said rough coincidence judging means judges that the first input and second input are similar when the difference between said first input and second input is no more than a first threshold value (T1) and the sum of the differences is no more than a second threshold value (T2).

21. A system as set forth in claim 20, wherein said rough coincidence judging means is comprised of:
a subtracting circuit for receiving as input the outputs of said buffer memory and said pattern memory and detecting the differences thereof;
an accumulating circuit for accumulating the outputs of said subtracting circuit; and
a comparison circuit for receiving as input the outputs of the said subtracting circuit and accumulating circuit and calculating the difference between said first and second threshold values.

22. A system as set forth in claim 8, wherein provision is made of
a rearranging means for rearranging information showing connecting relationships of changing picture elements, that is, the mode classifications and mode conditions, output from said fixed length coding means, along with contours extracted from said contour extracting means and a separating means which separates into a number of types of connecting relationships the connecting relationships of changing picture elements rearranged along contours by the rearranging means, said universal coding means coding connecting relationships of changing picture elements for each of the number of types rearranged by the said separating means as replications from already coded connecting relationships so as to compress the data.

23. A system as set forth in claim 22, wherein the separating means separates the connecting relationships among adjoining scanning lines and groups them as follows:
   (a) three types of mode information: horizontal, vertical, and pass
   (b) run length information for determining the relative position of starting point changing picture elements defined by the horizontal mode
   (c) deviation length information for determining the relative position of connecting point changing picture elements defined by the vertical mode 24. A system as set forth in claim 2, wherein provision is made of a separating means which separates into a number of types of connecting relationships the connecting relationships of changing picture elements, that is, information showing the mode classifications and mode conditions, output from said fixed length coding means said universal coding means coding connecting relationships of changing picture elements for each of the number of types rearranged by the said separating means as replications from already coded connecting relationships so as to compress the data.

25. A system as set forth in claim 24, wherein the separating means separates the connecting relationships among adjoining scanning lines and groups them as follows:
   (a) three types of mode information: horizontal, vertical, and pass
   (b) run length information for determining the relative position of starting point changing picture elements defined by the horizontal mode
   (c) deviation length information for determining the relative position of connecting point changing picture elements defined by the vertical mode 26. A system as set forth in claim 2, wherein provision is made of a rearranging means which rearranges connecting relationships of changing picture elements among adjoining scanning lines of binary picture data, that is, mode information showing the mode classifications and mode conditions, obtained in scanning line units by said fixed length coding means, into information showing connecting relationships between changing picture elements in units of two adjoining scanning lines and said universal coding means coding connecting relationships of changing picture elements rearranged by the said separating means as replications from already coded connecting relationships.

27. A system as set forth in claim 26, wherein said information showing connecting relationships between changing picture elements in units of two adjoining scanning lines is classified into the following seven modes (wherein H: horizontal mode, V: vertical mode, P: pass mode): NH, PH, HP, HV, VV, VP, and PN (where N is a Null mode).

28. A system as set forth in claim 27, wherein said information is collected for a reference line, first coding line, and second coding line arranged in a sub scanning direction and the fixed length code words are generated from said information as packages of changing elements of said first and second coding lines.

29. A data compression system according to claim 2, wherein said universal coding means comprises means for coding connecting relationships to be coded at a current time as information designating a replication position and replication length of already coded connecting relationships.

30. A data compression system according to claim 2, wherein said universal coding means comprises means for coding connecting relationships to be coded at a current time as information designating numbers of partial series of already coded connecting relationships divided into different partial series.

* * * * *

UNITED STATES PATENT AND TRADEMARK OFFICE
CERTIFICATE OF CORRECTION

PATENT NO. : 5,138,673

DATED : August 11, 1992

INVENTOR(S) : Yoshida et al.

It is certified that error appears in the above-identified patent and that said Letters Patent is hereby corrected as shown below:

Column 6, line 1, change "nc" to --no--.

Column 16, line 8, change "$M(a_0 1)$" to

--$M(a_0 a_1)$--.

Column 18, line 62, change "$b_2$" to --by--.

Column 26, line 2, change "thee" to --the--;

Column 26, line 40, change "RI," to --RL,--.

UNITED STATES PATENT AND TRADEMARK OFFICE
CERTIFICATE OF CORRECTION

PATENT NO. : 5,138,673

DATED : August 11, 1992

INVENTOR(S) : Yoshida et al.

It is certified that error appears in the above-identified patent and that said Letters Patent is hereby corrected as shown below:

Column 28, line 21, change "rode," to

--code,--;

Column 35, line 47, change "$a_2$ and b" to

--$a_2$ and $b_1$--;

Column 35, line 50, change "$a_0 \geq b_1$," to
--$a_2 \geq b_1$;

Column 35, line 58, change "Of" to --of--.

Column 36, line 7, change "$b_0$ and $a_1$" to

--$b_2$ and $a_1$--;

Column 36, line 19, change "b" to --$b_1$";

UNITED STATES PATENT AND TRADEMARK OFFICE
CERTIFICATE OF CORRECTION

PATENT NO. : 5,138,673

DATED : August 11, 1992

INVENTOR(S) : Yoshida et al.

It is certified that error appears in the above-identified patent and that said Letters Patent is hereby corrected as shown below:

Column 36, line 23, change "az and b" to --$a_2$ and $b_1$--;

Column 36, line 34, change "b" to --$b_1$--;

Column 36, line 49, change "$b_2 22a_1$," to --$b_2 \geq a_1$,--.

Column 38, line 55, change "process-unit" to --processing-unit--.

Column 41, line 25, change "mode" to --mode.--;

Column 42, line 6, change "mode" to --mode.--.

Signed and Sealed this

Twelfth Day of October, 1993

Attest:

BRUCE LEHMAN

*Attesting Officer*  *Commissioner of Patents and Trademarks*